(12) United States Patent
Kang et al.

(10) Patent No.: US 11,265,715 B2
(45) Date of Patent: Mar. 1, 2022

(54) METHOD AND APPARATUS FOR PROVIDING COMMUNICATION SERVICE

(71) Applicant: Samsung Electronics Co., Ltd., Suwon-si (KR)

(72) Inventors: Sujung Kang, Suwon-si (KR); Hyewon Lee, Suwon-si (KR); Jonghan Park, Suwon-si (KR); Duckey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 16/908,632

(22) Filed: Jun. 22, 2020

(65) Prior Publication Data

US 2020/0404501 A1    Dec. 24, 2020

(30) Foreign Application Priority Data

Jun. 20, 2019 (KR) .................. 10-2019-0073522
Aug. 23, 2019 (KR) .................. 10-2019-0103992
Jun. 22, 2020 (KR) .................. 10-2020-0075676

(51) Int. Cl.
*H04W 12/069* (2021.01)
*H04W 12/08* (2021.01)
*H04W 8/20* (2009.01)
*H04W 8/18* (2009.01)
*H04L 29/06* (2006.01)

(52) U.S. Cl.
CPC .......... *H04W 12/069* (2021.01); *H04L 63/08* (2013.01); *H04W 8/183* (2013.01); *H04W 8/205* (2013.01); *H04W 12/08* (2013.01)

(58) Field of Classification Search
CPC ... H04W 12/069; H04W 12/08; H04W 12/42; H04W 12/43; H04W 8/183; H04W 8/205; H04W 8/245; H04L 63/08
See application file for complete search history.

(56) References Cited

U.S. PATENT DOCUMENTS

| 9,009,475 | B2 |  | 4/2015 | Hauck et al. | |
| 2016/0173495 | A1 | * | 6/2016 | Joo | H04L 63/102 713/171 |
| 2018/0234787 | A1 |  | 8/2018 | Karimli et al. | |
| 2021/0092589 | A1 | * | 3/2021 | Alonso Alarcon | H04L 63/0428 |

* cited by examiner

*Primary Examiner* — Wayne H Cai

(57) ABSTRACT

Provided are a method and apparatus. A method, performed by a primary terminal, of providing a communication service may include: identifying and accessing, by performing a discovery process, an Internet of Things (IoT) terminal operating as an access point, transmitting, to the IoT terminal, authentication information for performing a second embedded Subscriber Identity Module (eSIM) setup process following a first eSIM setup process while performing the first eSIM setup process on the IoT terminal, disconnecting first connection with the IoT terminal after terminating the first eSIM setup process, performing second connection with the IoT terminal based on the authentication information, in response to an access request from the IoT terminal and performing the second eSIM setup process as a subsequent procedure to the first eSIM setup process.

20 Claims, 20 Drawing Sheets

FIG. 12
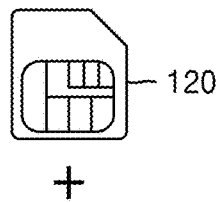
UICC HAVING EMBEDDED
FIXED PROFILE
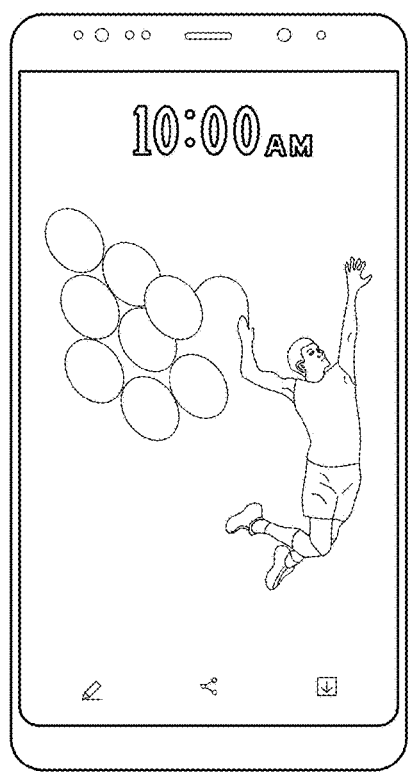
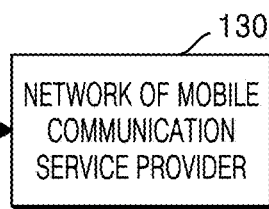
PERFORM AUTHENTICATION WITH
SYSTEM OF MOBILE COMMUNICATION
SERVICE PROVIDER BY USING PROFILE
OF UICC AND THEN USE NETWORK OF
MOBILE COMMUNICATION SERVICE PROVIDER

METHOD AND APPARATUS FOR PROVIDING COMMUNICATION SERVICE

CROSS-REFERENCE TO RELATED APPLICATIONS

This application is based on and claims priority under 35 U.S.C. § 119 to Korean Patent Application No. 10-2019-0073522 filed on Jun. 20, 2019, Korean Patent Application No. 10-2019-0103992 filed on Aug. 23, 2019, and Korean Patent Application No. 10-2020-0075676 filed on Jun. 22, 2020 in the Korean Intellectual Property Office, the disclosures of which are herein incorporated by reference in their entirety.

BACKGROUND

1. Field

The disclosure relates to a method of downloading and installing a profile in an Internet of Things (IoT) terminal to which an embedded Subscriber Identity Module (eSIM) is applied (hereinafter, the eSIM IoT terminal), and thus providing a communication service between a primary terminal and the eSIM IoT terminal. The disclosure also relates to a method and apparatus for selecting an embedded Universal Integrated Circuit Card (eUICC), and more particularly, to a method and apparatus for installing and managing an eSIM profile.

2. Description of Related Art

To meet increasing demand with respect to wireless data traffic after the commercialization of $4^{th}$ generation (4G) communication systems, efforts have been made to develop evolved $5^{th}$ generation (5G) system or pre-5G communication system. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (e.g., a 60 GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied and applied to the NR system. To improve system networks for 5G communication systems, various technologies such as evolved small cells, advanced small cells, cloud Radio Access Networks (Cloud-RAN), ultra-dense networks, Device-To-Device communication (D2D), wireless backhaul, moving networks, cooperative communication, Coordinated Multi-Points (CoMP), interference cancellation, or the like have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), sparse code multiple access (SCMA), or the like have been developed. The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, Machine-To-Machine (M2M) communication, and Machine-Type Communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services. Various attempts are being made to apply 5G and legacy 4G communication systems to the IoT network. For example, the 4G and 5G communications such as sensor networks, M2M communication, MTC, or the like are being implemented by using techniques including beamforming, MIMO, array antennas, or the like.

As various mobile communication-based services may be provided according to the foregoing and the development of mobile communication systems, methods for efficiently providing such services are required. As an advanced form of a Universal Integrated Circuit Card (UICC) in a wireless communication system including an authentication control module for a network access by a subscriber to access such mobile communication systems, secure elements such as an embedded UICC (eUICC), an integrated UICC (iUICC), an integrated Secure Service Platform (iSSP), or the like are being developed and applied or to be applied to an IoT terminal.

In a case where a subscriber purchases a terminal with an applied eUICC and desires to directly open communication through the terminal or attempts to access a network because a eUICC profile downloaded to the eUICC has a problem, the network cannot successfully authenticate the subscriber and thus does not allow the network access.

To solve this issue, the Global System for Mobile communication Association (GSMA) that is an organization for standardization of a method of downloading a eUICC profile to a eUICC card proposes, as a scheme for obtaining a network to download the eUICC profile to a eUICC in a terminal, Wi-Fi or a Provisioning Profile that is a profile being similar to the eUICC profile but whose purpose is limited only for providing connectivity.

SUMMARY

According to various embodiments of the disclosure, provided are a communication opening method and procedure based on standards for downloading and installing a profile to an embedded Subscriber Identity Module (eSIM) Internet of Things (IoT) terminal through interoperation with a primary terminal.

According to various embodiments of the disclosure, provided are a method and apparatus for enabling a terminal to select a communication service and perform communication connection in a communication system.

According to various embodiments of the disclosure, provided are a method and apparatus for enabling a terminal to online download, install, and manage a profile for communication connection in a communication system.

According to various embodiments of the disclosure, provided are a method and apparatus for enabling a terminal to efficiently download an event in a communication system.

Additional aspects will be set forth in part in the description which follows and, in part, will be apparent from the description, or may be learned by practice of the presented embodiments of the disclosure.

According to an embodiment of the disclosure, a method, performed by a primary terminal, of providing a communication service may include: identifying and accessing, by performing a discovery process, an Internet of Things (IoT) terminal operating as an access point, transmitting, to the IoT terminal, authentication information for performing a second embedded Subscriber Identity Module (eSIM) setup process following a first eSIM setup process while performing the first eSIM setup process on the IoT terminal, disconnecting first connection with the IoT terminal after terminating the first eSIM setup process, performing second connection with the IoT terminal based on the authentication information, in response to an access request from the IoT terminal and performing the second eSIM setup process as a subsequent procedure to the first eSIM setup process.

The first eSIM setup process may include: determining whether the IoT terminal is capable of performing an eSIM setup, based on a resource of the IoT terminal and purchasing a communication service plan.

The second eSIM setup process may include downloading a profile for the IoT terminal.

The primary terminal may operate as an access point when performing the second connection with the IoT terminal based on the authentication information, in response to the access request from the IoT terminal.

The authentication information may include at least one of Service Set Identifier (SSID) and Password (PW), transaction ID for an eSIM profile, or Evolved Packet System (EPS) information for the IoT terminal.

According to an embodiment of the disclosure, a method, performed by an Internet of Things (IoT) terminal, of providing a communication service may include: performing first connection with a primary terminal, in response to an access request from the primary terminal, receiving, from the primary terminal, authentication information for performing a second embedded Subscriber Identity Module (eSIM) setup process following a first eSIM setup process while performing the first eSIM setup process, disconnecting first connection with the primary terminal after terminating the first eSIM setup process, performing second connection with the primary terminal based on the authentication information and performing the second eSIM setup process as a subsequent procedure to the first eSIM setup process.

The first eSIM setup process may include determining whether the IoT terminal is capable of performing an eSIM setup, based on a resource of the IoT terminal and purchasing a communication service plan.

The second eSIM setup process may include downloading a profile for the IoT terminal.

The primary terminal may operate as an access point when performing second connection with the IoT terminal based on the authentication information, in response to an access request from the IoT terminal.

The authentication information may include at least one of Service Set Identifier (SSID) and Password (PW), transaction ID for an eSIM profile, or Evolved Packet System (EPS) information for the IoT terminal.

According to an embodiment of the disclosure, a primary terminal providing a communication service may include a transceiver and at least one processor coupled with the transceiver and configured to: identify and access, by performing a discovery process, an Internet of Things (IoT) terminal operating as an access point, transmit, to the IoT terminal, authentication information for performing a second embedded Subscriber Identity Module (eSIM) setup process following a first eSIM setup process while performing the first eSIM setup process on the IoT terminal, disconnect first connection with the IoT terminal after terminating the first eSIM setup process, perform second connection with the IoT terminal based on the authentication information, in response to an access request from the IoT terminal and perform the second eSIM setup process as a subsequent procedure to the first eSIM setup process.

The performing of the first eSIM setup process, the at least one processor may be further configured to: determine whether the IoT terminal is capable of performing an eSIM setup, based on a resource of the IoT terminal and purchase a communication service plan.

In performing of the second eSIM setup process, the at least one processor may be further configured to: download a profile for the IoT terminal.

The primary terminal may operate as an access point when performing the second connection with the IoT terminal based on the authentication information, in response to the access request from the IoT terminal.

The authentication information may include at least one of Service Set Identifier (SSID) and Password (PW), transaction ID for an eSIM profile, or Evolved Packet System (EPS) information for the IoT terminal.

According to an embodiment of the disclosure, an Internet of Things (IoT) terminal providing a communication service may include a transceiver and at least one processor coupled with the transceiver and configured to: perform first connection with a primary terminal, in response to an access request from the primary terminal, receive, from the primary terminal, authentication information for performing a second embedded Subscriber Identity Module (eSIM) setup process following a first eSIM setup process while performing the first eSIM setup process, disconnect first connection with the primary terminal after terminating the first eSIM setup process, perform second connection with the primary terminal based on the authentication information and perform the second eSIM setup process as a subsequent procedure to the first eSIM setup process.

In the performing of the first eSIM setup process, the at least one processor may be further configured to: determining whether the IoT terminal is capable of performing an eSIM setup, based on a resource of the IoT terminal; and purchase a communication service plan.

In the performing of the second eSIM setup process, the at least one processor may be further configured to: download a profile for the IoT terminal.

The primary terminal may operate as an access point when performing second connection with the IoT terminal based on the authentication information, in response to an access request from the IoT terminal.

The authentication information may include at least one of Service Set Identifier (SSID) and Password (PW), transaction ID for an eSIM profile, or Evolved Packet System (EPS) information for the IoT terminal.

According to an embodiment of the disclosure, a primary terminal may perform an operation of identifying that a particular IoT terminal is a terminal having an eSIM mounted therein and requiring downloading and installation of a profile and an operation of collecting necessary information from the eSIM IoT terminal so as to be issued an activation code as preset information for allowing the eSIM IoT terminal to download the profile, the eSIM IoT terminal may perform an operation of attempting an access including authentication about Open Connectivity Foundation (OCF) connection eSIM Easysetup by using the primary terminal as an access point (AP), the primary terminal may perform an operation of determining an ongoing procedure of the OCF connection eSIM Easysetup and reconfiguring previous connection and an operation of transferring the activation code to the eSIM IoT terminal so as to allow the eSIM IoT terminal to start downloading the profile, and the eSIM IoT terminal may perform an operation of notifying the primary terminal for processing of user interaction for a profile download procedure, processing a response thereof, and completing the profile download procedure.

According to an embodiment of the disclosure, a communication method performed by a terminal in a wireless communication system may include: generating a Local Profile Assistant Application Programming Interface (LPA API) information list including at least one piece of LPA API information that is information for generation of an activation code with respect to an embedded Universal Integrated Circuit Card (eUICC); transmitting the LPA API information list to a server, and receiving, from the server, one or more activation codes and one or more pieces of eUICC identifier information corresponding to the one or more activation codes, respectively; selecting a eUICC, based on the one or more pieces of eUICC identifier information; and processing an activation code with respect to the selected eUICC, the activation code corresponding to eUICC identifier information of the selected eUICC.

According to another embodiment of the disclosure, a communication method performed by a base station in a wireless communication system may include: receiving, from a terminal, a LPA API information list including at least one piece of LPA API information that is information for generation of an activation code with respect to a eUICC; selecting LPA API information from the LPA API information list; generating an activation code corresponding to an event, based on the selected LPA API information; transmitting, to the terminal, the activation code and eUICC identifier information corresponding to the selected LPA API information; and processing the event corresponding to the activation code.

According to another embodiment of the disclosure, a terminal in a wireless communication system may include: a transceiver; a plurality of eUICCs storing profiles; and at least one processor configured to generate a LPA API information list including at least one piece of LPA API information that is information for generation of an activation code with respect to a eUICC, transmit the LPA API information list to a server, and receiving, from the server, one or more activation codes and one or more pieces of eUICC identifier information corresponding to the one or more activation codes, respectively, select a eUICC, based on the one or more pieces of eUICC identifier information, and process an activation code with respect to the selected eUICC, the activation code corresponding to eUICC identifier information of the selected eUICC.

According to another embodiment of the disclosure, a base station in a wireless communication system may include: a transceiver; and at least one processor configured to receive, from a terminal, a LPA API information list including at least one piece of LPA API information that is information for generation of an activation code with respect to a eUICC, select LPA API information from the LPA API information list, generate an activation code corresponding to an event, based on the selected LPA API information, transmit, to the terminal, the activation code and eUICC identifier information corresponding to the selected LPA API information, and process the event corresponding to the activation code.

According to another embodiment of the disclosure, a terminal in a wireless communication system may include: a transceiver; and at least one processor configured to receive an activation code procedure initiation request message from a server, to generate and identify an LPA API information list, to transmit the LPA API information list to the server, to receive at least an activation code and a eUICC index, to transmit an event request message to the server by referring to the activation code, and to control the transceiver to receive a part of an event or the entire event from the server.

According to another embodiment of the disclosure, a server in a wireless communication system may include: a transceiver; and at least one processor configured to transmit an activation code procedure initiation request message to a terminal, to receive an LPA API information list from the terminal, to transmit an event generation request message to another server, to receive an event identifier from the other server, and to control the transceiver to transmit an activation code and a selected eUICC index to the terminal.

According to another embodiment of the disclosure, a terminal in a wireless communication system may include: a receiver configured to receive an activation code procedure initiation request message from a server; a controller configured to collect information about at least one eUICC mounted in the terminal and/or information about a modem and to generate and identify an LPA API information list; and a transmitter configured to transmit the LPA API information list to the server, wherein the receiver is further configured to receive at least an activation code and a eUICC index from the server, the controller is further configured to select a eUICC by referring to the eUICC index, the transmitter is further configured to transmit an event request message to the server by referring to the activation code, the receiver is further configured to receive a part of an event or the entire event from the server, and the controller is further configured to process the received part of the event or the received entire event with respect to the selected eUICC.

According to another embodiment of the disclosure, a server in a wireless communication system may include: a transmitter configured to transmit an activation code procedure initiation request message to a terminal; a receiver configured to receive an LPA API information list from the terminal; and a controller configured to select at least one eUICC by referring to the LPA API information list, wherein the transmitter is further configured to transmit an event generation request message to another server, the receiver is further configured to receive an event identifier from the other server, the controller is further configured to generate an activation code corresponding to an event by referring to the event identifier, and the transmitter is further configured to transmit the activation code and an index of the selected eUICC to the terminal.

The technical problems of the disclosure are not limited to the aforementioned features, and other unstated technical problems will be clearly understood by one of ordinary skill in the art in view of descriptions below.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 illustrates a method of connecting to a mobile communication network, the method being performed by a terminal using a Universal Integrated Circuit Card (UICC) having embedded therein a fixed profile, according to an embodiment of the disclosure;

DETAILED DESCRIPTION

Figure 1:
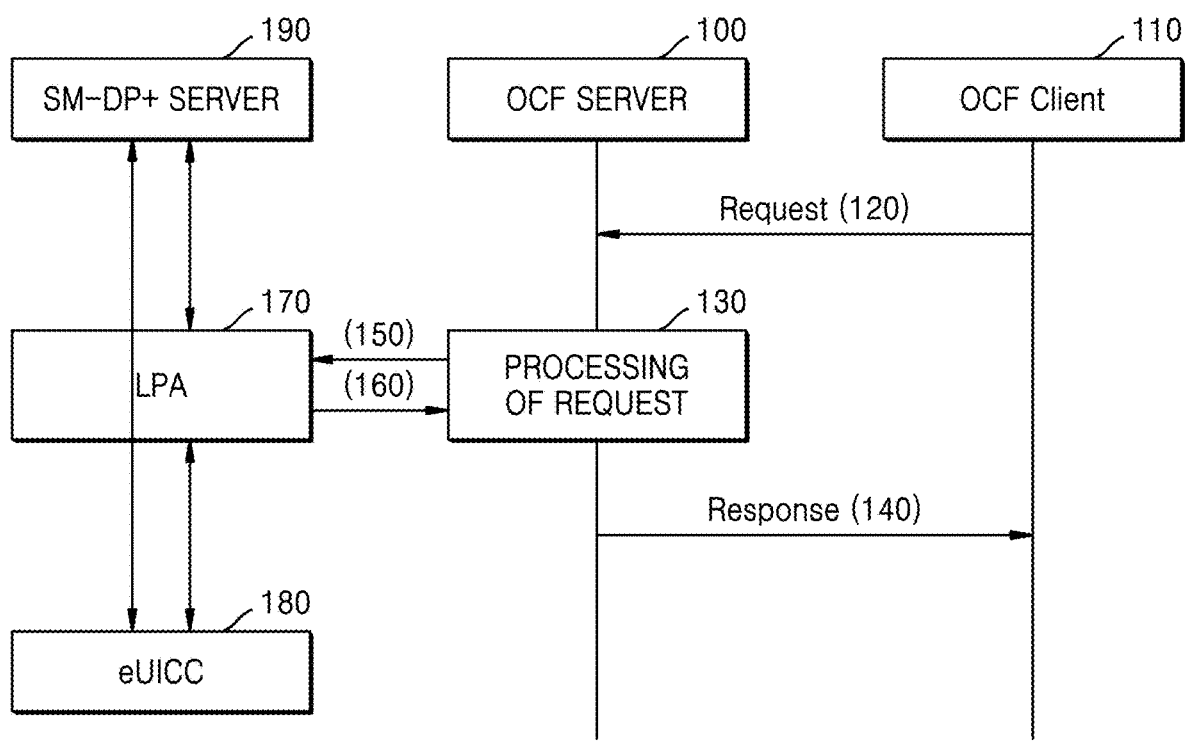
FIG. 1 illustrates a relation and communication processing between an Open Connectivity Foundation (OCF) OCF module and a Global System for Mobile communication Association (GSMA) module.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification. For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral. Advantages and features of the technical concept according to the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. In the following descriptions of the disclosure, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. In the disclosure, a downlink (DL) refers to a wireless transmission path of a signal to be transmitted from a base station (BS) to a UE, and an uplink (UL) refers to a wireless transmission path of a signal to be transmitted from a UE to a BS. Although the following descriptions may provide about long term evolution (LTE) or LTE-Advanced (LTE-A) systems as an example, embodiments of the disclosure are also applicable to other communication systems having similar technical backgrounds or channel structure. For example, embodiments of the disclosure may be applicable to a system including $5^{th}$ generation (5G) New Radio (NR) communication technology developed after LTE-A system, and hereinafter, 5G may indicate a concept including LTE, LTE-A, and other similar services according to the related art. The disclosure is applicable to other communication systems through modification at the discretion of one of ordinary skill in the art without greatly departing from the scope of the disclosure. It will be understood that blocks in flowcharts or combinations of the flowcharts may be performed by computer program instructions.

Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto. As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor.

In a wireless communication system, a Universal Integrated Circuit Card (UICC) refers to a smart card inserted into a mobile communication terminal and used. The UICC may include an access control module for accessing a network of a mobile communication service provider. According to various embodiments, examples of the access control module include, but are not limited to, a Universal Subscriber Identity Module (USIM), a Subscriber Identity Module (SIM), an internet protocol (IP) Multimedia Service Identity Module (ISIM), or the like. The UICC may be referred to as a UICC card, a USIM card, or a SIM card, and may be generally called the SIM card. The UICC may store private information of a mobile communication service subscriber, and when accessing a mobile communication network, the UICC may perform subscriber authentication and generation of a traffic security key, thereby enabling secure mobile communication use.

Due to vitalization of IoT-related fields, an embedded UICC (eUICC) is applied to wearable devices, vehicles, and various terminals such as smart meters. The eUICC may refer to a UICC card that can download and select a SIM module. That is, the eUICC may include a UICC card that is fixed or is not fixed to a terminal from among UICCs capable of remotely downloading and selecting a SIM module, and information about the SIM module downloaded to the eUICC may be referred to as a eUICC profile The eUICC profile may be interchangeably used with the terms of a SIM profile, an eSIM profile, an eSIM Profile Package, or an eSIM profile.

A server that generates, prepares, or stores the eSIM profile to be downloaded may be referred to as a Subscription Manager and Data Preparation server, a SM-DP server, a Subscription Manager and Data Preparation+server, a SM-DP+server, or a DP+server. In order for a user to read information stored in the eUICC through a terminal with an applied eUICC and to display the information, the terminal has to execute a Local Profile Agent (LPA) application defined by the Global System for Mobile communication Association (GSMA).

In the specification below, the SIM card may include the UICC card, the USIM card, a UICC including the ISIM, or the like. In other words, technical application with respect to the SIM card may be equally applied to the USIM card, the ISIM card, or a general UICC card. According to some embodiments of the disclosure, the SIM card may store private information of a mobile communication service subscriber, and when accessing a mobile communication network, the UICC may perform subscriber authentication and generation of a traffic security key, thereby enabling secure mobile communication use. According to some embodiments of the disclosure, when the SIM card is manufactured, the SIM card may be manufactured as a dedicated card for a particular mobile communication service provider at the request of the particular mobile communication service provider, and authentication information for access to a network of the particular mobile communication service provider, the authentication information including a USIM application, an International Mobile Subscriber Identity (IMSI), a subscriber key value (K value), an Operator Constant (OPc) value, etc., may be pre-stored in the SIM card and then the SIM card may be released. The particular mobile communication service provider may receive and then provide the manufactured SIM card to a subscriber, and afterward, when required, a terminal may perform management such as installation, modification, deletion, or the like of an application in the UICC by using a technology such as Over The Air (OTA), or the like.

A subscriber may insert a UICC card into a mobile communication terminal of the subscriber and may use a network and application services of a mobile communication service provider, and when replacing a terminal, the subscriber may extract the UICC card from the terminal and insert the UICC card into a new terminal, thereby changelessly use, in the new terminal, authentication information, mobile communication telephone number, a private telephone directory, or the like stored in the UICC card. According to some embodiments of the disclosure, in a case where a user remotely downloads and installs a SIM module in the UICC card, the user may download a SIM module of a mobile communication service to be used on the UICC card at a user-desired time point. According to some embodiments of the disclosure, the UICC card may download and install a plurality of SIM modules and may select and use only one SIM module from among them. The UICC card may be fixed or may not be fixed to a terminal. In particular, a UICC fixed to and used in a terminal is referred to as a eUICC.

Hereinafter, UICC cards that are fixed or are not fixed to a terminal, the UICC cards being from among UICC cards that can remotely download and select a SIM module, are collectively described as a eUICC, and the SIM module that is remotely downloaded may be referred to as an eSIM. Also, SIM module information to be downloaded is described as a eUICC profile, an eSIM Profile, or a Profile. Also, in the specification below, a communication service provider may be interchangeably used with the terms including a service provider, a communication service provider, or a mobile carrier service provider. For convenience of description, terms and names defined by the GSMA standard are used for a eUICC. However, the disclosure is not limited to the terms and names, and may be equally applied to systems following other standards.

The Open Connectivity Foundation (OCF) is an organization that provides interoperability between IoT terminals and promotes technical standards. The OCF defines protocols, operational frameworks, or the like for the interoperability, regardless of manufacturers of IoT terminals, software, etc. The OCF defines resource-based operational frameworks, and entities in actual platforms are represented as resources. The OCF may discover devices or detect physical resources of an OCF, thereby determining an OCF function that is supported by a particular terminal. An OCF terminal may serve as one or more roles from among a client, a server, and an intermediary, and according to a role, the OCF terminal may be described as an OCF client, an OCF server, or an OCF intermediary. An OCF client may initiate a transaction, and may access a server so as to obtain a service. The OCF server may host resources and may provide a service responded and requested by the OCF client. The OCF intermediary may provide an intermediation operation when the intermediation operation such as protocol conversion which is necessary for message transmission is required when a message is transferred between a client and a server. The resources hosted by the OCF server represent one entity in an actual product. For convenience of description, terms and names defined by the OCF standard are used. However, the disclosure is not limited to the terms and names, and may be equally applied to systems following other standards.

The GSMA defines an interface between an application and an LPA within one terminal, whereas the OCF defines an interface for transmission of messages between an OCF application of an IoT terminal and an OCF application of a primary terminal. In the specification below, the primary terminal, a primary device, a mediator, an OCF client, an enroller, and a mobile device may be interpreted as a terminal for processing a user interface (UI) and providing IP connectivity for communication opening of an IoT terminal, and a representative terminal thereof may be a smartphone. Also, an auxiliary terminal, a secondary device, an OCF server, an enrollee, an (eSIM) IoT terminal, and an (eSIM) IoT Device may be interpreted as a terminal that cannot independently open communication by downloading a standard-based profile. A representative terminal thereof may be a watch, a dog collar, a pet-cam, or the like in which an eSIM is embedded.

As described above, technical problems of the disclosure are to provide a method and apparatus by which an eSIM IoT terminal can download and install an eSIM profile package and open communication to provide a communication service, in a manner that a primary terminal and the eSIM IoT terminal use the OCF standard as an interface.

To this end, the disclosure includes methods below.

According to an embodiment of the disclosure, the primary terminal may perform a device discovery procedure and then discover an IoT terminal supporting the OCF, may access the IoT terminal, and may obtain capability of the IoT terminal and resources stored in the IoT terminal.

According to another embodiment of the disclosure, the primary terminal may detect information from preset information obtained from the IoT terminal, the information indicating that the IoT terminal is an eSIM IoT terminal, and may generate and display a UI for subscribing a communication service and processing communication opening.

According to another embodiment of the disclosure, the primary terminal may obtain preset information by exchanging messages with the eSIM IoT terminal, the preset information being necessary for requesting a service provider for generation of an activation code, may transfer the preset information to the service provider, and then may be issued the activation code.

According to another embodiment of the disclosure, the primary terminal may generate or select access point (AP) information to be used in an eSIM setup procedure, based on a condition designated by the eSIM IoT, and may transfer the AP information to the eSIM IoT terminal.

According to another embodiment of the disclosure, when the primary terminal operates at an AP (e.g., Wi-Fi hotspot or Bluetooth tethering), the primary terminal may identify whether there is a terminal accessing in a procedure for performing eSIM Easysetup from among terminals attempting to access, and may continue a previous session.

According to another embodiment of the disclosure, in a procedure for connecting an existing eSIM Easysetup process and downloading a profile, when the eSIM IoT terminal needs an operation to be processed by the primary terminal, the operation including an interaction with a user, the eSIM IoT terminal may perform callback to allow the primary terminal to perform the operation.

According to another embodiment of the disclosure, when the primary terminal recognizes that an eSIM Easysetup process is completed in the eSIM IoT terminal, the primary terminal may release software enabled access point (SoftAP) connection between the primary terminal and the eSIM IoT terminal, and may allow the eSIM IoT terminal to selectively access an adjacent AP.

FIG. 1 illustrates a relation between an OCF module and a GSMA module.

An OCF framework is positioned between a transport layer and a profile layer. Accordingly, the OCF framework may guarantee mutual compatibility in any communication scheme, e.g., Bluetooth, Wi-Fi, or the like. The OCF standard may be designed in Representational State Transfer (RESTful) software architecture, and may define and use Create, Retrieve, Update, Delete, and Notify (CRUDN) functions. An OCF server 100 may host data bundles defined as resources. An OCF client 110 may perform a Request( ) 120 for one of CRUDN with respect to the resources hosted by the OCF server 100. Also, the OCF server 100 may collect the request of the OCF client 110 in an autonomous way or via communication with other module in a terminal, and may transmit Response( ) 140 of the collected content in the form of resources to the OCF client 110. In the disclosure, the eSIM IoT terminal may operate as the OCF server 100 and may have embedded therein an LPA 170 and a eUICC 180. Also, in a case where processing 130 with respect to the request of the terminal such as a smartphone that operates as the OCF client 110 relates to downloading and management of a profile, the eSIM IoT terminal may perform message exchanges 150 and 160 with the LPA 170, based on the GSMA Remote SIM Provisioning (RSP) protocol, wherein the LPA 170 is an eSIM access/control software module defined in the GSMA.

The LPA 170 may perform message exchange via an interface of the OCF server 100, but the OCF server 100 cannot directly access and communicate with the eUICC 180 or an SM-DP+server 190.

Figure 2:
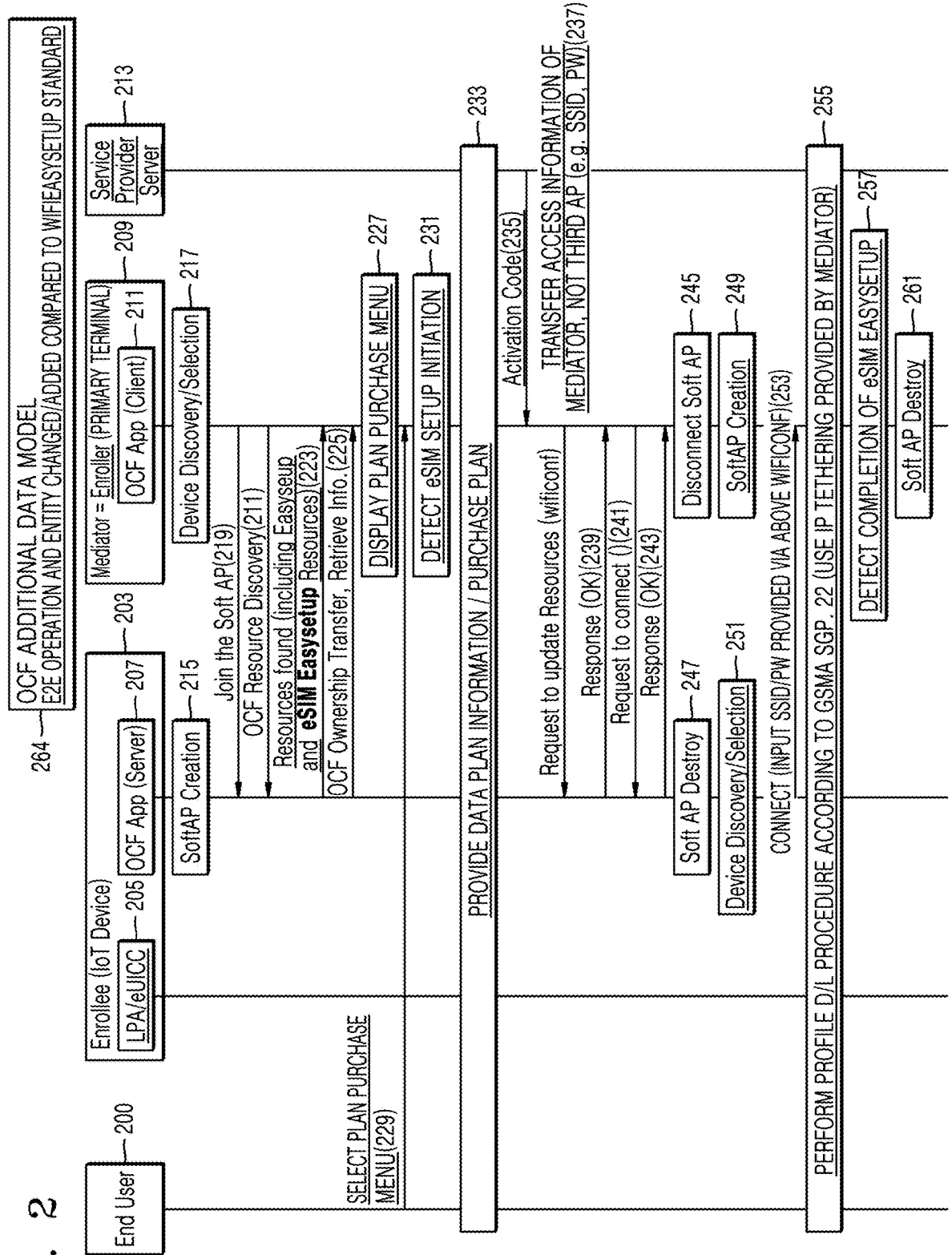
FIG. 2 illustrates an overall procedure for providing opening of communication for an embedded Subscriber Identity Module Internet of Things (eSIM IoT) terminal by using the OCF standard, according to an embodiment of the disclosure.

FIG. 2 illustrates an overall procedure for providing opening of communication for the eSIM IoT terminal by using the OCF standard, according to an embodiment of the disclosure.

An end user 200 denotes a user who attempts to open a communication service in the eSIM IoT terminal. In the OCF standard, an Enrollee 203 refers to a terminal that requires configuration and network access. In general, the Enrollee 203 refers to the terminal that is first unboxed after the purchase and thus requires service provisioning and configuration. In the disclosure, the Enrollee 203 is an IoT terminal having embedded therein an eSIM and thus may be described as an eSIM IoT terminal or an IoT terminal. In the OCF standard, an Enroller 209 refers to a primary terminal that provides a network to the Enrollee 203. In the OCF standard, a Mediator 209, as an intermediary between the Enrollee 203 and the Enroller 209, is an entity that transfers network access information from the Enroller 209 to the Enrollee 203. The eSIM IoT terminal may include an LPA/eUICC 205 and an OCF application 207 so as to download a profile. The LPA indicates a Local Profile Agent that is a software module for controlling access control and authority management with respect to the eUICC. The LPA may communicate with the eUICC, and may request the eUICC for information requested by the OCF application 207 or collect the information through a particular operation in the eSIM IoT terminal and then may respond to the OCF application 207. In general, the Enrollee 203 (also referred to as an OCF Enrollee) may operate as an OCF server. The primary terminal 209 that is the Mediator and operates as the Enroller implements an OCF application (OCF App) 211 including interaction with the user, and in general, the OCF application 211 may operate as a client.

The OCF App 211 in the primary terminal 209 indicates an application that supports an OCF function. The application that supports an OCF function may be an application of a communication service provider or a third service provider, the application including an OCF Client function. In a case where the application that supports an OCF function is an application of a service provider which includes an OCF Client function, data plan information that can be subscribed by the IoT terminal, subscriber authentication information, or the like may be processed via the web portal of the service provider which interoperates with the application. The OCF application (OCF App) 207 in the Enrollee 203 may operate as a server configured to collect necessary values through an internal operation of the eSIM IoT terminal (e.g., to collect eUICC information by interoperating with the LPA), in response to a request command of the OCF Client, and to transfer the values.

In an operation, performed by a terminal, of selecting a plan and directly providing a communication opening service, the primary terminal 209 may transfer AP information of the primary terminal 209 to the Enrollee 203 and may simultaneously provide a communication network to the Enrollee 203 and thus may operate as an Enroller. In the disclosure, in a case where a primary terminal is described as an Enroller, the primary terminal may operate not only as the Enroller but may also operate as a Mediator. A Service Provider Server 213 collectively refers to a server of a service provider providing a communication service opening service, the server processing subscription, authentication, and payment related to a communication service, and issuing an activation code. The server may be configured of one server or a bundle of different servers.

Hereinafter, all operations will now be described with an example of a scenario where the End User 200 purchases and unboxes the eSIM IoT terminal 203. When the End User 200 unboxes and turns on power of the eSIM IoT terminal 203, the eSIM IoT terminal 203 may create SoftAP and may transmit a signal (operation 215). Also, the eSIM IoT terminal 203 may generate a beacon by using the Bluetooth Low Energy (BLE) or Bluetooth (BT) technology and may transmit the beacon. The End User 200 may execute the OCF App 211 for managing an IoT terminal in the primary terminal 209 (e.g., a smartphone), and the primary terminal 209 may collect AP information by scanning surroundings, may detect that the IoT terminal supports the OCF standard, based on terminal identification information (e.g., a service set identifier (SSID) and a terminal name) being collected and displayed on the primary terminal 209 and information transmitted via the beacon, and may detect that the IoT terminal is an unboxed terminal for which an Easysetup procedure is required (operation 217). Identifier information identifying Easysetup from among Easysetups may be added to the information transmitted via the beacon. When the primary terminal 209 detects the IoT terminal, the primary terminal 209 may attempt to access a corresponding OCF terminal, in response to selection by the End User 200 or setting of the primary terminal 209 (operation 219). In order to approve the access, various security authentication methods defined in the OCF standard (e.g., an IoT terminal generates a random personal identification number (PIN) and inputs corresponding information to a primary terminal and thus an approval is performed) are used in the OCF terminal.

When the primary terminal 209 joins an AP of the IoT terminal 203 (operation 219), the primary terminal 209 may collect a list of resources provided by the IoT terminal 203 (operation 221). The primary terminal 209 may detect, from the list, whether (Wi-Fi) Easysetup and eSIM Easysetup are supported. Also, the primary terminal 209 may check whether the IoT terminal 203 is an eSIM terminal by identifying a device type of the OCF terminal. In a case where the primary terminal 209 determines that the eSIM Easysetup is supported, based on the list of resources of the IoT terminal 203, and detects that the IoT terminal 203 requires an initial setup, based on particular identification information (e.g., an Easysetup identifier included in the beacon) obtained from the IoT terminal 203, the primary terminal 209 may additionally configure a button of "communication service plan purchase" and display the button on a UI of a screen (operation 227). In this regard, in a case where the End User 200 does not select the button of "communication service plan purchase", when the primary terminal 209 is connected with the IoT terminal 203 at a later time and checks resources, even when Wi-Fi Easysetup Resouce is displayed on the list, the primary terminal 209 does not generate the button and may allow purchasing a communication service to be selected from a separate menu. Afterward, when the End User 200 purchases plan, a menu access guide may be provided on a UI. When the End User 200 selects a plan menu purchase (operation 227), the primary terminal 209 detects eSIM Setup initiation (operation 231) and may configure sequential operations necessary for the primary terminal 209. A time point when the primary terminal 209 detects the eSIM Setup initiation (operation 231) may be processed to be a time point when an activation code is obtained by the primary terminal 209 (operation 255). When the primary terminal 209 detects the eSIM Setup, the primary terminal 209 may change configuration about AP information into primary terminal's AP information, the AP information being to be transferred during Wi-Fi Easysetup until an eSIM Setup procedure is completed, and may detect that a plurality of pieces of additional information to be used in a connect operation (operation 253) have to be obtained before SoftAP connection is released (operation 245) and thus may perform an additional operation.

The primary terminal 209 may connect to a web portal of a service provider and may perform a procedure for providing available rate plans and purchasing a rate plan (operation 233). Detailed descriptions thereof will be provided below with reference to FIG. 3. Afterward, when a procedure for purchasing a communication service is completed in an application, the service provider may transfer an activation code to the application (operation 235). The activation code may be defined based on the GSMA standard, and may include a SIM server address and a token value as ID matched to corresponding subscription.

The primary terminal 209 may request the eSIM IoT terminal 203 to update a current WiFi Conf value of the eSIM IoT terminal 203 by using AP information of the primary terminal 209 to provide initial connectivity to the eSIM IoT terminal 203 to download a profile (operation 237). The OCF App 207 of the eSIM IoT terminal 203 may transfer, as a response, a processing result with respect to the request (operation 239). The primary terminal 209 may command access based on the corresponding AP information, by using a connect command (operation 253). When the eSIM IoT terminal 203 transmits information indicating reception of the connect command (operation 243), the primary terminal 209 and the eSIM IoT terminal 203 may disconnect SoftAP connection (operations 245 and 247).

The primary terminal 209 may create SoftAP to provide IP Connectivity (operation 249) and then may transmit a signal. In the disclosure, a method of providing IP Connectivity in relation to Wi-Fi is described, but, in a case where Bluetooth tethering information is transferred as Easysetup information and a primary terminal supports a Bluetooth service profile for support of Bluetooth-based IP Connectivity, Bluetooth-based IP tethering may also be used.

The IoT terminal 203 may discover adjacent AP information by using received Wi-Fi configuration (Wi-Fi Cone information (e.g., SSID/PW), and may attempt to connect (operation 253) to a matched AP (operation 251). In order for the primary terminal 209 to identify whether connection being attempted by a terminal is OCF connection of a terminal that previously processed eSIM Easyseup, the primary terminal 209 may identify the connection by additionally using preset information used in the previous connection or using information of a token transmitted before disconnection of the previous connection, and then may allow connection and establish a session. A method of re-allowing connection will be described in detail with reference to FIGS. 8 to 11. When the IoT terminal 203 accesses the primary terminal 209 and connects to a previous session, the IoT terminal 203 may perform a profile download (D/L) procedure according to the GSMA SGP.22 via provided IP Connectivity (operation 255). A procedure thereof will be described in detail with reference to FIG. 4.

When the primary terminal 209 receives, from the eSIM IoT terminal 203, information indicating that the profile D/L procedure is completed or a profile is enabled after the completion, the primary terminal 209 may detect that an eSIM Easysetup procedure is completed (operation 257), and may terminate IP tethering/hot spot (operation 261). Afterward, when processing of Wi-Fi Easyseup is requested, a general operation—that is, a process of scanning AP information of a nearby wireless router, transferring the AP information to an IoT terminal, and allowing the IoT terminal to access an AP of the wireless router by using the AP information—will be performed. Wi-Fi AP information of the primary terminal may be discarded because it is not necessary for the IoT terminal to keep the information. For example, in a case where Wi-Fi Conf Resource additionally includes an indication indicating it is for eSIM Provisioning, when the profile D/L procedure is completed, the Wi-Fi Conf information may be deleted.

Blue-marked parts in FIG. 2 indicate End to End operation and entities that are changed or added, compared to the current OCF Wi-Fi Easysetup standard, and red-marked eSIM Easysetup indicates an additional data model 264. The eSIM Easysetup denotes a bundle of resources that are newly defined to download a profile to an eSIM, and when the corresponding resource is found when scanning resources of the IoT terminal, the primary terminal may detect that the IoT terminal includes an eSIM. Also, by changing a property (a data value) defined in the resource, the IoT terminal may identify initiation or end of an operation of downloading a profile to the eSIM which is defined in the OCF standard.

For example, the resource for the eSIM Easysetup may include a plurality of pieces of information below (operation 223). In the below descriptions, RSP denotes Remote SIM Provisioning, Conf denotes Configuration, ES9+, ES10, and ESeu denote LPA—SM-DP+, LPA-eUICC, an interface between LPA and End User, respectively.

A plurality of pieces of information that are transferred as eUICC information and Device Information for RSP are defined in the GSMA standard. The information of Device Information for RSP may include a wireless access technology supported by the IoT terminal, Release information, International Mobile Equipment Identity (IMEI), Type Allocation Code (TAC), or the like which is a production number of the IoT terminal. The eUICC information may include information such as a eUICC available memory, version information, RSP capability, profile policy rules, or the like. Confirmation Code refers to a password for enabling an eSIM, the password being requested by some communication service providers. Each of resources may be represented in a data form below defined according to an OCF standard resource format, and may include properties below, but the disclosure is not limited thereto.

| Resource Name | Supported Interface | URI | ResourceType | CRUDN permission |
|---|---|---|---|---|
| eSIMEasySetupConfiguration | Baseline | /eSIMEasySetupResURI | oic.r.esimeasysetup | RU |

| Property Title | Property Name (key) | Value type | Access Mode | Mandatory | Description |
|---|---|---|---|---|---|
| Last Error Code | lec | Integer | R | Yes | Last Error Code (e.g., ES9+ Error, ES10 Error, ESeu Error) |
| Last Error Reason | ler | String | R | Yes | Last Error Reason (RSP Error Code String returned by SM-DP+ or eUICC) |
| Links | links | array | R | Yes | Array of web links |

| Resource Name | Supported Interface | URI | ResourceType | CRUDN permission |
|---|---|---|---|---|
| RSPCapabiiityConfiguratin | Baseline | /RSPCapabilityConfResURI | oic.r.rspcapabilityconf | RU |

| Property Title | Property Name (key) | Value type | Access Mode | Mandatory | Description |
|---|---|---|---|---|---|
| eUICC information | euiccinfo | String | R | Yes | As defined by GSMA, eUICC information includes profile package version, spec version number, UICC capabilities, etc |
| Device Information for RSP | deviceinfo | String | R | Yes | As defined by GSMA, Remote SIM Provisioning associated device information is needed. And it includes TAC, Radio access technology, etc |

| Resource Name | Supported Interface | URI | ResourceType | CRUDN permission |
|---|---|---|---|---|
| RSPConfiguration | Baseline | /RSPConfResURI | oic.r.rspconf | RU |

| Property Title | Property Name (key) | Value type | Access Mode | Mandatory | Description |
|---|---|---|---|---|---|
| Activation Code | ac | String | RW | Yes | It is the Information needed for Remote SIM Provisioning of an eSIM IoT device, As defined by GSMA, Activation Code Including SMDP server URL, and Activation Code token as a matching ID |
| Profile Metadata | pm | String | R | Yes | As defined by GSMA, Profile mefadafa is including information such Service Provider Name, ICCID (profile ID), and Profile Policy Rule |
| End User Confirmation | euc | Integer | RW | Yes | End User Confirmation 1. Profile D/L Reject 2. Profile D/L Postpone 3. Profile D/L OK 4. Profile D/L and enable OK |
| Confirmation Code | cc | String | RW | No | Confirmation code requested by a specific operator |
| Confirmation Code Required | ccr | Boolean | R | Yes | Confirmation code required profile to download |

| Resource Name | Supported Interface | URI | ResourceType | CRUDN permission |
|---|---|---|---|---|
| RSPstatusConfiguration | Baseline | /RSPStatusConfResURI | oic.r.rspstatusconf | RUN |

| Property Title | Property Name (key) | Value type | Access Mode | Mandatory | Description |
|---|---|---|---|---|---|
| RSP Procedure Status | ps | Integer | R | Yes | Steps in Remote SIM Provisioning and associated profile status: initiated, user confirmation pending, downloading, installed |

Figure 3:
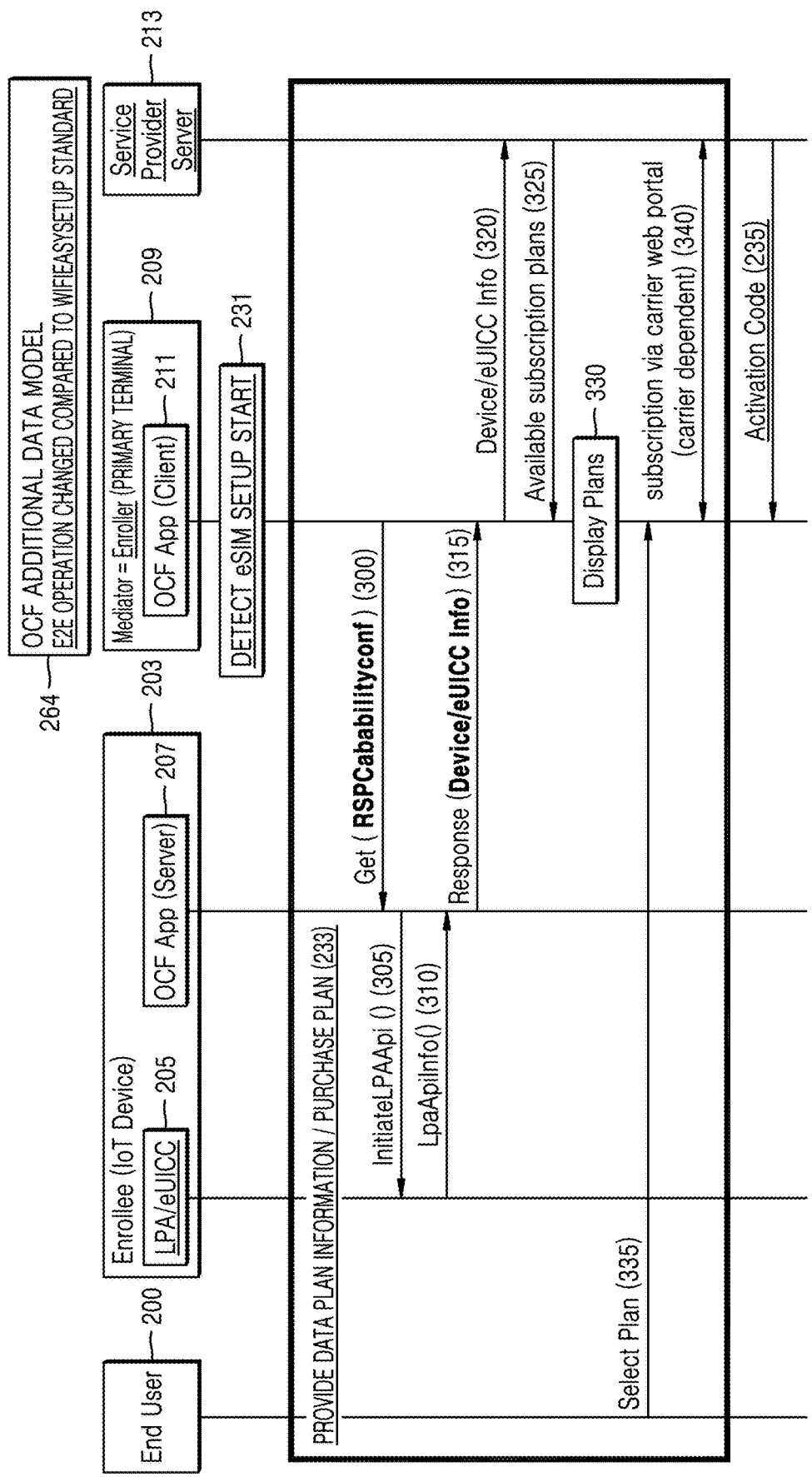
FIG. 3 is a diagram particularly illustrating an operation related to data plan information provision/plan purchase of FIG. 2 described above.

FIG. 3 is a diagram particularly illustrating an operation related to data plan information provision/plan purchase of FIG. 2 described above.

When the end user 200 requests a plan purchase and thus eSIM Setup initiation is detected (operation 231), the OCF App 211 of the primary terminal 209 may request the OCF App 207 of the eSIM IoT terminal 203 for information of the eSIM IoT terminal 203 and eUICC information. Upon reception of the request, the OCF App 207 of the eSIM IoT terminal 203 may call InitiateLPAApi( ) defined in the GSMA standard via an LPA (operation 305), and the LPA may collect Device and eUICC information by using LpaApiInfo( ) of the OCF App 207 via communication with a eUICC and may transfer the collected information (operation 310). The OCF App 207 may transfer data thereof to the OCF App 211 of the primary terminal 209 by using an OCF protocol (operation 315). The delivered Device/eUICC information is transferred to a server of a communication service provider (operation 320), and the communication service provider may determine whether there is a communication service being available for the eSIM IoT terminal 203, based on the transferred Device/eUICC information, may select plan information, and may transfer the plan information as a response to the OCF App 211 of the primary terminal 209 (operation 325). The plan information may be displayed on a UI of the primary terminal 209 (operation 330). When the end user 200 selects a plan to use in the plan information by clicking a menu (operation 335), the primary terminal 209 may connect to a web portal of the communication service provider, and may perform a series of processes for subscription and then may complete the subscription (operation 340). For example, subscriber identity authentication using ID/PW or SIM information of the primary terminal 209, and a contract and payment processing for a service purchase may be performed. When all processes are completed, the server of the communication service provider may issue an activation code (operation 235).

Figure 4:
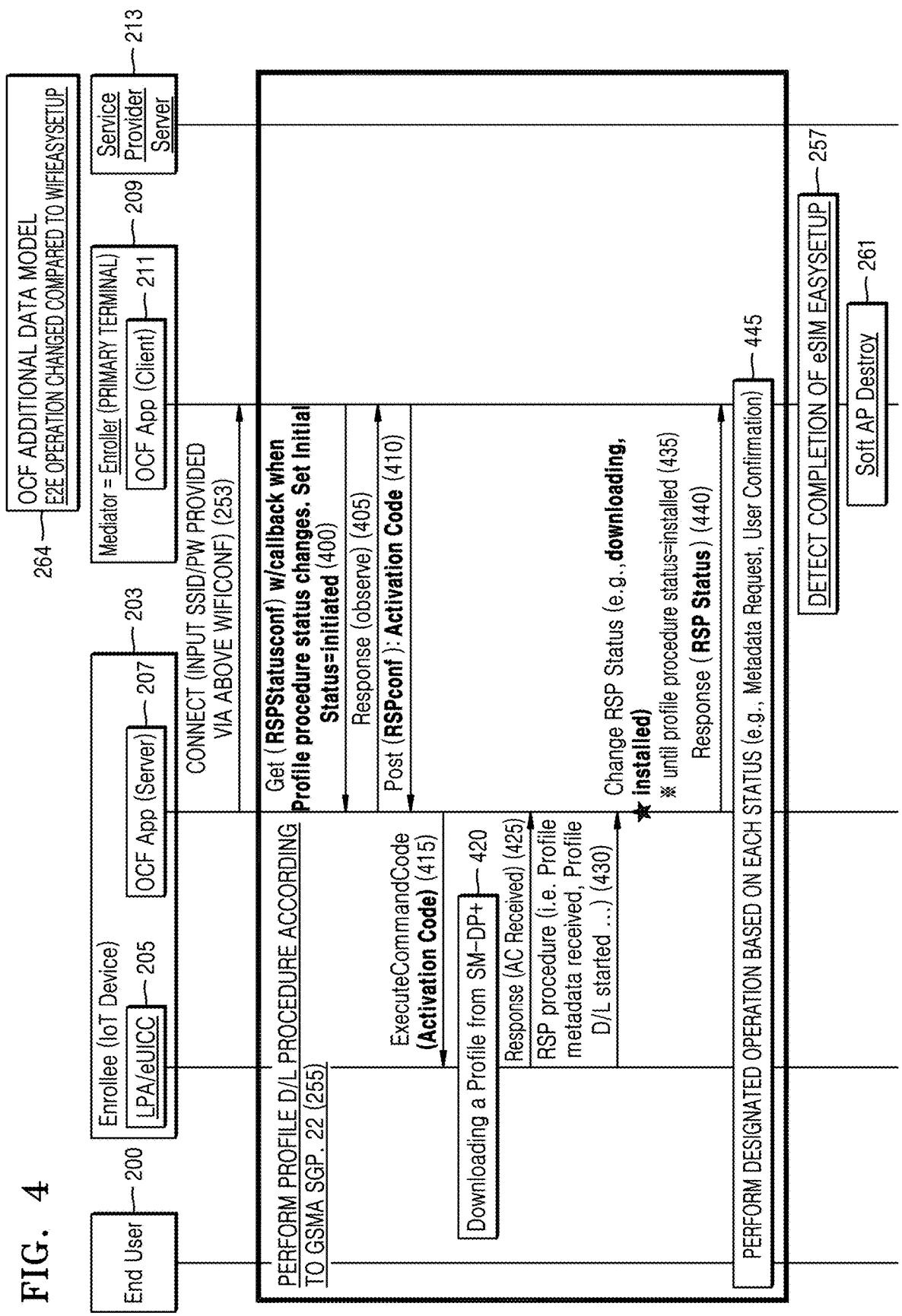
FIG. 4 is a diagram particularly illustrating an operation of performing the profile download (D/L) procedure according to the GSMA SGP.22 of FIG. 2 described above.

FIG. 4 is a diagram particularly illustrating an operation of performing the Profile D/L procedure according to the GSMA SGP.22 of FIG. 2 described above.

The IoT terminal 203 may resume a previous eSIM Easysetup session based on the OCF standard (operation 253) by accessing an AP of the primary terminal 209 based on SSID/PW information received from previous connection and performing an additional OCF terminal authentication process (operation 253). When re-connected, the primary terminal 209 may request the eSIM IoT terminal 203 for Get (RSPStatusconf) (operation 400), and at this time, an identifier with respect to an initial status of a RSP status and an observe function may be transmitted by being added to the request. In this regard, the OCF App 207 of the eSIM IoT terminal 203 may transmit a response message with respect to performing of the observe function (operation 405), and thus may indicate to call back a change in values of RSPStatusConf to the primary terminal 209 Afterward, the OCF App 211 may transfer the activation code to the OCF App 207 of the eSIM IoT terminal 203 by using an OCF protocol (operation 410), and the OCF App 207 may transfer an ExecuteCommandCode (Activation Code) defined in the GSMA standard to an LPA 205 (operation 415), such that the LPA 205 that received the ExecuteCommandCode (Activation Code) may initiate a profile download procedure defined in the GSMA SGP.22 via communication with a eUICC and SM-DP+. The LPA 205 that received the ExecuteCommandCode (Activation Code) may transfer an indication indicating reception of the activation code to the OCF App 207.

The LPA 205 may transmit a response to a necessary time point of a user's interaction that is normally requested in the profile download procedure, to the OCF App 207 at every status. When the OCF App 207 receives the response, the OCF App 207 may update a property value of RSPStatus Resource and then may notify the update to the OCF App 211.

Based on a value of a change in each status, the OCF App 211 of the primary terminal 209 may perform a designated operation requested for the primary terminal 209 to process, and may transfer and process a resultant value of the processing to the OCF App 207 of the eSIM IoT terminal 203. For example, when the LPA 205 transfers the activation code to SM-DP+ that is a profile server, the SM-DP+ may transfer profile metadata to the LPA 205 and may request verification of the end user 200 with respect to the profile metadata based on the standard. Thus, when the LPA 205 receives the profile metadata from the SM-DP+, in the eSIM IoT terminal 203, the LPA 205 may notify the OCF App 207 that the profile metadata is received and user's verification is required, and upon reception of the notification, the OCF App 207 may change a value of a RSP Status and may notify the change to the OCF App 211 of the primary terminal 209. The OCF App 211 of the primary terminal 209 may detect the value of the change in the RSP Status, and may perform a pre-designated procedure on the primary terminal 209, in response to the changed RSP Status (operation 445). As an example of the pre-designated procedure (operation 445), in order for the primary terminal 209 to process the verification of the end user 200 with respect to the profile metadata, the primary terminal 209 may collect a value of the profile metadata by requesting the eSIM IoT terminal 203 for the value, may reconfigure the value, may reconfirm an agreement about the profile download procedure to the end user 200, and then may transfer a result of the reconfirmation to the eSIM IoT terminal 203, such that the LPA 205 may complete a whole procedure by performing the profile download procedure.

Figure 5:
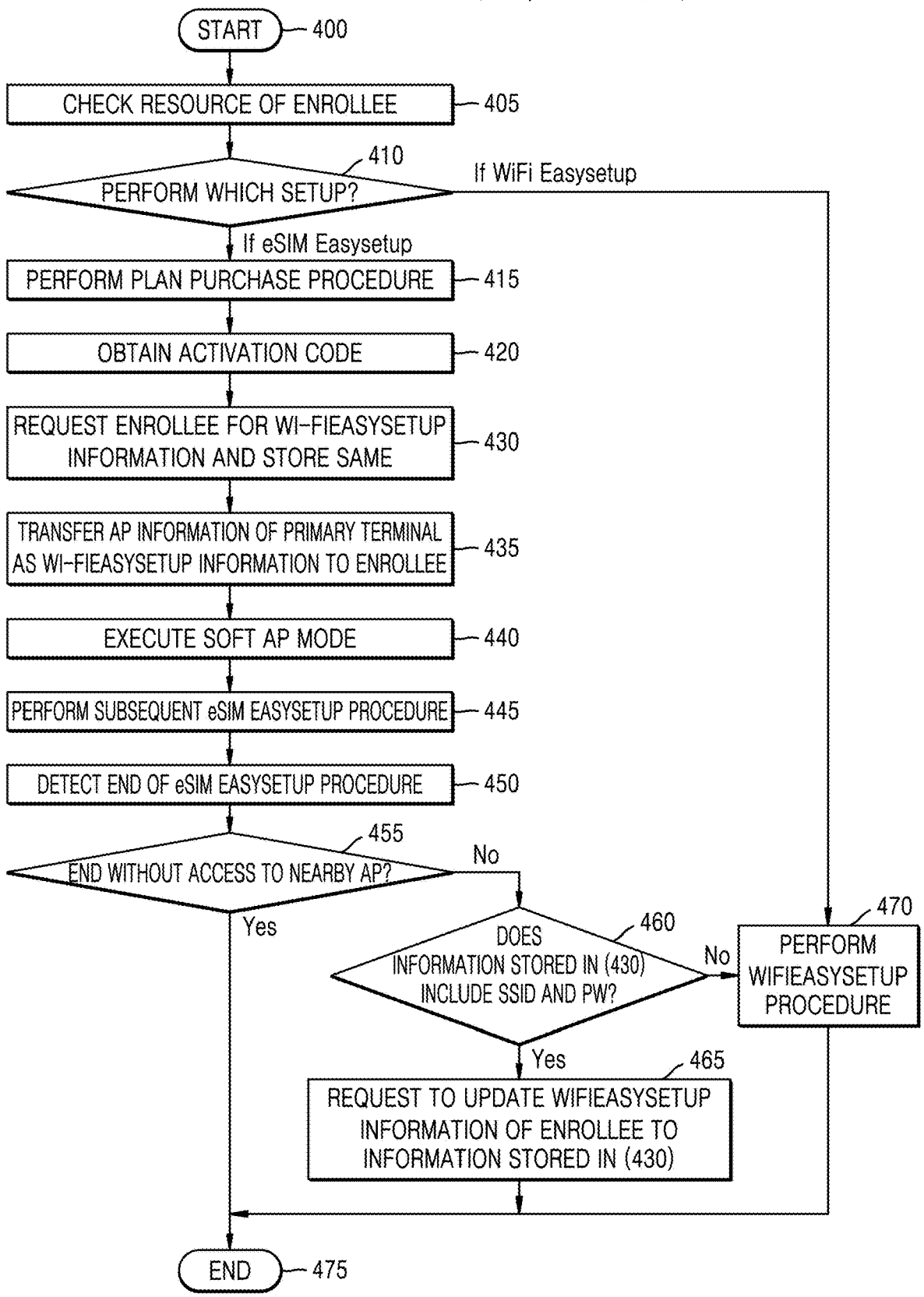
FIG. 5 illustrates a method by which a primary terminal determines whether to perform an eSIM Easysetup procedure, in consideration of a condition designated by an IoT terminal, and performs an operation thereafter.

FIG. 5 illustrates a method by which a primary terminal determines whether to perform an eSIM Easysetup procedure, in consideration of a condition designated by an IoT terminal, and performs an operation thereafter.

As described above with reference to FIG. 2, in a procedure where the primary terminal and the IoT terminal perform a discovery of a terminal and scan resources of the terminal, according to the OCF standard, the primary terminal may detect that the IoT terminal is a terminal including an eSIM and may check whether the IoT terminal can support eSIM Easysetup (operation 405).

When a particular input value, e.g., "plan menu purchase", is input from a user, a change occurs in a property value of a resource for eSIM Setup defined in the OCF standard, or the primary terminal is configured, the primary terminal may detect initiation of an eSIM EasySetup procedure in the eSIM IoT terminal (operation 410). A general (WiFi) Easysetup procedure for an OCF terminal is that the primary terminal transfers AP information of a wireless LAN router to the eSIM IoT terminal, however, when the primary terminal detects initiation of the eSIM EasySetup procedure and it is required to transfer Wi-Fi configuration information to the eSIM IoT terminal, the primary terminal may change a configuration to transfer AP information of the primary terminal until the primary terminal detects an end of the eSIM EasySetup procedure.

When the primary terminal detects that the initiation of the eSIM EasySetup procedure (operation 410), the primary terminal may connect to a web portal of a service provider and may perform a subscription to a service plan, subscriber authentication, and payment for a plan purchase procedure (operation 415), and when the procedure is completed, the primary terminal may be issued an activation code from a server of the service provider (operation 420). The activation code includes a SM-DP+ address and a token value associated with the subscription information, and when the activation code is downloaded to the primary terminal as a result of the subscription processed in a website or the web portal, the primary terminal may selectively process the activation code not to be displayed on a UI of a user terminal so as to secure the activation code.

When the primary terminal is issued and thus obtains the activation code through the web portal or an application of the service provider, the primary terminal may first request the eSIM IoT terminal for Wi-Fi Conf information stored in the eSIM IoT terminal and then may store the Wi-Fi Conf information in the primary terminal (operation 430). Afterward, the primary terminal may perform a previous Wi-Fi Conf operation and may transfer AP information (e.g., SSID, password, authentication information, etc.) of the primary terminal to the eSIM IoT terminal (operation 435). When an AP thereof is activated and thus is detected, the primary terminal may command the eSIM IoT terminal to access the detected AP. In this regard, the primary terminal may add, as an indicator, a property to a Wi-Fi configuration so as to allow the eSIM IoT terminal to recognize that the AP is one-time Wi-Fi configuration for eSIM provisioning. The eSIM IoT terminal may execute a SoftAP mode and then may perform IP hotspot/tethering (operation 440).

When the eSIM IoT terminal receives information about the AP, the eSIM IoT terminal may periodically scan the AP in a preset period of time and may attempt to access the primary terminal. As another method, the primary terminal may request an end user for IP tethering via a UI, and the end user may operate SoftAP for performing IP tethering and then may request a particular operation (e.g., a button click operation, etc.) to trigger AP scanning in the eSIM IoT terminal.

In a case where there is no terminal that accesses the SoftAP by using the transferred SSID/password during a preset time period, the primary terminal may display an error message on a UI of the primary terminal, or may perform the previous Wi-Fi Conf operation and then may transfer the AP information (e.g., SSID, password, authentication information, etc.) of the primary terminal to the eSIM IoT terminal at least a preset number of times, thereby attempting re-connection. In a case where there is no AP that is scanned based on the transferred AP information during a preset time period (e.g., when a battery of the primary terminal is dead after the AP information is transferred), the eSIM IoT terminal may display notification (e.g., flickering light, etc.) to derive an additional action of the end user. When an OCF application of the primary terminal is executed again at a later time, the OCF application may detect a not-transmitted activation code, and may determine a processing method with respect to the activation code via an interaction with the end user.

When the primary terminal is switched to a SoftAP mode and the eSIM IoT terminal accesses for IP tethering such that OCF connection for previous eSIM Setup is resumed, the primary terminal transfers the activation code as preset information for downloading a profile to the eSIM IoT terminal, such that the eSIM IoT terminal may complete a subsequent eSIM Easysetup procedure while interoperating with the primary terminal (operation 445). Descriptions about the subsequent eSIM Easysetup procedure after connection is resumed between terminals are provided above with reference to FIGS. 2 and 4, and thus are not provided here.

When the primary terminal receives (receives an indication or response), from the eSIM IoT terminal, information about a RSP procedure as indication information indicating completion of eSIM Easysetup (operation 450), the primary terminal may determine whether to release and end SoftAP, based on agreement with the end user or a setting value of the primary terminal (operation 455). In order to allow the eSIM IoT terminal to decrease power consumption or save the amount of data use, the primary terminal may allow the eSIM IoT terminal to restore the Wi-Fi Conf information stored in operation 430 (operation 465) and be default-connected to a previous wireless local area network (LAN) router, or may perform a Wi-Fi Easysetup operation, may transfer information about an AP detected from a nearby wireless router to the eSIM IoT terminal (operation 470), and then may process access to a wireless LAN AP or a mobile communication network, based on selection by the end user or a default setting in the primary terminal. When the primary terminal does not receive a message about completion of the RSP procedure during a preset time period, the primary terminal may display an error message for the end user and may restore a default setting value about Wi-Fi Conf processing.

FIGS. 6 to 10 illustrate methods of resuming pre-established connection with an OCF server when connection is re-established by changing an AP roll between terminals in a procedure where an eSIM IoT terminal and a primary terminal perform eSIM Setup. The methods to be described with reference to FIGS. 6 to 10 are not limited to the mutually exclusive use and thus may be combined with each other.

Figure 6:
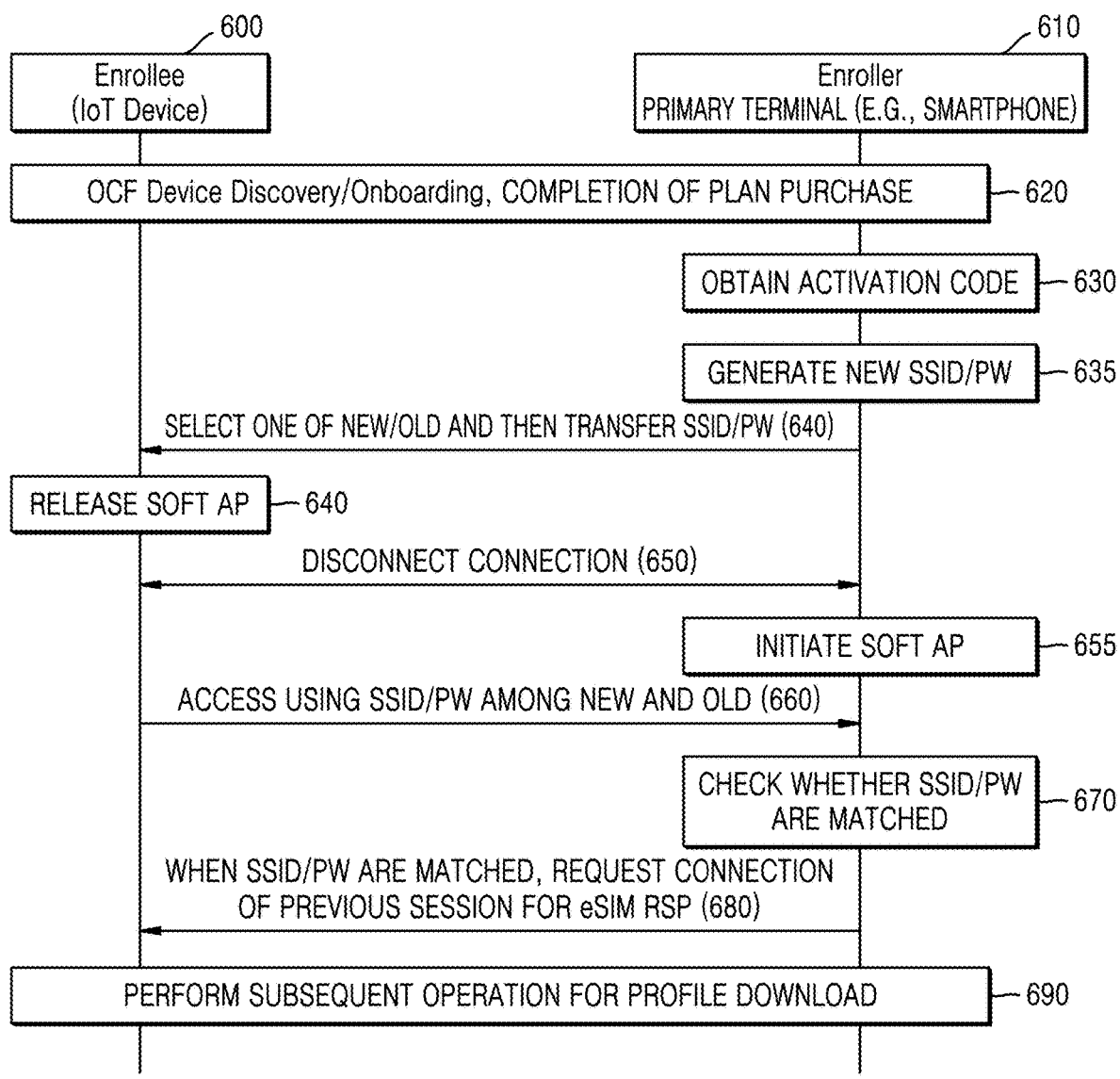
FIG. 6 illustrates a method of transferring and using a temporary service set identifier (SSID) and password.

FIG. 6 illustrates a method of resuming pre-established OCF connection by using a temporary SSID and password.

As described above, a primary terminal 610 may detect eSIM Easysetup initiation by obtaining an activation code for communication opening in an eSIM IoT terminal 600 (operation 630), and may process additional configuration for performing an eSIM Easysetup procedure.

An OCF application of the primary terminal 610 may temporarily generate and transmit one-time SSID and password by using a user input or a random-number generator (operation 635), or may select one in an existing SSID and password set and may transmit the selected one to the eSIM IoT terminal (operation 640). When the eSIM IoT terminal releases SoftAP and thus connection between terminals is disconnected (operation 650), the primary terminal 610 may execute SoftAP (operation 650). The primary terminal 610 may substitute an existing SSID and password for the temporarily-generated SSID and password and may allow an input only via the temporarily-generated SSID and password during a preset time period, or may additionally configure SSIDs and passwords to operate as if the primary terminal 610 has a plurality of APs (a virtual AP function) and thus may identify an accessing terminal.

When the temporarily generated and transmit SSID and password are used, the OCF application dose not perform a separate additional verification procedure and may detect the accessing terminal as a terminal that processed pre-established eSIM Easysetup and may connect to and process a previous application session (operation 660). When one is selected from among a plurality of lists and then is transmitted, the OCF application may additionally identify information about connected SSID/password, based on a system Application Programming Interface (API), and may use the information in resuming the application session (operation 660). When configuration information such as SSID and password is matched (operation 670), the OCF application may detect the accessing terminal as an OCF terminal that processed pre-established eSIM Easysetup, and thus may connect to a previous session (operation 680) and perform a subsequent operation (operation 690).

In a case where one-time SSID and password are generated and used and thus existing SSID and password are substituted for a preset time period, a primary terminal may restore the existing SSID and password due to when the primary terminal completes verification of a match with the existing SSID and password or due to configuration of the primary terminal, e.g., after a preset time period according to a timer after the substitution. Also, in a case where an additional SSID and password set is provided to the existing SSID and password, whether to delete the additional information may be determined based on setting of the primary terminal.

Figure 7:
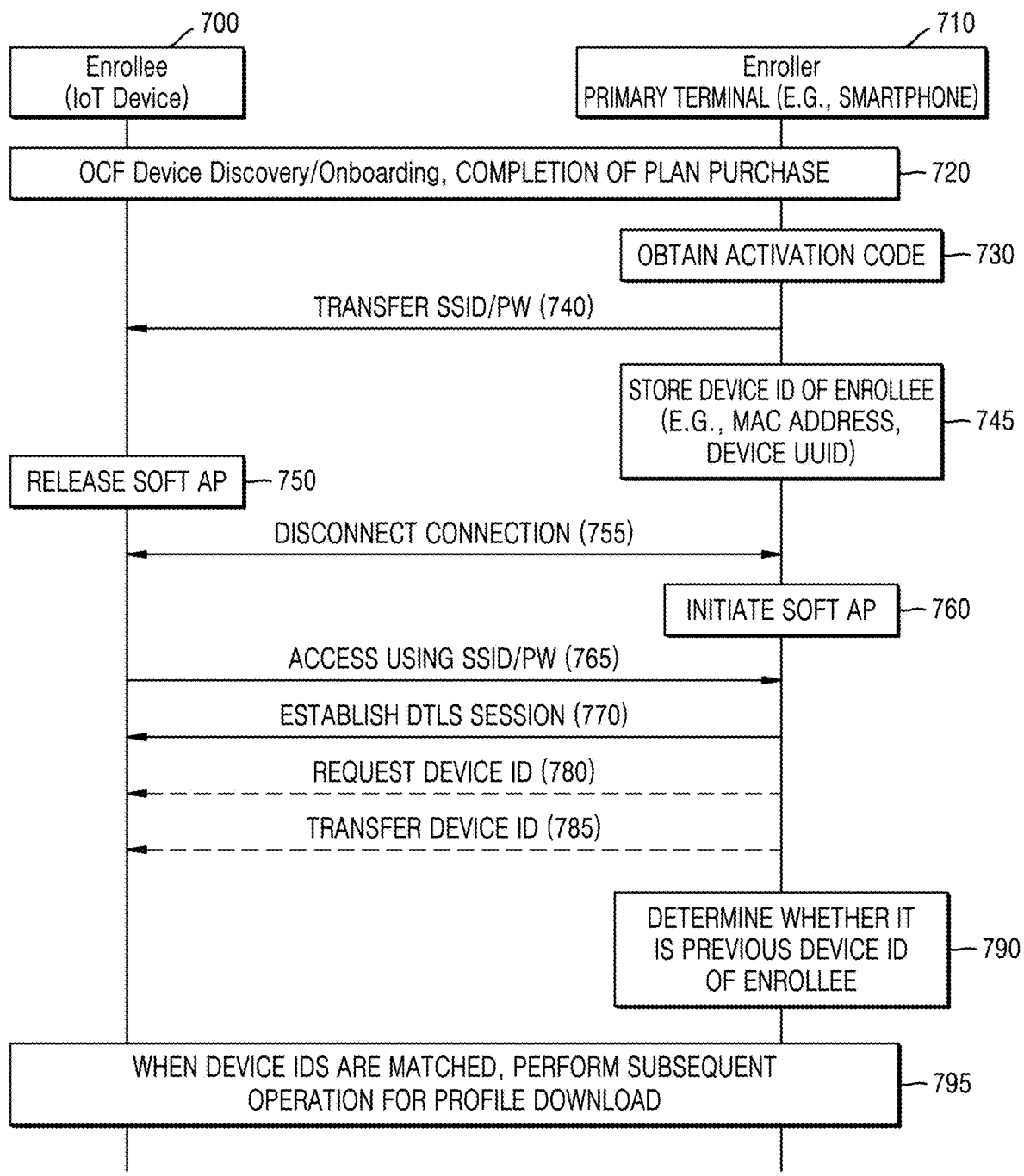
FIG. 7 illustrates a method of using Device ID obtained from previous connection between terminals.

FIG. 7 illustrates a method of resuming pre-established OCF connection by using Device ID obtained from previous connection between terminals.

As described above, a primary terminal 710 may detect eSIM Easysetup initiation by obtaining an activation code for communication opening in an eSIM IoT terminal 700 (operation 730), and may process additional configuration for performing an eSIM Easysetup procedure.

When the primary terminal 710 detects initiation of eSIM Easysetup, the primary terminal 710 may transfer access information such as SSID and password of the primary terminal 710 to the eSIM IoT terminal 700 (operation 740). Then, before the eSIM IoT terminal 700 and the primary terminal 710 release SoftAP, the primary terminal 710 may collect and store ID information of the eSIM IoT terminal 700 (operation 745). Device ID may refer to unique or temporary ID information for identifying a previous OCF device, and may include medium access control (MAC) address or Device universally unique identifier (UUID). For example, an OCF Device may have a unique terminal identification number, and ID thereof is stored in a secured area or a certificate of the OCF Device. The primary terminal 710 operating as an OCF client may collect Device UUID information by requesting RETRIVE/oic/d from the eSIM IoT terminal 700 operating as a server. Before previous connection is disconnected, the primary terminal 710 may collect and cache a MAC address of the connected eSIM IoT terminal 700 via a system API and then may use it. After connection is disconnected, when the primary terminal 710 operates as an AP (operation 760), and a terminal attempts to access the AP by using an SSID and password therefor (operation 765), the SSID and password are matched, and a Datagram Transport Layer Security (DTLS) session is established with the terminal (operation 770), an OCF application of the primary terminal 710 may request Device ID as additional information, and the terminal attempting to access may transmit Device ID, in response to the request (operation 785). The primary terminal 710 may determine whether a value of Device ID matches with a value of Device ID which is stored before the connection is disconnected (operation 790). When matched, the OCF application may detect the terminal as an OCF terminal that processed previous eSIM Easysetup, and thus may connect to a previous session and may perform a subsequent operation (operation 795).

Figure 8:
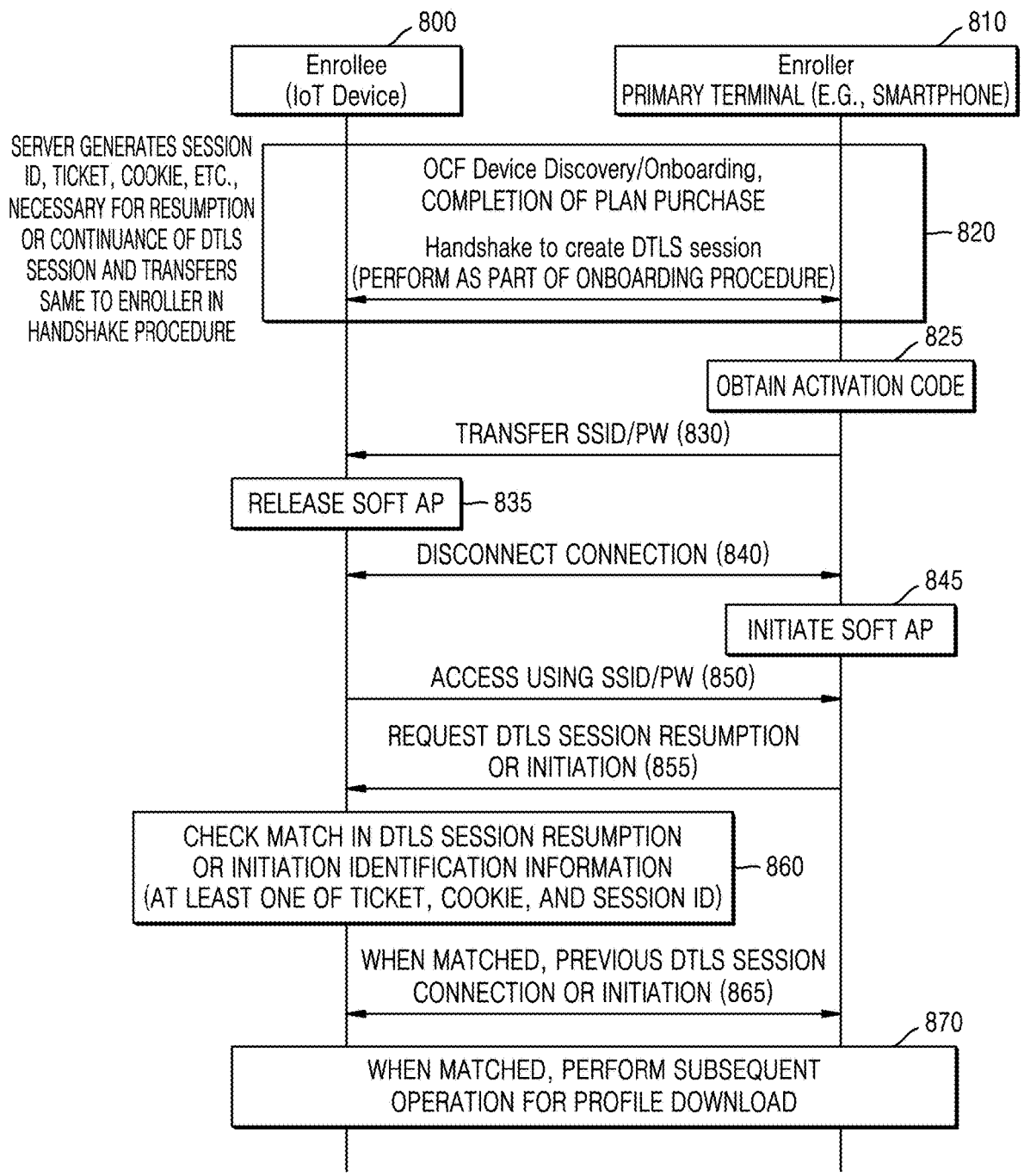
FIG. 8 illustrates a method of using information of Datagram Transport Layer Security (DTLS) handshaking previously performed to generate an OCF session between terminals.

FIG. 8 illustrates a method of resuming pre-established OCF connection by using information of DTLS handshaking previously performed to generate an OCF session between terminals.

An eSIM IoT terminal 800 and a primary terminal 810 may complete subscription to a plan for a communication service after OCF Device Discovery and Onboarding (operation 820). In the OCF standard, onboarding refers to an initial configuration method of an IoT terminal for communication and control between various terminals using different encryption functions. The IoT terminal and a primary terminal may include a series of processes (a handshake procedure) for establishment of a DTLS session (operation 820).

DTLS refers to a security protocol obtained by a Transport Layer Security (TLS) protocol to a User Datagram Protocol (UDP), the TLS protocol providing security to a Transmission Control Protocol (TCP) protocol of a transport layer. The OCF standard basically uses, as the Hypertext Transfer Protocol (HTTP), the Constrained Application Protocol (CoAP) RFC 7252 that is simplified for IoT terminals, and the CoAP protocol in the OCF standard operates on UDP/DTLS. A server in a handshake for establishment of a DTLS session may transfer preset information about a corresponding session and session resumption to a client (operation 820). For example, the server may transfer, to the client, session ID, a cookie value, or a ticket introduced for resumption of a session. When a full handshake to establish initial DTLS between both terminals is completed and then a DTLS session is established, the eSIM IoT terminal 800 and the primary terminal 810 may initiate communication via an encrypted session. The generation and use of session ID and a cookie value in the DTLS follow rules of Request for Comments (RFC) 6347 of The Internet Engineering Task Force (IETF), and descriptions about the use of the ticket refer to rules of RFC 7925 of the IETF, such that additional descriptions thereof are not provided here.

When a user completes a communication plan purchase in an application of the primary terminal 810 and an activation code is obtained (operation 825), the primary terminal 810 may transfer SSID/password information of the primary terminal 810 to the eSIM IoT terminal 800 (operation 830). The eSIM IoT terminal 800 may release SoftAP of the eSIM IoT terminal 800 (operation 835), and when the primary terminal 810 initiates SoftAP (operation 845), the eSIM IoT terminal 800 may attempt to access the SoftAP by using the transferred SSID/password information (operation 850).

When SSID/password are matched, the primary terminal 810 as an OCF client may transfer session connection information including at least one of Session ID, Cookie, or Ticket used in previous connection to the eSIM IoT terminal 800 (an OCF server), thereby resuming a previous session or requesting of session initiation. As the OCF server, the eSIM IoT terminal 800 determines a match of the transferred information (operation 860), and thus performs resumption of a DTLS session used for previous OCF Easysetup or performs session initiation to continuously proceed connection (operation 865). When matched, an OCF application of the primary terminal 810 may detect the eSIM IoT terminal 800 as an OCF terminal that processed previous eSIM Easysetup, and thus may connect to a previous session and may perform a subsequent operation (operation 870).

Figure 9:
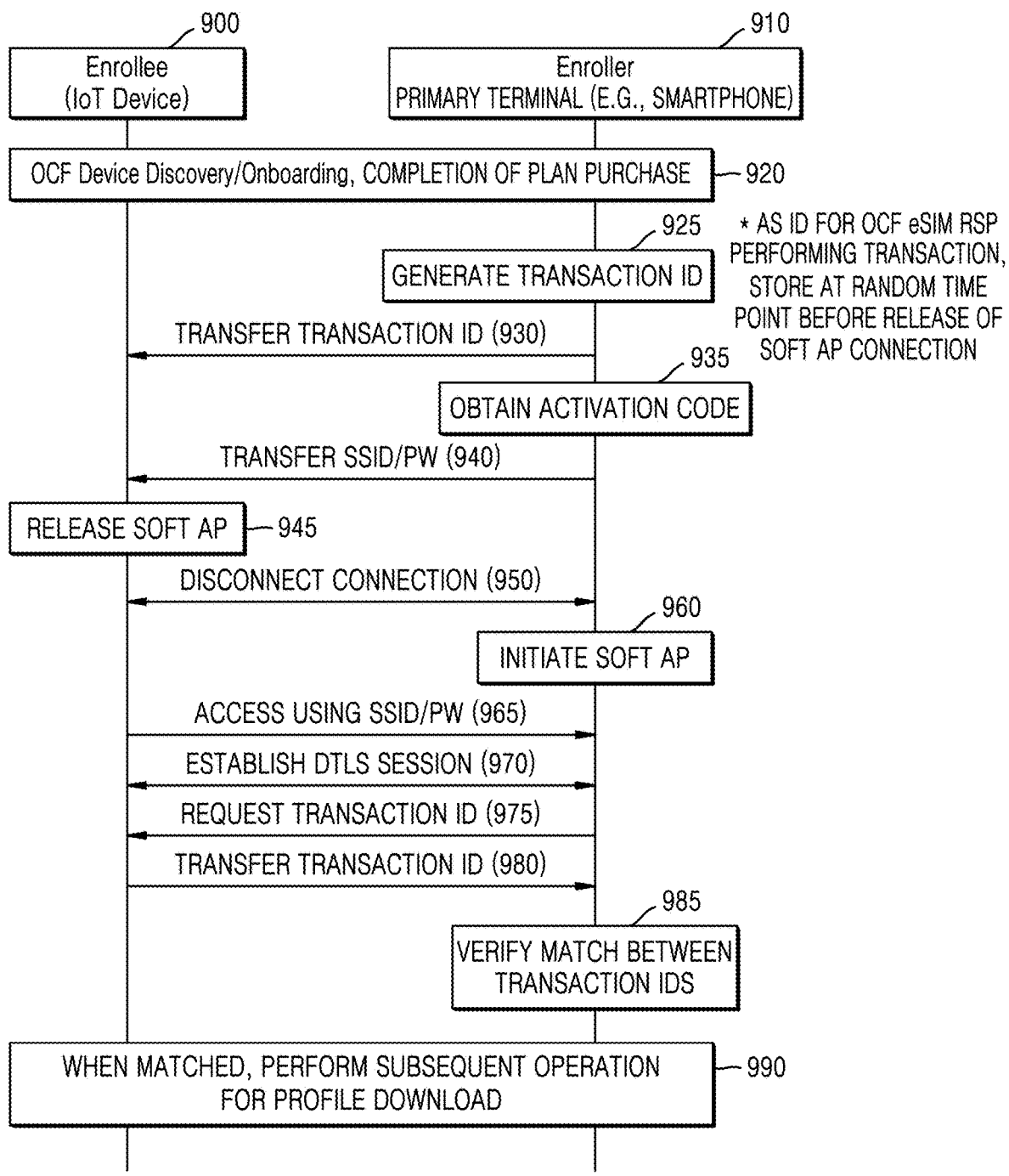
FIG. 9 illustrates a method of using Transaction ID of an application layer, the Transaction ID being newly generated and stored.

FIG. 9 illustrates a method of resuming pre-established OCF connection by using Transaction ID of an application layer, the Transaction ID being newly generated and stored.

Due to interoperation between a primary terminal 910 and an eSIM IoT terminal 900, OCF Device Discovery, Onboarding, and a plan purchase for the eSIM IoT terminal 900 may be completed (operation 920). An application of the primary terminal 910 may randomly generate and store Transaction ID as an indicator indicating transaction for opening of an eSIM profile (operation 925), and may transfer the Transaction ID to the eSIM IoT terminal 900 (operation 930). The primary terminal 910 may generate the Transaction ID at a random time point before SoftAP connection is disconnected (operation 925), and may transfer the Transaction ID to the eSIM IoT terminal 900 (operation 930) and may store it. Upon reception of the Transaction ID, the eSIM IoT terminal 900 may store the Transaction ID and may additionally provide the Transaction ID when connection between both terminals is disconnected, thereby resuming a previous session in an application. The Transaction ID may be generated in a manner that information is used as input with a security key of a terminal, the information being obtainable by the primary terminal 910 only when the primary terminal 910 and the eSIM IoT terminal 900 are connected therebetween, but the disclosure is not limited to the aforementioned generation manner. In this regard, another terminal cannot use the same Transaction ID. For example, when it is assumed that two eSIM IoT terminals perform transaction for opening of an eSIM profile, IDs have to be designated to be different from each other.

When the primary terminal 910 obtains an activation code (operation 935), the primary terminal 910 may transfer AP connection information of the primary terminal 910 to the eSIM IoT terminal 900 (operation 940). When the eSIM IoT terminal 900 receives the AP connection information, the eSIM IoT terminal 900 may release its SoftAP (operation 945) and thus connection between both terminals may be released (operation 950). Afterward, when the primary terminal 910 initiates SoftAP (operation 960), the eSIM IoT terminal 900 accesses an AP of the primary terminal 910 by using the pre-received AP connection information such as SSID/password (operation 965), and then a DTLS session is generated between both terminals (operation 970). Afterward, the application of the primary terminal 910 may identify that it is a procedure for downloading an eSIM profile and thus may request Transaction ID to resume previous communication (operation 975). Then, the eSIM IoT terminal 900 may provide Transaction ID that is previously transferred from the primary terminal 910 (operation 980). The primary terminal 910 determines whether the transferred Transaction ID matches with Transaction ID being generated and stored in previous connection (operation 985), and when matched, the primary terminal 910 resumes and processes a previous procedure for downloading a profile (operation 990). Alternately, when ID information indicating that a profile download procedure is completed in the eSIM IoT terminal 900 is received, the primary terminal 910 and the eSIM IoT terminal 900 may destroy Transaction ID.

Figure 10:
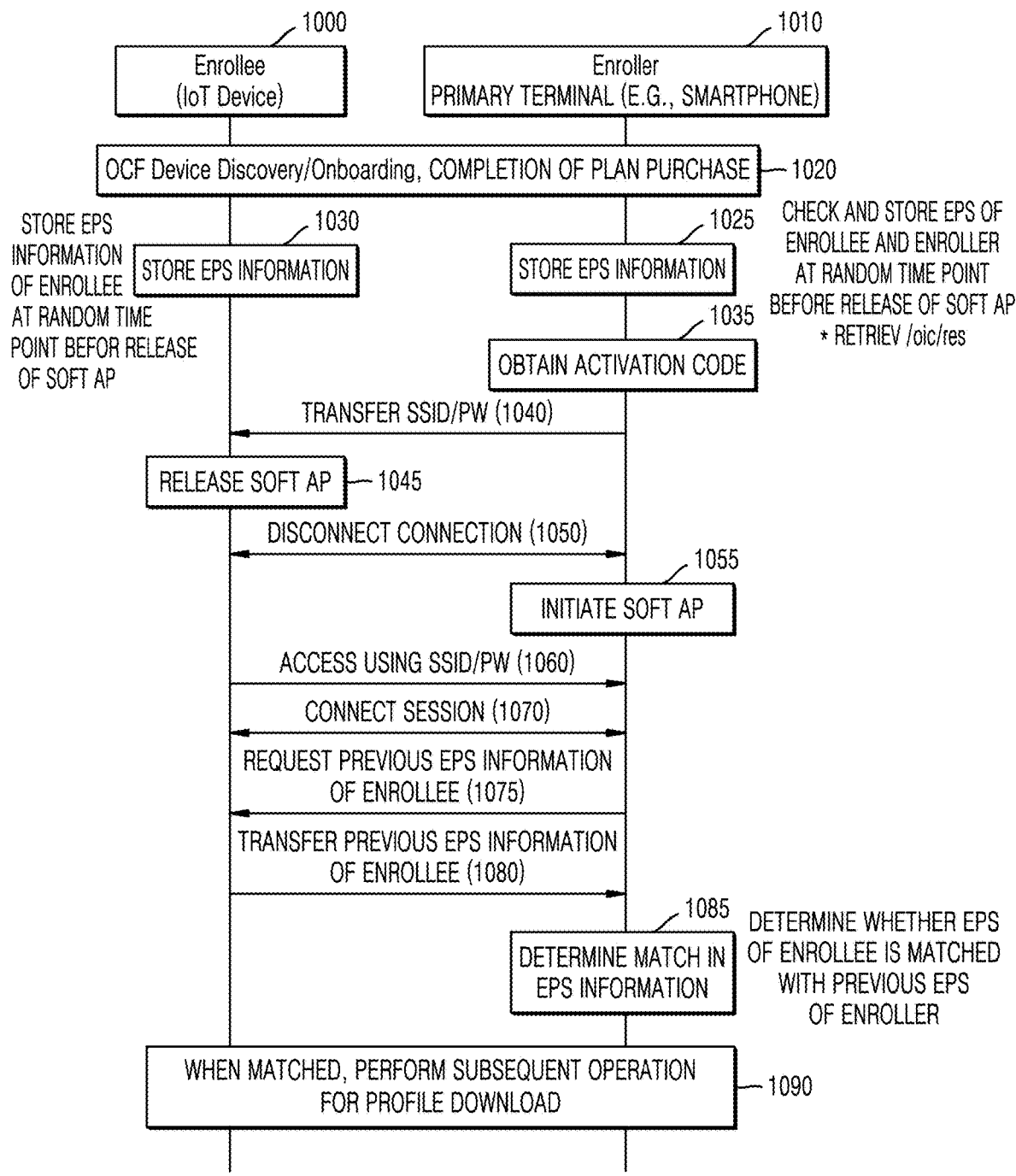
FIG. 10 illustrates a method of using previous endpoint security (EPS) information when connection is re-established between an IoT terminal and a primary terminal.

FIG. 10 illustrates a method of resuming pre-established OCF connection by using previous endpoint security (EPS)

information when connection is re-established between an IoT terminal and a primary terminal.

An OCF application defines (OCF) Endpoint that is final destination to which a request and response message are transferred in a given transport protocol suite, and this is generally called "EPS".

The EPS information represents IP address+Port Number or a domain name system (DNS) name, and may be used to detect an OCF terminal. Descriptions about EPS and a parameter defined therein refer to Endpoint Discovery of OCF Core Specification.

When an eSIM IoT terminal 1000 operates at SoftAP and performs a device discovery procedure, the eSIM IoT terminal 1000 allocates a local IP address to a primary terminal 1010 that is accessed as an AP. At a random time point before SoftAP is released between the eSIM IoT terminal 1000 and the primary terminal 1010, the eSIM IoT terminal 1000 and the primary terminal 1010 check and temporarily store EPS of both ends (operation 1025). The EPS information may be confirmed via a RETRIVE/oic/res command, and when an OCF message is transmitted, a part of the EPS information may be included therein to be transmitted, responded, and received. After a series of processes including obtainment of an activation code (operation 1035) are completed, the primary terminal 1010 may transfer SSID/password of the primary terminal 1010 to the eSIM IoT terminal 1000 (operation 1040). Upon reception of the transferred information, the eSIM IoT terminal 1000 may release its SoftAP (operation 1045) and may attempt to access the AP of the primary terminal 1010 (operation 1060).

When the primary terminal 1010 operates as the AP, Port Numbers of both terminals may be equal but, because the primary terminal 1010 operating as the AP newly allocates the local AP address to the eSIM IoT terminal 1000, IP address information may become different. In a case where connection is terminated and then is re-established, the primary terminal 1010 may request previous EPS information from an OCF terminal that attempts to access (operation 1075). In response to the request, the eSIM IoT terminal 1000 may search for EPS information stored before connection is disconnected and may transfer the EPS information as a response (operation 1080). The primary terminal 1010 may match EPS information of both terminals (operation 1085), and when matched, the primary terminal 1010 may connect to a previous session for downloading an eSIM profile and may proceed (operation 1090). When the primary terminal 1010 requests the previous EPS information but the eSIM IoT terminal 1000 responds that the eSIM IoT terminal 1000 does not have the information, or when values of previous EPS information are different, the primary terminal 1010 may determine that a terminal is not an OCF terminal nor a terminal configured for re-connection for previous eSIM Easysetup, and thus may perform a procedure defined for general connection with an OCF terminal or may end a procedure.

Figure 11:
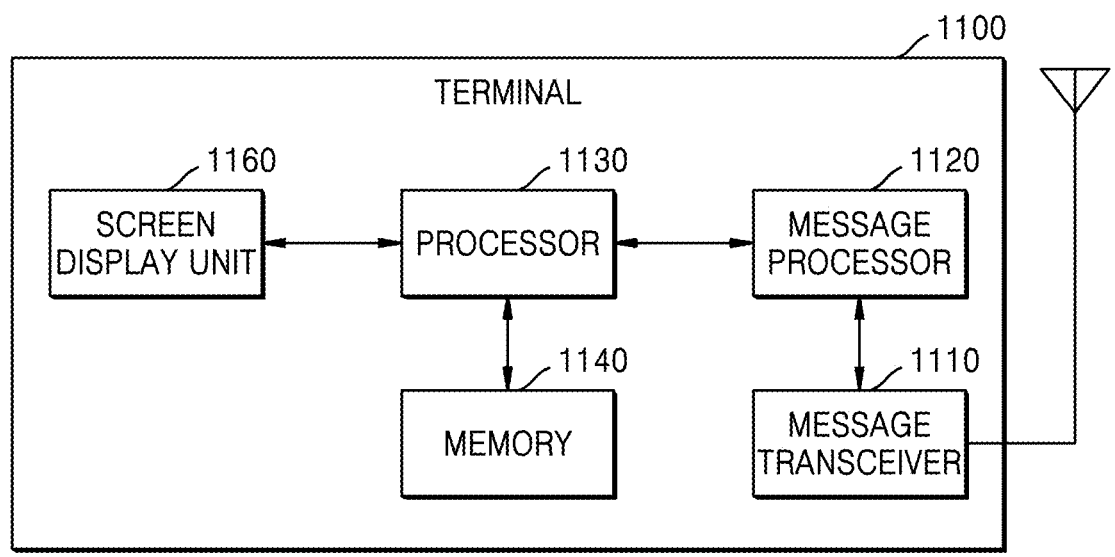
FIG. 11 illustrates a detailed configuration of a terminal in a wireless communication system, according to some embodiments of the disclosure.

FIG. 11 illustrates a detailed configuration of a terminal 1100 in a wireless communication system, according to some embodiments of the disclosure.

Referring to FIG. 11, the terminal 1100 may include a transceiver 1110, a message processor 1120, a processor (controller) 1130, a memory 1140, and a screen display unit 1160. However, elements of the terminal 1100 are not limited to the described elements, and may be included in the primary terminal or the IoT terminal. For example, the terminal 1100 may include more elements than the described elements or fewer elements than the described elements. In addition, at least one configuration of the terminal 1100 may be implemented in the form of a chip. According to some embodiments of the disclosure, the transceiver 1110 performs functions for transmitting and receiving signals through wireless channels, e.g., band conversion and amplification of the signals. That is, the transceiver 1110 may include a radio frequency (RF) processor that up-converts a baseband signal into an RF band signal and then transmits the RF band signal through an antenna, and down-converts an RF band signal received through the antenna, into a baseband signal, and may further include a transmit filter, a receive filter, an amplifier, a mixer, an oscillator, a digital-to-analog convertor (DAC), an analog-to-digital convertor (ADC), or the like.

Also, the transceiver 1110 may receive a signal via a radio channel, may output the received signal to the processor 1130, and may transmit a signal via a radio channel, the signal being output from the processor 1130. According to some embodiments of the disclosure, FIG. 11 illustrates only one antenna, but the terminal 1100 may include a plurality of antennas. Also, the transceiver 1110 may include a plurality of RF chains.

The transceiver 1110 may perform beamforming. For beamforming, transceiver 1110 may adjust phases and intensities of signals to be transmitted or received through a plurality of antennas or antenna elements. Also, a baseband processor in the transceiver 1110 may convert between a baseband signal and a bitstream based on physical layer specifications of a system. For example, for data transmission, the baseband processor generates complex symbols by encoding and modulating a transmit bitstream. For data reception, the baseband processor may reconstruct a received bitstream by demodulating and decoding a baseband signal provided from the RF processor. For example, according to an orthogonal frequency division multiplexing (OFDM) scheme, for data transmission, the baseband processor generates complex symbols by encoding and modulating a transmit bitstream, maps the complex symbols to subcarriers, and then configures OFDM symbols by performing inverse fast Fourier transformation (IFFT) and cyclic prefix (CP) insertion. For data reception, the baseband processor may segment a baseband signal provided from the RF processor, into OFDM symbol units, may reconstruct signals mapped to subcarriers by performing fast Fourier transformation (FFT), and then may reconstruct a received bitstream by demodulating and decoding the signals.

The transceiver 1110 may be defined as the message transceiver 1110. The message processor 1120 may perform an operation of determining a type of a message that is data transmitted or received via the transceiver 1110. For example, the message processor 1120 may determine whether a received message is a control message of a Radio Resource Control (RRC) layer, the control message including a System Information Block (SIB), or a data message of a user. The message processor 1120 may be included in the processor 1130.

The processor 1130 controls all operations of the terminal 1100. For example, the processor 1130 transmits or receives a signal via the message processor 1120. Also, the processor 1130 records and reads data on or from the memory 1140. The processor 1130 may include at least one processor. For example, the processor 1130 may include a communication processor (CP) for controlling communications and an application processor (AP) for controlling an upper layer such as an application program.

According to some embodiments about an operation of a primary terminal, the processor 1130 may determine whether to support an eSIM profile download, by combining capability information of a connected eSIM IoT terminal and preset information input via the screen display unit 1160, the capability information being obtained from the message processor 1120, the transceiver 1110, and the memory 1140. The processor 1130, the message processor 1120, and the transceiver 1110 may control the terminal 1100 to access a network of a service provider selected by a user. Also, according to some embodiments of the disclosure, the processor 1130 performs a processing procedure in which the terminal 1100 infers information that can be referenced in selection of a service by matching read data record on the memory 1140 or information collected by the processor 1130, the message processor 1120, and the transceiver 1110. For example, when the memory 1140 includes pre-stored information (e.g., Device ID, previous EPS, etc.), the processor 1130 may request the memory 1140 for the information and thus the screen display unit 1160 displays the information or the processor 1130 receives the information and infers whether an operation such as resumption of a previous session is required. According to some embodiments of the disclosure, the processor 1130 may determine whether particular information received from the message transceiver 1110 requires user agreement and may display a UI for obtaining user agreement on the screen display unit 1160. Also, the processor 1130 may control the terminal 1100 to perform an operation corresponding thereto.

According to some embodiments about an operation of an eSIM IoT terminal, the processor 1130 may process a procedure for determining whether an LPA operation is required for processing an eSIM profile and collecting eUICC information, obtaining, via the processor 1130 and the memory 1140, preset information necessary for a profile download, and transferring the preset information to the message transceiver 1110 of the primary terminal via the message processor 1120 and the transceiver 1110. According to some embodiments of the disclosure, the processor 1130 may include an application such as an LPA to drive and control secure elements. According to some embodiments of the disclosure, the processor 1130 may receive an activation code from the memory 1140 or via the message transceiver 1110 and the message processor 1120, and may transmit information to an SM-DP+server via the message processor 1120 and the message transceiver 1110. Also, when the processor 1130 determines that the terminal 1100 cannot provide an LPA function, the processor 1130 may control the terminal 1100 to limit an operation of downloading an eSIM profile.

The processor 1130 and the memory 1140 of the terminal 1100 may generate and store preset authentication information in the memory 1140, or may control the terminal 1100 to transmit and process a request for obtaining a plurality of pieces of preset authentication information via the message transceiver 1110. The memory 1140 stores basic programs, application programs, and data, e.g., configuration information, for operations of the terminal 1100. The memory 1140 in an OCF server terminal includes a database (DB) for storing information about resources that are supported by the OCF server terminal. The memory 1140 may include a UICC, a eUICC, an iSSP, and an iUICC that are hardware security modules embedded in the terminal 1100. According to an embodiment of the disclosure, the memory 1140 may include any or a combination of storage media such as read-only memory (ROM), random access memory (RAM), a hard disk, a compact disc (CD)-ROM, and a digital versatile disc (DVD), and may provide stored data, in response to a request from the processor 1130. The memory 1140 and the processor 1130 may be integrated and implemented as a System-on-Chip (SoC). For example, in the iSSP, the memory 1140 and the processor 1130 may be integrated. Also, the memory 1140 may include a plurality of memories.

The screen display unit 1160 may display information processed by the processor 1130, or may display a progress of an operation to be performed by the terminal 1100 in response to the processing by the processor 1130 or may display agreement about an event requested for the user to perform. In a case where the terminal 1100 determines that the terminal 1100 cannot process the progress of the operation to be performed by the terminal 1100 in response to the processing by the processor 1130 or the agreement about the event requested for the user to perform, which is displayed on the screen display unit 1160, the terminal 1100 may display a result of the determination on the screen display unit 1160 of another terminal via the message processor 1120 and the message transceiver 1110. According to some embodiments of the disclosure, the primary terminal may transfer and display an input to the screen display unit 1160, the input being about a plan purchase and an activation code, and a result of the input for the user, and the processor 1130 may determine information requested (from an eSIM IoT terminal) via the transceiver 1110 and the message processor 1120 and may display the information on the screen display unit 1160. However, this is merely an example, and information displayed on the screen display unit 1160 is not limited to the aforementioned example.

Hereinafter, embodiments of the disclosure will be described in detail with reference to accompanying drawings.

In the following descriptions of embodiments of the disclosure, descriptions of techniques that are well known in the art and not directly related to the disclosure are omitted. This is to clearly convey the gist of the disclosure by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. In the specification, the same elements are denoted by the same reference numerals.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer usable or computer-readable memory that may direct the computer or other programmable data processing apparatus to function in a particular manner, such that the instructions stored in the computer usable or computer-readable memory produce an article of manufacture including instruction means that perform the functions specified in the flowchart block or blocks. The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block or blocks In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in the present embodiment of the disclosure refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card.

Particular terms to be used in descriptions below are provided for the purpose of promoting an understanding of the disclosure only, and various changes to the use of the particular terms may be made therein without departing from the technical concept or essential features of the disclosure.

First, terms to be used in the disclosure are defined.

A Universal Integrated Circuit Card (UICC) refers to a smart card inserted into a mobile communication terminal and used, and is called a UICC card. The UICC may include an access control module for accessing a network of a mobile communication service provider. Examples of the access control module include a Universal Subscriber Identity Module (USIM), a Subscriber Identity Module (SIM), an internet protocol (IP) Multimedia Service Identity Module (ISIM), or the like. A UICC including a USIM is generally called a USIM card. Equally, a UICC including a SIM module may be called a SIM card.

In the disclosure, the terms "SIM card", "UICC card", "USIM card", and "UICC including ISIM" may be interchangeably used.

That is, technical applications with respect to the SIM card may be equally applied to the USIM card, the ISIM card, or a general UICC card.

The UICC may store private information of a mobile communication service subscriber, and when accessing a mobile communication network, the UICC may perform subscriber authentication and generation of a traffic security key, thereby enabling secure mobile communication use.

At the time when the disclosure is presented, when the SIM card is manufactured, the SIM card may be manufactured as a dedicated card for a particular mobile communication service provider at the request of the particular mobile communication service provider, and authentication information for access to a network of the particular mobile communication service provider, the authentication information including a USIM application, an International Mobile Subscriber Identity (IMSI), a subscriber key value (K value), an Operator Constant (OPc) value, etc., may be pre-stored in the SIM card and then the SIM card may be released. The particular mobile communication service provider may receive and then provide the manufactured SIM card to a subscriber, and afterward, when required, a terminal may perform management such as installation, modification, deletion, or the like of an application in the UICC by using a technology such as Over The Air (OTA), or the like. A subscriber may insert a UICC card into a mobile communication terminal of the subscriber and may use a network and application services of a mobile communication service provider, and when replacing a terminal, the subscriber may extract the UICC card from the terminal and insert the UICC card into a new terminal, thereby changelessly use, in the new terminal, authentication information, mobile communication telephone number, a private telephone directory, or the like stored in the UICC card.

However, a mobile communication terminal user using the SIM card has inconvenience when the user is provided a service of another mobile communication service provider. The mobile communication terminal user has to physically obtain the SIM card to be provided the service from the other mobile communication service provider. For example, when travelling to another country, a user has to buy a local SIM card to be provided a local mobile communication service. While a roaming service solves the inconvenience to some degree, but its price is relatively expensive, and when a contract does not exist between communication service providers, the user cannot be provided a service.

However, when the user remotely downloads a SIM module on a UICC card and installs it, the inconvenience may be significantly solved. That is, the user may download a SIM module of a mobile communication service to be used on the UICC card at a user-desired time point. The UICC card may download and install a plurality of SIM modules and may select and use only one SIM module from among them. The UICC card may be fixed or may not be fixed to a terminal. In particular, a UICC fixed to and used in a terminal is referred to as a eUICC. In general, the eUICC refers to a UICC card that is fixed to and used in a terminal and can remotely download and select a SIM module. In the disclosure, the UICC card that can remotely download and select a SIM module is referred to as a eUICC. That is, UICC cards that are fixed or are not fixed to a terminal, the UICC cards being from among UICC cards that can remotely download and select a SIM module, are collectively described as a eUICC. Also, SIM module information to be downloaded is described as a eUICC profile or, a profile in brief.

Hereinafter, the terms used in the disclosure will be described in detail.

In the disclosure, UICC refers to a smart card that is inserted to and used in a mobile communication terminal and refer to a chip in which personal information such as network access authentication information, a phonebook, and a short message service (SMS) of a mobile communication service subscriber is stored and that enables the secure use of a mobile communication by performing authentication of a subscriber and generation of a traffic security key when accessing a mobile communication network such as Global System for Mobile Communications (GSM), Wideband Code Division Multiple Access (W-CDMA), LTE, or the like. According to a type of a mobile communication network accessed by the subscriber, a communication application such as a SIM, a USIM, an ISIM, or the like is embedded in the UICC, and the UICC may provide a high-level security function for installation of various applications such as a digital wallet, e-ticketing, an electronic passport, or the like.

In the disclosure, a eUICC refers to a security module in the form of a chip that is embedded in a terminal and is not detachable being mounted to or demounted from the terminal. The eUICC may download and install a profile by using an Over the Air (OTA) technique. The eUICC may be called a UICC that is capable of downloading and installing a profile.

In the disclosure, a method of downloading and installing a profile by using the OTA technique may be applied in the same manner to a detachable UICC that is mounted to or demounted from the terminal. That is, embodiments of the disclosure may be applied to a UICC that can download and install a profile by using the OTA technique.

In the disclosure, the term "UICC" may be used interchangeably with SIM, and the term "eUICC" may be used interchangeably with eSIM.

In the disclosure, a profile may indicate that an application, a file system, an authentication key value, or the like are packaged in the form of software.

In the disclosure, a USIM profile may mean the same as a profile or may mean that information included in a USIM application in the profile is packaged in the form of software.

In the disclosure, an operation in which a terminal enables a profile may indicate an operation of configuring the profile by changing a state of the profile to an enabled state so as to allow the terminal to be provided a communication service from a communication service provider that provides the profile. The profile in the enabled state may be represented as an enabled profile.

In the disclosure, an operation in which the terminal disables a profile may indicate an operation of configuring the profile by changing a state of the profile to a disabled state so as to allow the terminal not to be provided a communication service from a communication service provider that provides the profile. The profile in the disabled state may be represented as a disabled profile.

In the disclosure, an operation in which the terminal deletes a profile may indicate an operation of configuring the profile by changing a state of the profile to a deleted state so as to allow the terminal not to enable or disable the profile any more. The profile in the deleted state may be represented as a deleted profile.

In the disclosure, an operation in which the terminal enables, disables, or deletes a profile may indicate an operation in which the terminal does not immediately change a state of the profile to an enabled state, a disabled state, or a deleted state but only marks the state of the profile as "to be enabled", "to be disabled", or "to be deleted", and then, after the terminal or a UICC of the terminal performs a particular operation (e.g., performing of a REFRESH command or a RESET command), the terminal changes the state of the profile to the enabled state, the disabled state, or the deleted state. The operation in which the terminal marks a state of a particular profile as a to-be-state (i.e., "to be enabled", "to be disabled", or "to be deleted) is not limited to a marking operation performed on only one profile, and thus, one or more profiles may be marked to have a same state or different states, one profile may be marked to have different states, or one or more profiles may each be marked to have a same state or different states.

When the terminal marks at least two to-be-states on a random profile, the two markings may be integrated as one marking. For example, when the random profile is marked as "to be disabled" and "to be deleted", the random profile may be marked in an integrated manner as "to be disabled and deleted".

Also, operations in which the terminal marks to-be-states on one or more profiles may be sequentially or simultaneously performed. Also, operations in which the terminal marks to-be-states on one or more profiles and then changes actual states of the profiles may be sequentially or simultaneously performed.

In the disclosure, a profile provision server may generate a profile, may encrypt the generated profile, may generate a profile remote management instruction, or may encrypt the generated profile remote management instruction. The profile provision server may be represented as Subscription Manager Data Preparation (SM-DP), Subscription Manager Data Preparation plus (SM-DP+), off-card entity of Profile Domain, a profile encryption server, a profile generation server, a profile provisioner (PP), a profile provider, or a profile provisioning credentials holder (PPC holder).

In the disclosure, a profile management server may be represented as Subscription Manager Secure Routing (SM-SR), Subscription Manager Secure Routing Plus (SM-SR+), off-card entity of eUICC Profile Manager, a profile management credentials holder (PMC holder), or a eUICC Manager (EM).

When referring to the profile provision server in the disclosure, the profile provision server may also include functions of the profile management server. Therefore, in various embodiments of the disclosure, i.e., in descriptions below, operations of the profile provision server may also be performed in the profile management server. Equally, an operation of the profile management server, the operation being described with reference to SM-SR, may also be performed the profile provision server.

In the disclosure, an opening relay server may be represented as Subscription Manager Discovery Service (SM-DS), Discovery Service (DS), Root SM-DS, or Alternative SM-DS. The SM-DS may receive an event register request (or a register event request) from at least one profile provision server or SM-DS. In addition, at least one SM-DS may be used in combination, and in this case, a first SM-DS may receive a register event request not only from the profile provision server but also from a second SM-DS.

In the disclosure, the profile provision server and the SM-DS may be collectively referred to as a RSP server. The RSP server may be represented as a Subscription Manager XX (SM-XX).

In the disclosure, an eSIM capability may be collectively referred to a remote SIM provisioning capability or a RSP capability.

The term "terminal" used in the disclosure may be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. In an embodiment of the disclosure, the terminal may include a cellular phone, a smartphone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storage and playback home appliance having a wireless communication function, an Internet home appliance with wireless Internet access and browsing functions, and a portable unit or terminals integrating combinations of such functions. In addition, the terminal may include, but is not limited to, a Machine to Machine (M2M) terminal and a Machine Type Communication (MTC) terminal/device. In the disclosure, the terminal may be referred to as an electronic device.

In the disclosure, the electronic device may include a UICC capable of downloading and installing a profile. When the UICC is not embedded in the electronic device, the UICC physically separated from the electronic device may be inserted into the electronic device and connected to the electronic device. For example, the UICC may be inserted into the electronic device in a card form. The electronic device may include a terminal, and in this case, the terminal may be a terminal including a UICC capable of downloading and installing a profile. The UICC may be embedded in the terminal, and when the terminal and the UICC are separated from each other, the UICC may be inserted into the terminal, or may be inserted into the terminal and connected to the terminal. The UICC that is capable of downloading and installing a profile may be referred to as a eUICC.

In the disclosure, the terminal or the electronic device may include software or an application installed in the terminal or the electronic device to control the UICC or the eUICC. The software or the application installed in the terminal or the electronic device to control the UICC or the eUICC may be referred to as a LPA.

In the disclosure, a profile identifier may be referred to as a factor matching profile ID, Integrated Circuit Card ID (ICCID), matching ID, event ID, activation code, activation code token, a command code, a command code token, a signed command code, a unsigned command code, issuer security domain-profile (ISD-P) or a profile domain (PD). The profile ID may represent a unique identifier of each profile. The profile ID may further include an address of a profile provision server (SM-DP+) that can index profiles. The profile ID may further include a signature of the profile provision server (SM-DP+).

In the disclosure, eUICC ID may be a unique identifier of a eUICC embedded in a terminal and may be referred to as EID. In a case where a provisioning profile is pre-embedded in the eUICC, eUICC ID may be profile ID of the provisioning profile. As in an embodiment of the disclosure, in a case where a terminal and a eUICC chip are not separate, eUICC ID may be terminal ID. Also, eUICC ID may indicate a particular secure domain of a eUICC chip.

In the disclosure, a profile container may be called a profile domain. The profile container may be a security domain.

In the disclosure, an application protocol data unit (APDU) may be a message for the terminal to interoperate with the eUICC. Also, the APDU may be a message for a PP or a profile manager (PM) to interoperate with the eUICC.

In the disclosure, profile provisioning credentials (PPC) may be used for mutual authentication between the profile provision server and the eUICC, profile encryption, and signature. The PPC may include at least one of a symmetric key, a Rivest-Shamir-Adleman (RSA) certificate and a private key, an Elliptic Curved Cryptography (ECC) certificate and a private key, a root certification authority (CA), or a certificate chain. When there are a plurality of profile provision servers, different PPCs may be stored in the eUICC or used for the profile provision servers, respectively.

In the disclosure, profile management credentials (PMC) may be used for mutual authentication between a profile management server and the eUICC, data encryption, and signature. The PMC may include at least one of a symmetric key, an RSA certificate and a private key, an ECC certificate and a private key, a Root CA, or a certificate chain. When there are a plurality of profile management servers, different PMCs may be stored in the eUICC or used for the profile management servers, respectively.

In the disclosure, an AID may represent an application identifier. A value thereof may be an identifier for identifying each of different applications in the eUICC.

In the disclosure, the term "event" may be collectively referred to as profile download, remote profile management, management/processing instructions of other profiles or eUICCs. The event may be referred to as a remote SIM provisioning operation (RSP operation) or an event record, and each event may be referred to as data including at least one of an event identifier (Event ID or EventID), a matching identifier (Matching ID or MatchingID), an address (FQDN, IP address, or uniform resource locator (URL)) of the profile provision server (SM-DP+) or the SM-DS in which each event is stored, a signature of the profile provision server (SM-DP+) or the SM-DS, or a digital certificate of the profile provision server (SM-DP+) or the SM-DS. The data corresponding to the event may be referred to as an activation code or a command code. A part of a procedure or the entire procedure for using the command code may be referred to as "activation code processing procedure", "command code processing procedure", "activation code procedure", "command code procedure", "Local Profile Assistant Application Programming Interface (LPA API)", "LPA API procedure", or "LPA API processing procedure". The profile download may be interchangeably used with profile installation. In addition, the term "event type" may be used to represent whether a particular event is profile download or remote profile management (for example, deletion, enablement, disablement, replacement, update, etc.) or a command for processing/managing other profiles or eUICCs, and may be referred to as an operation type (or OperationType), an operation class (or OperationClass), an event request type, an event class, an event request class, etc. A random event identifier (EventID or MatchingID) may have designated therein a path from which a terminal obtains the event identifier (EventID or MatchingID), or EventID Source or MatchingID Source.

In the disclosure, the term "profile package" may be interchangeably used with a profile or may be used to represent a data object of a particular profile, and may be referred to as a profile TLV or a profile package TLV. When the profile package is encrypted by using an encryption parameter, the profile package may be referred to as a protected profile package (PPP) or a protected profile package TLV (PPP TLV). When the profile package is encrypted by using an encryption parameter that may be decrypted only by a particular eUICC, the profile package may be referred to as a bound profile package (BPP) or a bound profile package TLV (BPP TLV). The profile package TLV may be a data set representing information constituting a profile in a tag-length-value (TLV) format.

In the disclosure, a local profile management (LPM) may be referred to as profile local management, local management, a local management command, a local command, a LPM Package, a profile local management package, a local management package, a local management command package, or a local command package. The LPM may be used to change a state (enabled, disabled, or deleted) of a particular profile or to update contents (e.g., a profile nickname, profile metadata, etc.) of the particular profile through software installed in the terminal. The LPM may include at least one local management command, and in this case, profiles to be targets for the respective local management commands may be the same or different for each local management command.

In the disclosure, the RPM may be referred to as profile remote management, remote management, a remote management command, a remote command, a remote profile management package (RPM package), a profile remote management package, a remote management package, a remote management command package, or a remote command package. The RPM may be used to change a state (enabled, disabled, or deleted) of a particular profile or to update contents (e.g., a profile nickname, profile metadata, etc.) of the particular profile. The RPM may include at least one remote management command, and profiles to be targets for the respective remote management commands may be the same or different for each remote management command.

In the disclosure, a certificate or a digital certificate may represent a digital certificate used for mutual authentication based on an asymmetric key including a pair of a public key (PK) and a secret key (SK). Each certificate may include at least one public key (PK), a public key identifier (PKID) corresponding to each PK, a certificate issuer ID of a certificate issuer (CI) that issued each certificate, and a digital signature.

In addition, the CI may be referred to as a certification issuer, a certificate authority (CA), or the like.

In the disclosure, the PK and the PKID may be interchangeably used as the same meaning representing a particular PK or a certificate including the particular PK, a part of the particular PK or a part of the certificate including the particular PK, a calculation result (e.g., a hash) value of the particular PK or a calculation result (e.g., a hash) value of the certificate including the particular PK, a calculation result (e.g., a hash) value of the part of the particular PK, or a calculation result (e.g., a hash) value of the part of the certificate including the particular PK, or a storage space in which pieces of data are stored.

In the disclosure, when certificates (primary certificates) issued by one CI are used to issue another certificate (secondary certificate), or secondary certificates are used to connectively issue tertiary or higher certificates, a correlation between the certificates may be referred to as a certificate chain or a certificate hierarchy, and in this case, a CI certificate used for issuing an initial certificate may be referred to as a root of certificate, a highest-level certificate, a root CI, a root CI certificate, a root CA, a root CA certificate, or the like.

In the disclosure, a communication service provider (or a mobile operator) may indicate a business entity that provides a communication service to a terminal, and may refer to all of a business supporting system (BSS), an operational supporting system (OSS), a point of sale (POS) terminal, and other information technology (IT) systems of the communication service provider. In addition, in the disclosure, the communication service provider is not limited to indicating only one particular business entity providing a communication service, and may be used as a term indicating a group or association (or consortium) of one or more business entities, or a representative representing the group or association. In addition, in the disclosure, the communication service provider may be referred to as an operator (OP or Op.), a mobile network operator (MNO), a service provider (SP), a profile owner (PO), or the like, and each communication service provider may configure or be allocated at least one of a name of communication service provider and/or an object identifier (OID). When the communication service provider refers to a group, an association (or consortium), or a representative of one or more business entities, a name or an OID of any group, association (or consortium), or representative may be a name or an OID shared by all business entities belonging to the group or association (or consortium), or all business entities cooperating with the representative.

In the disclosure, an AKA may indicate an authentication and key agreement, and may indicate an authentication algorithm for accessing $3^{rd}$ Generation Partnership Project (3GPP) and $3^{rd}$ Generation Partnership Project (3GPP2) networks.

In the disclosure, K denotes an encryption key value stored in a eUICC used for an AKA authentication algorithm.

In the disclosure, an OPc refers to a parameter value that may be stored in the eUICC used for the AKA authentication algorithm.

In the disclosure, an NAA refers to a network access application program and may be an application program such as a USIM or an ISIM stored in a UICC to access a network. The NAA may be a network access module.

In the disclosure, an indicator may be used to indicate that a random function, configuration, or operation is required or is not required, or may be used to represent the function, the configuration or the operation. Also, in the disclosure, the indicator may be represented in various forms including a letter string, an alphanumeric string, a Boolean operator (TRUE or FALSE) indicating True or False, a bitmap, an array, or the like, and other representation schemes having same meanings may be interchangeably used.

In the descriptions of the disclosure, well-known functions or configurations are not described in detail because they would obscure the disclosure with unnecessary details.

FIG. 12 illustrates a method of connecting to a mobile communication network, the method being performed by a terminal 110 using a UICC 120 having embedded therein a fixed profile, according to an embodiment of the disclosure.

As illustrated in FIG. 12, the UICC 120 may be inserted into the terminal 110. For example, the UICC 120 may be detachable or may be previously embedded in the terminal 110.

In a UICC in which a fixed profile is embedded, the fixed profile means that "access information" that enables access to a particular communication service provider is fixed. For example, the access information may be an international mobile subscriber identity (IMSI), which is a subscriber identifier, and a K or Ki value required to authenticate a network together with the subscriber identifier.

According to some embodiments of the disclosure, the terminal 110 may perform authentication with an authentication processing system (e.g., a home location register (HLR) or an authentication center (AuC)) of a mobile communication service provider by using the UICC 120. For example, an authentication process may be an AKA process. When authentication succeeds, the terminal 110 may use a mobile communication service such as the use of telephone calls or mobile data, by using a mobile communication network 130 of a mobile communication system.

Figure 13:
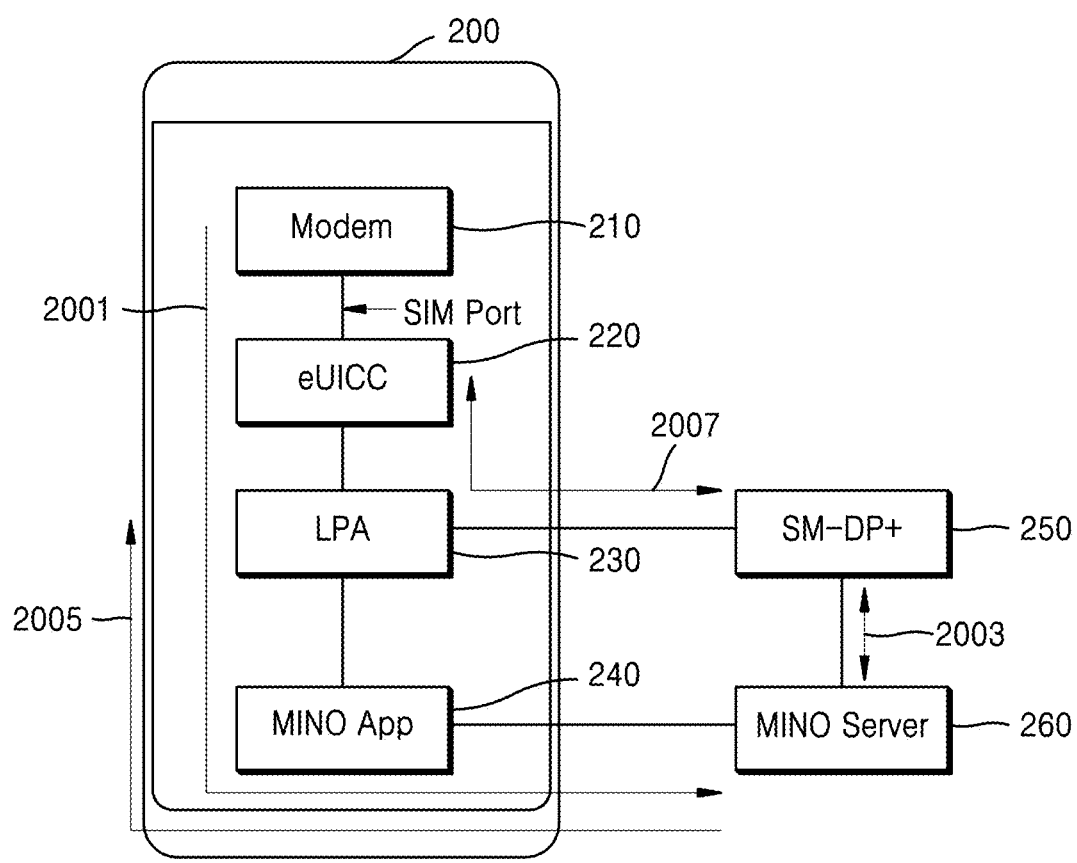
FIG. 13 illustrates a configuration of a system in which, when a modem and an embedded UICC (eUICC) are mounted in a terminal, the terminal receives an activation code via a service provider application installed in the terminal and a service provider server, downloads an event from a profile server, and processes the event, according to an embodiment of the disclosure.

FIG. 13 illustrates a configuration of a system in which, when a modem 210 and a eUICC 220 are mounted in a terminal 200, the terminal 200 receives an activation code via a service provider application installed in the terminal 200 and a service provider server, downloads an event from a profile server, and processes the event, according to an embodiment of the disclosure.

As illustrated in FIG. 13, the modem 210 and the eUICC 220 are mounted in the terminal 200, and a profile (not shown) may be installed in the eUICC 220. Also, a LPA 230 may be installed in the terminal 200.

The modem 210 and the eUICC 220 connected thereto may be mounted in the terminal 200. For convenience, FIG. 13 illustrates a configuration in which the modem 210 and the eUICC 220 are separate elements, but in another implementation of the terminal 200, the modem 210 and the eUICC 220 may be included as one element in the terminal 200. Connection links between the modem 210 and the eUICC 220 may be collectively referred to as a SIM port. The LPA 230 may control the eUICC 220.

An application of a random communication service provider (hereinafter, the MNO App 240) may be further installed in the terminal 200. The MNO App 240 may be connected to the LPA 230 and a server of the random communication service provider (hereinafter, the MNO server 260 or the MNO 260). For convenience, FIG. 13 illustrates a case in which only one MNO App 240 is installed in the terminal 200 and is connected to only one MNO server 260, but according to implementation and embodiments of the disclosure, one or more MNO Apps 240 may be installed in the terminal 200 or one or more MNO servers 260 may be included in the system. It is required to note that various configurations of a terminal and a server are simply represented as the MNO App 240 and the MNO server 260 in FIG. 13 and drawings thereafter.

While FIG. 13 illustrates the configuration in which the modem 210, the eUICC 220, the LPA 230, and the MNO App 240 are all arranged in one terminal 200, but according to some embodiments of the disclosure, elements may be included in one or more configurations and may be installed in different terminals. It is required to note that various configurations of the terminal 200, the modem 210, the eUICC 220, the LPA 230, and the MNO App 240 are simply represented in one terminal 200 in FIG. 13 and drawings thereafter.

The MNO server 260 and the LPA 230 may be connected to the profile server 250. Also, one or more MNO servers 260 are included in the configuration, MNO servers may be connected to respective profile servers, or at least one MNO server may be connected to one profile server. Hereinafter, a MNO server and a profile server connected to the MNO server are collectively called a MNO domain or an operator domain. In drawings, for convenience, the profile server 250 is configured as one server, but according to implementation and embodiments of the disclosure, one or more profile servers (SM-DP+) may be included in a server configuration, and one or more SM-DSs for assisting establishment of connection between a particular profile server and a terminal may be included in the server configuration. It is required to note that various configurations of a server are simply represented as the profile server 250 in FIG. 13 and drawings thereafter.

Referring to FIG. 13, in operation 2001, the terminal 200 may generate, in the LPA 230, information for generation of an activation code, and may transfer the information to the MNO server 260 via the MNO App 240. The information for generation of an activation code may be represented as LPA API information, LPA API info, lpaApiInfo, LPA API configuration, or lpaApiConfig. The LPA API information (LPA API info) may include at least information about the terminal 200 and the modem 210, and information about the eUICC 220. The information about the terminal 200 and the modem 210 may be represented as device information, device info, or deviceInfo. The information about the eUICC 220 may be represented as eUICC information, eUICC info, or euiccInfo. The device information (device info) may include a list of radio access technologies (RATs) supported by the modem 210 and version types (versionTypes) of standards supported by the respective RATs, and an eSIM capability (LPA RSP capability or lpaRspCapability) supported by the LPA 230. The eUICC information (eUICC info) may include a current total available memory (an external card resource or an extCardResource) of the eUICC 220, and an eSIM capability (eUICC RSP capability or euiccRspCapability) supported by the eUICC 220. In operation 2001, at least one of an initiate LPA API request message, an initiate LPA API response message, a eUICC information request message (a get eUICC info request, a get eUICC info1 request, or a get eUICC info2 request), a eUICC information response message (a get eUICC info response, a get eUICC info1 response, or a get eUICC info2 response), a get eUICC ID request message, or a get eUICC ID response message may be used.

In operation 2003, the MNO server 260 may prepare an event with the profile server 250 by using LPA API information. The event may refer to an operation of performing profile download, performing remote profile management, or controlling or processing a profile or eUICC. In operation 2003, the MNO server 260 and the profile server 250 may further generate an activation code corresponding to the event. In operation 2003, at least one of a download order request message, a download order response message, a confirm order request message, a confirm order response message, a release order request message, a release order response message, a RPM order request message, or a RPM order response message may be used. A part of operation 2003 or entire operation 2003 may be performed before operation 2003. For example, one or more events may be previously prepared before operation 2003, and in operation 2003, an event may be selected based on the LPA API information, and an activation code corresponding to the event may be generated. The generating of the activation code may further include one or more profile servers or user interaction (not shown).

In operation 2005, the MNO server 260 may transfer the activation code to the LPA 230 via the MNO App 240. In operation 2005, at least one of an execute LPA API request message, an execute LPA API response message, an execute activation code request message, an execute activation code response message, an execute command code response message, an execute command code response message, a push activation code request message, a push activation code response message, a push command code request message, or a push command code response message may be used.

In operation 2007, the LPA 230 may receive the event from the profile server 250 by using the activation code, and may process the event by transferring a part of the event or the entire event to the eUICC 220. In operation 2007, at least one of an initiate authentication request message, an initiate authentication response message, an authenticate client request message, an authenticate client response message, a get bound profile package request message, a get bound profile package response message, an authenticate server request message, an authenticate server response message, a prepare download request message, a prepare download response message, a load bound profile package request message, a load bound profile package response message, a load RPM package request message, a load RPM package response message, or a handle notification request message may be used.

According to some embodiments of the disclosure, detailed operations and message exchange procedures of the terminal 200, the modem 210, the LPA 230, the MNO App 240, the profile server 250, and the MNO server 260 will be described in detail with reference to drawings to be described below.

Figure 14:
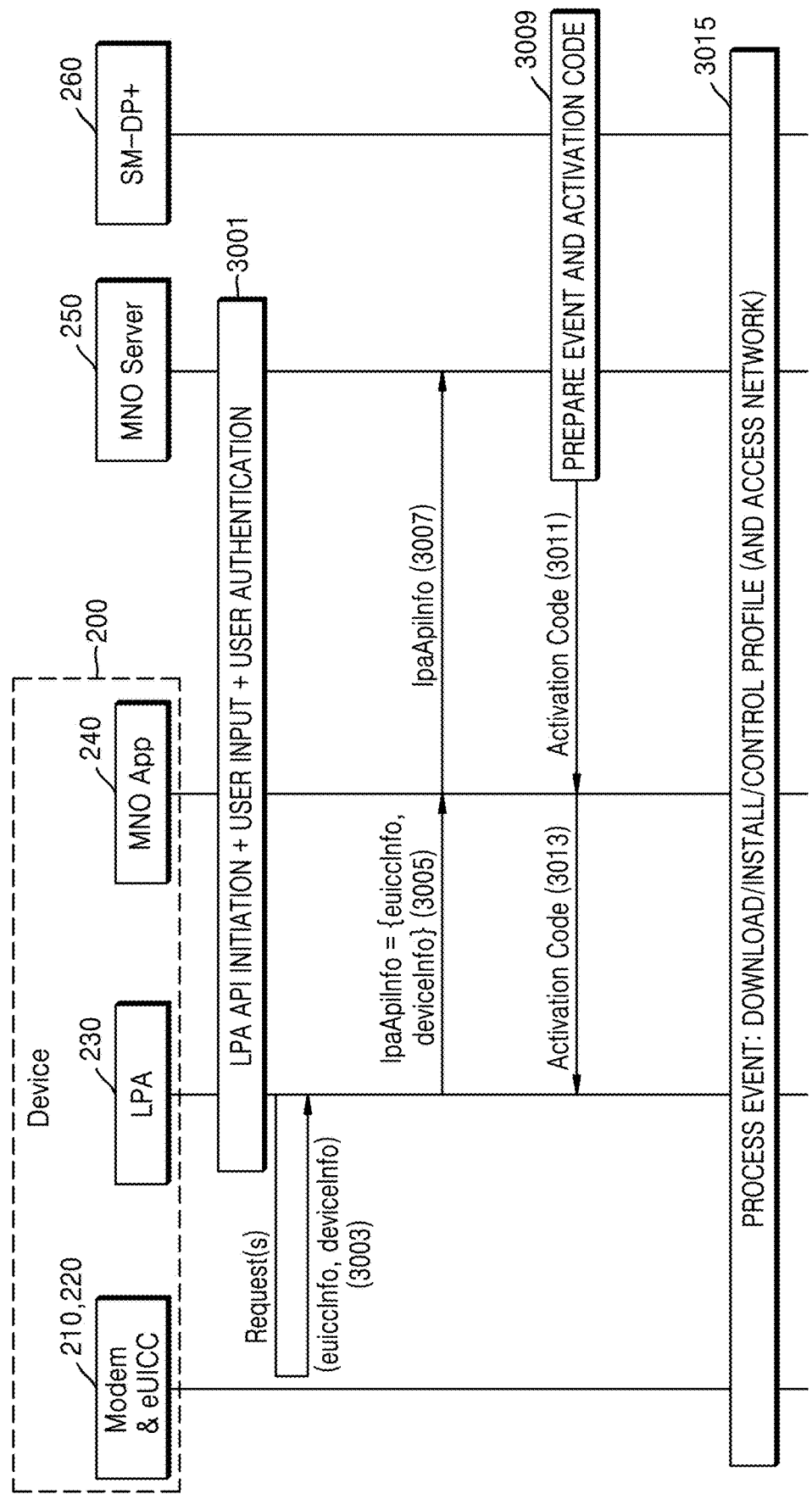
FIG. 14 illustrates a procedure in which, when the modem and the eUICC are mounted in the terminal, the terminal receives an activation code via a service provider application installed in the terminal and a service provider server, downloads an event from a profile server, and processes the event, according to an embodiment of the disclosure.

FIG. 14 illustrates a procedure in which, when the modem 210 and the eUICC 220 are mounted in the terminal 200, the terminal 200 receives an activation code via a service provider application installed in the terminal 200 and a service provider server, downloads an event from a profile server, and processes the event, according to an embodiment of the disclosure.

Configurations and detailed descriptions about the terminal 200, the modem 210, the eUICC 220, the LPA 230, the MNO App 240, a MNO server 250, and a profile server 260 in FIG. 14 are referenced to those in FIG. 13. For convenience, FIG. 14 illustrates that the modem 210 and the eUICC 220 are arranged as one element, but according to another implementation of the terminal 200, the modem 210 and the eUICC 220 may be included as different elements in the terminal 200 as shown in FIG. 13.

Referring to FIG. 14, in operation 3001, the LPA 230 and the MNO App 240 may initiate an LPA API procedure. Also, operation 3001 may further include interoperation with the MNO server 250. Also, operation 3001 may initiate by the LPA 230, may initiate by the MNO App 240, may initiate by an operating system (OS) and elements installed in the terminal 200 when the terminal 200 satisfies a particular condition (e.g., when the terminal 200 is first booted, is re-booted, or detects that the terminal 200 is in a roaming state), may initiate in response to a request from a user (not shown) to the LPA 230, may initiate in response to a request from a user (not shown) to the MNO App 240, or may initiate in response to a request from the MNO server 250 to the MNO App 240. Even when operation 3001 initiates in response to a user input or initiates due to another condition, when an additional user input is required, operation 3001 may include receiving an input of the user (not shown). In operation 3001, an initiate LPA API request message may be used.

In operation 3003, the LPA 230 may obtain device information (device info) and eUICC information (eUICC info) via the modem 210 and the eUICC 220. The device information (device info) may include a list of RATs supported by the modem 210 and version types (versionTypes) of standards supported by the respective RATs, and an eSIM capability (LPA RSP capability or lpaRspCapability) supported by the LPA 230. The eUICC information (eUICC info) may include a current total available memory (an external card resource or an extCardResource) of the eUICC 220, and an eSIM capability (eUICC RSP capability or euiccRspCapability) supported by the eUICC 220. In operation 3003, at least one of a get eUICC info request message or a get eUICC info response message may be used. In a case where the modem 210 and the eUICC 220 are included as separate elements according to implementation of the terminal 200, operation 3003 may include one or more exchanges of a request message and response message. In a case where a part of or all of the device information (device info) and the eUICC information (eUICC info) are known to the LPA 230 according to an operation of the terminal 200, operation 3003 may be partly or completely skipped.

In operation 3005, the LPA 230 may configure LPA API information (LPA API info) including at least the device information (device info) and the eUICC information (eUICC info) and may transfer the LPA API information as a response to the MNO App 240. In this regard, an operation of configuring the LPA API information may be performed along with operation 3003. In operation 3005, an initiate LPA API response message may be used.

In operation 3007, the MNO App 240 may transfer the LPA API information to the MNO server 250. Although not illustrated in FIG. 14, operation 3007 may further include obtaining information of the MNO App 240, the information including application version information or user information (e.g., personal information such as a name, an address, a contact number, or the like of the user, and payment information).

In operation 3009, the MNO server 250 may prepare an event along with the profile server 260 by using the LPA API information (LPA API info), and may further generate an activation code corresponding to the event. In operation 3009, at least one of a download order request message, a download order response message, a confirm order request message, a confirm order response message, a release order request message, a release order response message, a RPM order request message, or a RPM order response message may be used. A part of operation 3009 or entire operation 3009 may be performed before operation 3009. For example, one or more events may be previously prepared before operation 3009, and in operation 3009, an event may be selected based on the LPA API information, and an activation code corresponding to the event may be generated. The generating of the activation code may further include one or more profile servers or user interactions (not shown).

In operation 3011, the MNO server 250 may transfer the activation code to the MNO App 240.

In operation 3013, the MNO App 240 may transfer the activation code to the LPA 230. In operation 3013, at least one of an execute LPA API request message, an execute activation code request message, an execute command code response message, a push activation code request message, or a push command code request message may be used.

In operation 3015, the terminal 200, the MNO server 250, and the profile server 260 may process the event corresponding to the activation code. Also, the terminal 200 may further access a network by using an event processing result after the event is processed. An operation of processing the event may correspond to an operation of performing profile download, performing remote profile management, or controlling or processing a profile or eUICC. In operation 3015, at least one of an execute LPA API response message, an execute activation code response message, an execute command code response message, a push activation code response message, a push command code response message, an initiate authentication request message, an initiate authentication response message, an authenticate client request message, an authenticate client response message, a get bound profile package request message, a get bound profile package response message, an authenticate server request message, an authenticate server response message, a prepare download request message, a prepare download response message, a load bound profile package request message, a load bound profile package response message, a load RPM package request message, a load RPM package response message, or a handle notification request message may be used.

Referring to FIG. 14, in a case where one modem 210 and one eUICC 220 are mounted in the terminal 200, even when the LPA API information (LPA API info) does not include separate eUICC ID information, the eUICC 220 to process the event corresponding to the activation code is obvious, there is no problem in processing the event.

Figure 15:
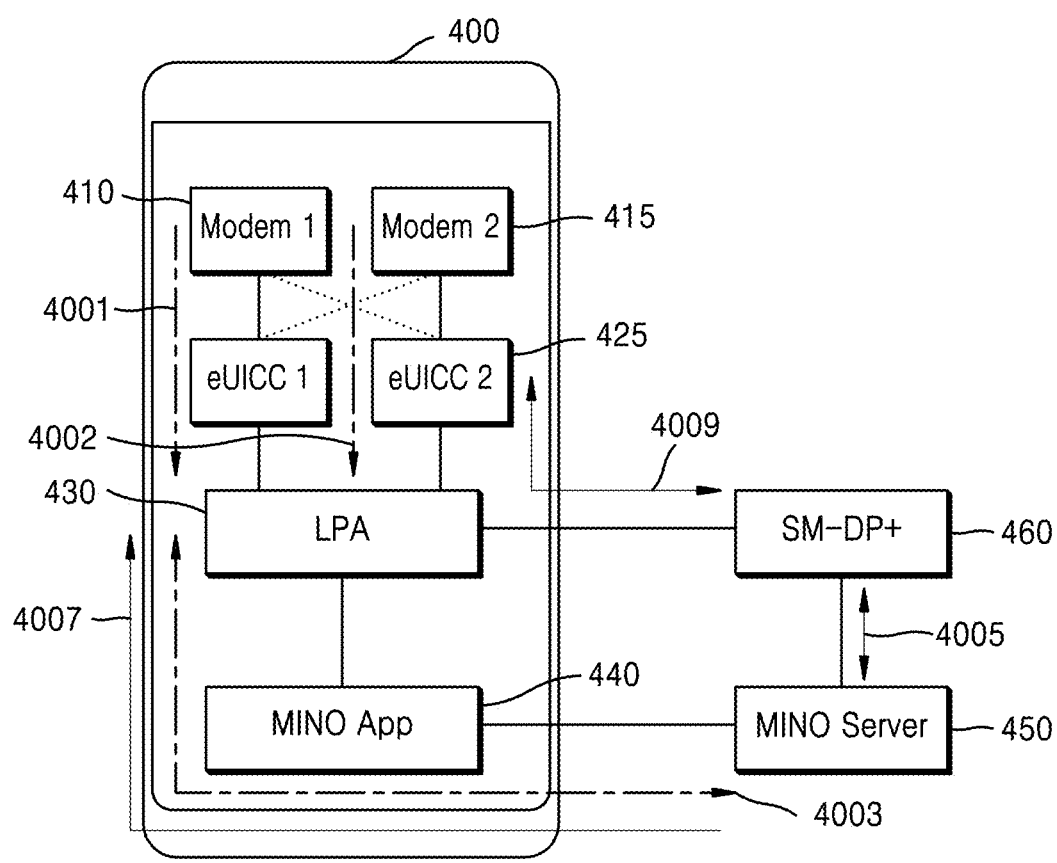
FIG. 15 illustrates a configuration of a system in which, when a plurality of modems or a plurality of eUICCs are mounted in a terminal, the terminal receives an activation code via a service provider application installed in the terminal and a service provider server, downloads an event from a profile server, and processes the event, according to an embodiment of the disclosure.

FIG. 15 illustrates a configuration of a system in which, when a plurality of modems or a plurality of eUICCs are mounted in a terminal, the terminal receives an activation code via a service provider application installed in the terminal and a service provider server, downloads an event from a profile server, and processes the event, according to an embodiment of the disclosure.

As illustrated in FIG. 15, a first modem 410 and a second modem 415, and a first eUICC 420 and a second eUICC 425 are mounted in a terminal 400, and a profile (not shown) may be installed in the first eUICC 420 and/or the second eUICC 425. Also, a LPA 430 may be installed in the terminal 400.

In the terminal 400, the first modem 410 and the first eUICC 420 connected thereto may be mounted, and the second modem 415 and the second eUICC 425 connected thereto may be mounted. For convenience, FIG. 15 illustrates a configuration in which the first modem 410, the first eUICC 420, the second modem 415, and the second eUICC 425 are separate elements, but in another implementation of the terminal 400, one or more of the first modem 410, the first eUICC 420, the second modem 415, and the second eUICC 425 may be included as one element in the terminal 400. For example, the first modem 410 and the second modem 415 may be configured as one modem, the first eUICC 420 and the second eUICC 425 may be configured as one eUICC, or all of the first modem 410, the second modem 415, the first eUICC 420, and the second eUICC 425 may be configured as one SoC. Connection links between the first modem 410 and the first eUICC 420 may be collectively referred to as a first SIM port. Connection links between the second modem 415 and the second eUICC 425 may be collectively referred to as a second SIM port. For convenience, FIG. 15 illustrates that the first modem 410 and the first eUICC 420 are connected, and the second modem 415 and the second eUICC 425 are connected, but according to implementation of the terminal 400, connection among the first modem 410, the first eUICC 420, the second modem 415, and the second eUICC 425 may be dynamically changed by a user (not shown). For example, the terminal 400 may connect the first modem 410 and the second eUICC 425 and may connect the second modem 415 and the first eUICC 420. As another example, the terminal 400 may connect the first modem 410 and the first eUICC 420, may connect the first modem 410 and the second eUICC 425, and may configure the second modem 415 not to be connected to any eUICC. As another example, the terminal 400 may connect the first modem 410 and the first eUICC 420, may connect the second modem 415 and the first eUICC 420, and may configure the second eUICC 425 not to be connected to any modem. As described above, connections among the first modem 410, the first eUICC 420, the second modem 415, and the second eUICC 425 may be variously changed, but in FIG. 15 and drawings thereafter, it is required to note that a connection status between a modem and a eUICC at a random time point is assumed, and the modem and the eUICC correspond to each other in a one-to-one manner. The LPA 430 may control the first eUICC 420 and the second eUICC 425. For convenience, FIG. 15 illustrates that the LPA 430 is arranged as one element, but in another implementation of the terminal 400, the LPA 430 may be divided into one or more elements that control one or more eUICCs, respectively. It is required to note that various configurations of the LPA 430 are represented as one LPA 430 in FIG. 15 and drawings thereafter.

An application of a random communication service provider (hereinafter, an MNO App 440) may be further installed in the terminal 400. The MNO App 440 may be connected to the LPA 430 and a server of the random communication service provider (hereinafter, an MNO server 460 or an MNO 460). For convenience, FIG. 15 illustrates a case in which only one MNO App 440 is installed in the terminal 400 and is connected to only one MNO server 450, but according to implementation and embodiments of the disclosure, one or more MNO Apps 440 may be installed in the terminal 400 or one or more MNO servers 450 may be included in the system. It is required to note that various configurations of a terminal and a server are simply represented as the MNO App 440 and the MNO server 450 in FIG. 15 and drawings thereafter.

While FIG. 15 illustrates the configuration in which the first modem 410, the second modem 415, the first eUICC 420, the second eUICC 425, the LPA 430, and the MNO App 440 are all arranged in one terminal 400, but according to some embodiments of the disclosure, elements may be included in one or more configurations and may be installed in different terminals. It is required to note that various configurations of the first modem 410, the second modem 415, the first eUICC 420, the second eUICC 425, the LPA 430, and the MNO App 440 are simply represented in one terminal 400 in FIG. 15 and drawings thereafter.

The MNO server 450 and the LPA 430 may be connected to the profile server 460. Also, one or more MNO servers 450 are included in the configuration, MNO servers may be connected to respective profile servers, or at least one MNO server may be connected to one profile server. Hereinafter, a MNO server and a profile server connected to the MNO server are collectively called a MNO domain or an operator domain. In drawings, for convenience, the profile server 460 is configured as one server, but according to implementation and embodiments of the disclosure, one or more profile servers (SM-DP+) may be included in a server configuration, and one or more SM-DSs for assisting establishment of connection between a particular profile server and a terminal may be included in the server configuration. It is required to note that various configurations of a server are simply represented as the profile server 460 in FIG. 15 and drawings thereafter.

Referring to FIG. 15, in operation 4001, the terminal 400 may generate, in the LPA 430, information for generation of an activation code to be processed by the first eUICC 420. The information for generation of the activation code to be processed by the first eUICC 420 may be represented as first LPA API information, LPA API info 1, or lpaApiInfo1. The first LPA API information (LPA API info 1) may include at least information about the terminal 400 and the first modem 410, information about the first eUICC 420, and an index of the first eUICC 420. The information about the terminal 400 and the first modem 410 may be represented as first device information, device info 1, or deviceInfo1. The information about the first eUICC 420 may be represented as first eUICC information, eUICC info 1, or euiccInfo1. The first device information (device info 1) may include a list of RATs supported by the first modem 410 and version types (versionTypes) of standards supported by the respective RATs, and an eSIM capability (LPA RSP capability or lpaRspCapability) supported by the LPA 430. The first eUICC information (eUICC info 1) may include a current total available memory (an external card resource or an extCardResource) of the first eUICC 420, and an eSIM capability (eUICC RSP capability or euiccRspCapability) supported by the first eUICC 420. The index of the first eUICC 420 may be obtained based on a eUICC identifier (eUICC ID or EID) of the first eUICC 420, may be obtained based on an identifier (SIM port identifier or SIM port ID) of a SIM port that connects the first eUICC 420 and the first modem 410, or may be obtained based on a virtual identifier (virtual ID or VID) the LPA 430 randomly allocates to the first eUICC 420. In operation 4001, at least one of a get eUICC info request message, a get eUICC info response message, a get eUICC ID request message, or a get eUICC ID response message.

In operation 4002, the terminal 400 may generate, in the LPA 430, information for generation of an activation code to be processed by the second eUICC 425. The information for generation of the activation code to be processed by the second eUICC 425 may be represented as second LPA API information, LPA API info 2, or lpaApiInfo2. The second LPA API information (LPA API info 2) may include at least information about the terminal 400 and the second modem 415, information about the second eUICC 425, and an index of the second eUICC 425. The information about the terminal 400 and the second modem 415 may be represented as second device information, device info 2, or deviceInfo2. The information about the second eUICC 425 may be represented as second eUICC information, eUICC info 2, or euiccInfo2. The second device information (device info 2) may include a list of RATs supported by the second modem 415 and version types (versionTypes) of standards supported by the respective RATs, and an eSIM capability (LPA RSP capability or lpaRspCapability) supported by the LPA 430. The second eUICC information (eUICC info 2) may include a current total available memory (an external card resource or an extCardResource) of the second eUICC 425, and an eSIM capability (eUICC RSP capability or euiccRspCapability) supported by the second eUICC 425. The index of the second eUICC 425 may be obtained based on a eUICC identifier (eUICC ID or EID) of the second eUICC 425, may be obtained based on an identifier (SIM port identifier or SIM port ID) of a SIM port that connects the second eUICC 425 and the second modem 415, or may be obtained based on a virtual identifier (virtual ID or VID) the LPA 430 randomly allocates to the second eUICC 425. In operation 4002, at least one of a get eUICC info request message, a get eUICC info response message, a get eUICC ID request message, or a get eUICC ID response message may be used.

A part of or all of operation 4001 and operation 4002 may be performed after operation 4003. For example, in operation 4003, when the MNO App 440 requests the LPA 430 to execute a LPA API, the LPA 430 may prepare the first LPA API information and the second LPA API information via operation 4001 and operation 4002, and may respond to the request with respect to execution of the LPA API by transferring the first LPA API information and the second LPA API information to the MNO App 440. As another example, the LPA 430 may prepare, before operation 4003, the first LPA API information and the second LPA API information via operation 4001 and operation 4002, and when the MNO App 440 requests the LPA 430 to execute the LPA API, the LPA 430 may respond to the request with respect to execution of the LPA API by transferring the first LPA API information and the second LPA API information to the MNO App 440. As another example, the LPA 430 may prepare, before operation 4003, the first LPA API information via operation 4001, and when the MNO App 440 requests the LPA 430 to execute the LPA API, the LPA 430 may further prepare the second LPA API information via operation 4002, and then may respond to the request with respect to execution of the LPA API by transferring the first LPA API information and the second LPA API information to the MNO App 440.

In operation 4003, the terminal 400 may select at least one of the first LPA API information (LPA API info 1) or the second LPA API information (LPA API info 2), and may transfer the selected LPA API information to the MNO server 450 via the MNO App 440. In operation 4003, at least one of an execute LPA API request message or an execute LPA API response message may be used.

In operation 4005, the MNO server 450 may select at least one of the first LPA API information or the second LPA API information, and may prepare an event with the profile server 460 by using the selected LPA API information. The event may refer to an operation of performing profile download, performing remote profile management, or controlling or processing a profile or eUICC. In operation 4005, the MNO server 450 and the profile server 460 may further generate an activation code corresponding to the event. In operation 4005, at least one of a download order request message, a download order response message, a confirm order request message, a confirm order response message, a release order request message, a release order response message, a RPM order request message, or a RPM order response message may be used. A part of operation 4005 or entire operation 4005 may be performed before operation 4005. For example, one or more events may be previously prepared before operation 40053, and in operation 4005, an event may be selected based on the selected LPA API information, and an activation code corresponding to the event may be generated. The generating of the activation code may further include one or more profile servers or user interaction (not shown).

In operation 4007, the MNO server 450 may transfer the activation code to the LPA 230 via the MNO App 440, and may additionally notify at least one index of a eUICC for which the activation code is to be processed. The index of the eUICC may be determined by referring to a result of selecting, by the MNO server 450, the first LPA API information and the second LPA API information in operation 4005. For example, in operation 4005, when the MNO server 450 selects the first LPA API information, in operation 4007, the MNO server 450 may notify the index of the first eUICC 420 included in the first LPA API information. As another example, in operation 4005, when the MNO server 450 selects the first LPA API information and the second LPA API information, in operation 4007, the MNO server 450 may notify the index of the first eUICC 420 included in the first LPA API information and the index of the second eUICC 425 included in the second LPA API information. In operation 4007, at least one of an execute activation code request message, an execute activation code response message, an execute command code response message, an execute command code response message, a push activation code request message, a push activation code response message, a push command code request message, or a push command code response message may be used.

In operation 4009, the LPA 430 may select the eUICC for which the activation code is to be processed, by referring to the index of the eUICC notified by the MNO server 450. In a case where the MNO server 450 does not notify any eUICC index, the LPA 430 may randomly select one of the first eUICC 420 and the second eUICC 425. In a case where the MNO server 450 notifies a plurality of eUICC indices, the LPA 430 may randomly select one of the notified eUICC indices. The LPA 430 randomly selects a eUICC by referring to a remaining available memory of each eUICC, the number of profiles installed in each eUICC, or information about a modem connected to each eUICC. The LPA 430 may receive the event from the profile server 460 by using the activation code and may transfer a part of an event or the entire event to the selected eUICC and then may process the event. In operation 4009, at least one of an initiate authentication request message, an initiate authentication response message, an authenticate client request message, an authenticate client response message, a get bound profile package request message, a get bound profile package response message, an authenticate server request message, an authenticate server response message, a prepare download request message, a prepare download response message, a load bound profile package request message, a load bound profile package response message, a load RPM package request message, or a load RPM package response message may be used.

According to some embodiments of the disclosure, detailed operations and message exchange procedures of the terminal 400, the modem (410, 415), the LPA 430, the MNO App 440, the profile server 460, the MNO server 450, and a user (not shown) will be described in detail with reference to drawings to be described below.

Figure 16:
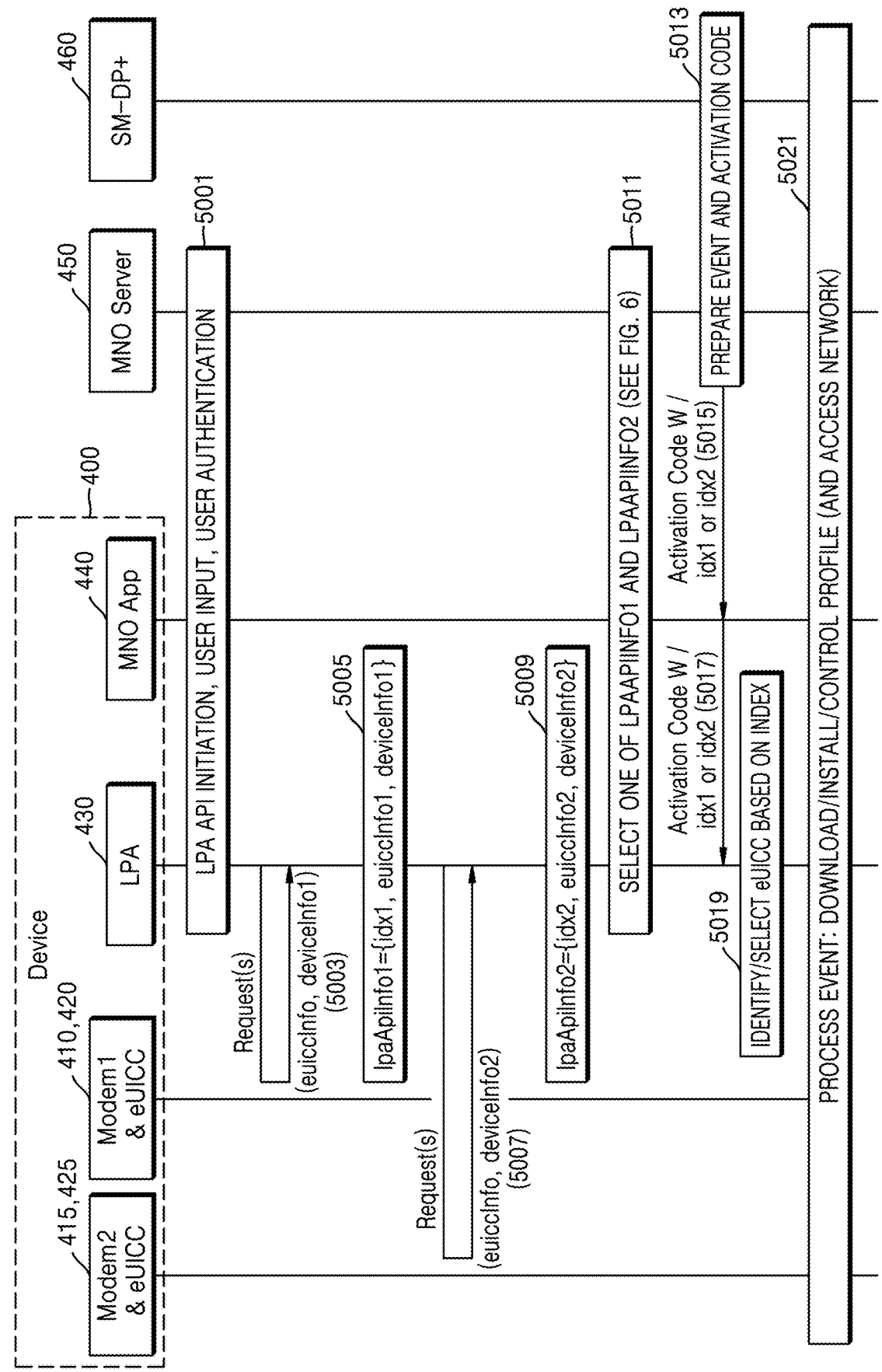
FIG. 16 illustrates a procedure in which, when a plurality of modems or a plurality of eUICCs are mounted in a terminal, the terminal receives an activation code via a service provider application installed in the terminal and a service provider server, downloads an event from a profile server, and processes the event, according to an embodiment of the disclosure.

FIG. 16 illustrates a procedure in which, when a plurality of modems or a plurality of eUICCs are mounted in a terminal, the terminal receives an activation code via a service provider application installed in the terminal and a service provider server, downloads an event from a profile server, and processes the event, according to an embodiment of the disclosure.

Configurations and detailed descriptions about the first modem 410, the second modem 415, the first eUICC 420, the second eUICC 425, the LPA 430, the MNO App 440, a MNO server 450, and a profile server 460 in FIG. 16 are referenced to those in FIG. 15. For convenience, FIG. 16 illustrates that the first modem 410 and the first eUICC 420 are arranged as one element and the second modem 415 and the second eUICC 425 are arranged as one element, but according to another implementation of the terminal 400, the first modem 410 and the first eUICC 420 may be included as different elements in the terminal 400 and the second modem 415 and the second eUICC 425 may be included as different elements in the terminal 400 as shown in FIG. 15.

Referring to FIG. 16, in operation 5001, the LPA 430 and the MNO App 440 may initiate an LPA API procedure. Also, operation 5001 may further include interoperation with the MNO server 450. Also, operation 5001 may initiate by the LPA 430, may initiate by the MNO App 440, may initiate by an OS and elements installed in the terminal 400 when the terminal 400 satisfies a particular condition (e.g., when the terminal 400 is first booted, is re-booted, or detects that the terminal 400 is in a roaming state), may initiate in response to a request from a user (not shown) to the LPA 430, may initiate in response to a request from a user (not shown) to the MNO App 440, or may initiate in response to a request from the MNO server 450 to the MNO App 440. Even when operation 5001 initiates in response to a user input or initiates due to another condition, when an additional user input is required, operation 5001 may include receiving an input of the user (not shown). In operation 5001, an initiate LPA API request message may be used.

In operation 5003, the LPA 430 may obtain first device information (device info 1) and first eUICC information (eUICC info 1) via the first modem 410 and the first eUICC 420. The first device information (device info 1) may include a list of RATs supported by the first modem 410 and version types (versionTypes) of standards supported by the respective RATs, and an eSIM capability (LPA RSP capability or lpaRspCapability) supported by the LPA 430. The first eUICC information (eUICC info 1) may include a current total available memory (an external card resource or an extCardResource) of the first eUICC 420, and an eSIM capability (eUICC RSP capability or euiccRspCapability) supported by the first eUICC 420. In operation 5003, at least one of a get eUICC info request message or a get eUICC info response message may be used. In a case where the first modem 410 and the first eUICC 420 are included as separate elements according to implementation of the terminal 400, operation 5003 may include one or more exchanges of a request message and response message. In a case where a part of or all of the first device information (device info 1) and the first eUICC information (eUICC info 1) are known to the LPA 430 according to an operation of the terminal 400, operation 5003 may be partly or completely skipped.

In operation 5005, the LPA 430 may configure first LPA API information (LPA API info 1) that includes at least the first device information (device info 1) and the first eUICC information (eUICC info 1) and further includes an index (index 1) of the first eUICC 420. The index of the first eUICC 420 may be obtained based on information described below but is not limited to a list below.

a eUICC identifier, eUICC ID, or EID of the first eUICC 420 an identifier of a SIM port or ID of the SIM port connecting the first eUICC 420 and the first modem 410 a virtual identifier, virtual ID, or VID the LPA 430 randomly allocates to the first eUICC 420

In operation 5007, the LPA 430 may obtain second device information (device info 2) and second eUICC information (eUICC info 2) via the second modem 415 and the second eUICC 425. The second device information (device info 2) may include a list of RATs supported by the second modem 415 and version types (versionTypes) of standards supported by the respective RATs, and an eSIM capability (LPA RSP capability or lpaRspCapability) supported by the LPA 430. The second eUICC information (eUICC info 2) may include a current total available memory (an external card resource or an extCardResource) of the second eUICC 425, and an eSIM capability (eUICC RSP capability or euiccRspCapability) supported by the second eUICC 425. In operation 5007, at least one of a get eUICC info request message or a get eUICC info response message may be used. In a case where the second modem 415 and the second eUICC 425 are included as separate elements according to implementation of the terminal 400, operation 5007 may include one or more exchanges of a request message and response message. In a case where a part of or all of the second device information (device info 2) and the second eUICC information (eUICC info 2) are known to the LPA 430 according to an operation of the terminal 400, operation 5007 may be partly or completely skipped.

In operation 5009, the LPA 430 may configure second LPA API information (LPA API info 2) that includes at least the second device information (device info 2) and the second eUICC information (eUICC info 2) and further includes an index (index 2) of the second eUICC 425. The index of the second eUICC 425 may be obtained based on information described below but is not limited to a list below.

- a eUICC identifier, eUICC ID, or EID of the second eUICC 425
- an identifier of a SIM port or ID of the SIM port connecting the second eUICC 425 and the second modem 415
- a virtual identifier, virtual ID, or VID the LPA 430 randomly allocates to the second eUICC 425

In operation 5011, the LPA 430, the MNO App 440, and the MNO server 450 may select at least one of the first LPA API information or the second LPA API information. Descriptions in detail about operation 5011 are referred to those provided with reference to FIG. 17. Although not illustrated in FIG. 16, operation 5011 may further include obtaining information of the MNO App 440, the information including application version information or user information (e.g., personal information such as a name, an address, a contact number, or the like of the user, and payment information). In operation 5011, an initiate LPA API response message may be used.

In operation 5013, the MNO server 450 may prepare an event along with the profile server 460 by using the at least one selected LPA API information, and may further generate an activation code corresponding to the event. In operation 5013, at least one of a download order request message, a download order response message, a confirm order request message, a confirm order response message, a release order request message, a release order response message, a RPM order request message, or a RPM order response message may be used. A part of operation 5013 or entire operation 5013 may be performed before operation 5013. For example, one or more events may be previously prepared before operation 5013, and in operation 5013, an event may be selected based on the at least one selected LPA API information, and an activation code corresponding to the event may be generated. The generating of the activation code may further include one or more profile servers or user interactions (not shown).

In operation 5015, the MNO server 450 may transfer the activation code to the MNO App 440, and may additionally notify at least one index of a eUICC for which the activation code is to be processed.

In operation 5017, the MNO App 440 may transfer, to the LPA 430, the activation code and the at least one index of the eUICC for which the activation code is to be processed. In operation 5017, at least one of an execute LPA API request message, an execute activation code request message, an execute command code response message, a push activation code request message, or a push command code request message may be used.

In operation 5019, the LPA 430 may identify and select the eUICC for which the activation code is to be processed, by referring to the index of the eUICC.

In operation 5021, the terminal 400, the MNO server 450, and the profile server 460 may process the event corresponding to the activation code with respect to the eUICC for which the activation code is to be processed. Also, the terminal 400 may further access a network by using an event processing result after the event is processed. An operation of processing the event may correspond to an operation of performing profile download, performing remote profile management, or controlling or processing a profile or eUICC. In operation 5021, at least one of an execute LPA API response message, an execute activation code response message, an execute command code response message, a push activation code response message, a push command code response message, an initiate authentication request message, an initiate authentication response message, an authenticate client request message, an authenticate client response message, a get bound profile package request message, a get bound profile package response message, an authenticate server request message, an authenticate server response message, a prepare download request message, a prepare download response message, a load bound profile package request message, a load bound profile package response message, a load RPM package request message, a load RPM package response message, or a handle notification request message may be used.

Referring to FIG. 16, in a case where the plurality of modems 410 and 415 or the plurality of eUICCs 420 and 425 are mounted in the terminal 400, when the terminal 400 generates a plurality of pieces of LPA API information (LPA API info), the terminal 400 may include, in the plurality of pieces of LPA API information, indices of eUICCs corresponding to the plurality of pieces of LPA API information, respectively. By doing so, the terminal 400 and the MNO server 450 may identify a eUICC for which an event corresponding to an activation code is to be processed, and may efficiently process the event. In a case where the plurality of modems 410 and 415 or the plurality of eUICCs 420 and 425 are mounted in the terminal 400, when the MNO server 450 transfers an activation code as a response to the terminal 400, the MNO server 450 does not designate an index of a eUICC or designates at least two indices, the terminal 400 may autonomously select a eUICC for which an event is to be processed from among the plurality of eUICCs 420 and 425 mounted in the terminal 400 and may efficiently process the event.

Figure 17:
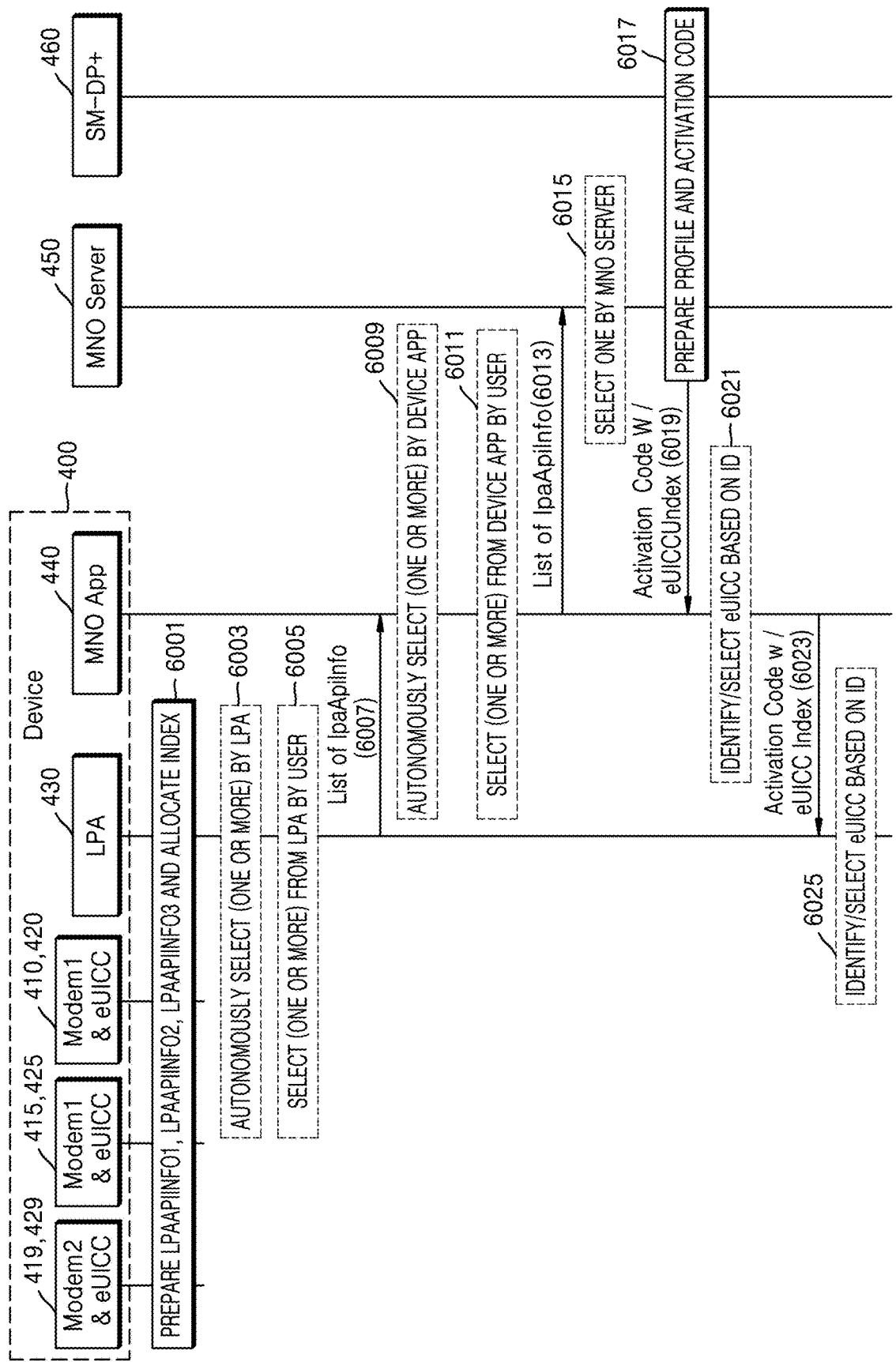
FIG. 17 illustrates a procedure in which, when a plurality of modems or a plurality of eUICCs are mounted in a terminal, a user, the terminal, and a mobile network operator (MNO) server select a eUICC for which an activation code is to be processed, according to an embodiment of the disclosure.

FIG. 17 illustrates a procedure in which, when a plurality of modems or a plurality of eUICCs are mounted in a terminal, a user, the terminal, and an MNO server select a eUICC for which an activation code is to be processed, according to an embodiment of the disclosure.

In FIG. 17, configurations and descriptions in detail about the first modem 410, the second modem 415, the first eUICC 420, the second eUICC 425, the LPA 430, the MNO App 440, the MNO server 450, and the profile server 460 are referred to those provided with reference to FIG. 15. A third model 419 and a third eUICC 429 may be further mounted in the terminal 400. It is obvious that connections between and configuration of the first modem 410, the second modem 415, and the third model 419, and the first eUICC 420, the second eUICC 425, and the third eUICC 429 may be dynamically changed as described with reference to FIG. 15. For convenience, FIG. 17 illustrates that the first modem 410 and the first eUICC 420 are arranged as one element, the second modem 415 and the second eUICC 425 are arranged as one element, and the third model 419 and the third eUICC 429 are arranged as one element, but according to another implementation of the terminal 400, as shown in FIG. 15, the first modem 410 and the first eUICC 420 may be included as different elements in the terminal 400, the second modem 415 and the second eUICC 425 may be included as different elements in the terminal 400, and the third modem (not shown) and the third eUICC (not shown) may be included as different elements in the terminal 400.

Referring to FIG. 17, in operation 6001, the LPA 430 may prepare first LPA API information (LPA API Info 1) from the first modem 410 and the first eUICC 420 and may further allocate an index (index 1) of the first eUICC 420 to the first LPA API information, may prepare second LPA API information (LPA API Info 2) from the second modem 415 and the second eUICC 425 and may further allocate an index (index 2) of the second eUICC 425 to the second LPA API information, and may prepare third LPA API information (LPA API Info 3) from the third model 419 and the third eUICC 429 and may further allocate an index (index 3) of the third eUICC 429 to the third LPA API information. In operation 6001, at least one of a get eUICC info request message, a get eUICC info response message, a get eUICC ID request message, or a get eUICC ID response message may be used. Operation 6001 may correspond to operations 5003 to 5009 in FIG. 16. The first LPA API information, the second LPA API information, and the third LPA API information which are prepared in operation 6001 may be represented as an LPA API information list (list of LPA API info).

The first LPA API information (LPA API Info 1) may include at least information about the terminal 400 and the first modem 410, information about the first eUICC 420, and an index of the first eUICC 420. The information about the terminal 400 and the first modem 410 may be represented as first device information, device info 1, or deviceInfo1. The information about the first eUICC 420 may be represented as first eUICC information, eUICC info 1, or euiccInfo1. The first device information (device info 1) may include a list of RATs supported by the first modem 410 and version types (versionTypes) of standards supported by the respective RATs, and an eSIM capability (LPA RSP capability or lpaRspCapability) supported by the LPA 430. The first eUICC information (eUICC info 1) may include a current total available memory (an external card resource or an extCardResource) of the first eUICC 420, and an eSIM capability (eUICC RSP capability or euiccRspCapability) supported by the first eUICC 420. The index of the first eUICC 420 may be obtained based on a eUICC identifier (eUICC ID or EID) of the first eUICC 420, may be obtained based on an identifier (SIM port identifier or SIM port ID) of a SIM port that connects the first eUICC 420 and the first modem 410, or may be obtained based on a virtual identifier (virtual ID or VID) the LPA 430 randomly allocates to the first eUICC 420.

The second LPA API information (LPA API info 2) may include at least information about the terminal 400 and the second modem 415, information about the second eUICC 425, and an index of the second eUICC 425. The information about the terminal 400 and the second modem 415 may be represented as second device information, device info 2, or deviceInfo2. The information about the second eUICC 425 may be represented as second eUICC information, eUICC info 2, or euiccInfo2. The second device information (device info 2) may include a list of RATs supported by the second modem 415 and version types (versionTypes) of standards supported by the respective RATs, and an eSIM capability (LPA RSP capability or lpaRspCapability) supported by the LPA 430. The second eUICC information (eUICC info 2) may include a current total available memory (an external card resource or an extCardResource) of the second eUICC 425, and an eSIM capability (eUICC RSP capability or euiccRspCapability) supported by the second eUICC 425. The index of the second eUICC 425 may be obtained based on a eUICC identifier (eUICC ID or EID) of the second eUICC 425, may be obtained based on an identifier (SIM port identifier or SIM port ID) of a SIM port that connects the second eUICC 425 and the second modem 415, or may be obtained based on a virtual identifier (virtual ID or VID) the LPA 430 randomly allocates to the second eUICC 425.

The third LPA API information (LPA API info 3) may include at least information about the terminal 400 and the third modem 419, information about the third eUICC 429, and an index of the third eUICC 429. The information about the terminal 400 and the third modem 419 may be represented as third device information, device info 3, or deviceInfo3. The information about the third eUICC 429 may be represented as third eUICC information, eUICC info 3, or euiccInfo3. The third device information (device info 3) may include a list of RATs supported by the third modem 419 and version types (versionTypes) of standards supported by the respective RATs, and an eSIM capability (LPA RSP capability or lpaRspCapability) supported by the LPA 430. The third eUICC information (eUICC info 3) may include a current total available memory (an external card resource or an extCardResource) of the third eUICC 429, and an eSIM capability (eUICC RSP capability or euiccRspCapability) supported by the third eUICC 429. The index of the third eUICC 429 may be obtained based on a eUICC identifier (eUICC ID or EID) of the third eUICC 429, may be obtained based on an identifier (SIM port identifier or SIM port ID) of a SIM port that connects the third eUICC 429 and the third modem 419, or may be obtained based on a virtual identifier (virtual ID or VID) the LPA 430 randomly allocates to the third eUICC 429.

In operation 6003, the LPA 430 may select at least one piece of LPA API information from the LPA API information list. As an example of selecting at least one piece of LPA API information from the LPA API information list, at least two methods below may be complexly applied thereto, but the example is not limited to the methods below.

Refer to a remaining available memory of a eUICC (e.g., a eUICC having a largest remaining available memory, a eUICC having a smallest remaining available memory, or a eUICC being closest to a size of a profile to be installed), and select LPA API information including an appropriate eUICC Refer to the number of profiles installed in a eUICC (e.g., a eUICC having a smallest number of installed profiles or a eUICC having a largest number of installed profiles), and select LPA API information including an appropriate eUICC Refer to eSIM capability supported by a eUICC (e.g., a eUICC supporting or not supporting one or more random eSIM capabilities), and select LPA API information including an appropriate eUICC Refer to a list of RATs being supportable by a modem (e.g., a modem supporting a RAT that is appropriate for a particular communication service), and select LPA API information including an appropriate modem Refer to eSIM capability supported by an LPA (e.g., an LPA supporting or not supporting one or more random eSIM capabilities), and select LPA API information including an appropriate LPA In operation 6005, the LPA 430 may output a part of the LPA API information list or the entire LPA API information list to a user (not shown), and may receive an input of selecting at least one piece of LPA API information from the user. The example of selecting at least one piece of LPA API information from the LPA API information list is referred to the methods described with reference to operation 6003.

In operation 6007, the LPA 430 may transfer a LPA API information list to the MNO App 440. The LPA API information list transferred in operation 6007 may include at least one piece of LPA API information selected from the LPA API information list prepared in operation 6001, the at least one piece of LPA API information being selected in operations 6003 to 6005. In a case where it is not possible to select the at least one piece of LPA API information in operations 6003 to 6005, in operation 6007, the LPA 430 may transfer, to the MNO App 440, an error code indicating that selection of LPA API information is not available, and may end an operation. In operation 6007, an initiate LPA API response message may be used.

In operation 6009, the MNO App 440 may select at least one piece of LPA API information from the LPA API information list. The example of selecting at least one piece of LPA API information from the LPA API information list is referred to the methods described with reference to operation 6003.

In operation 6011, the MNO App 440 may output a part of the LPA API information list or the entire LPA API information list to the user, and may receive an input of selecting at least one piece of LPA API information from the user. The example of selecting at least one piece of LPA API information from the LPA API information list is referred to the methods described with reference to operation 6003.

In operation 6013, the MNO App 440 may transfer the LPA API information list to the MNO server 450. The LPA API information list transferred in operation 6013 may include at least one piece of LPA API information selected from the LPA API information list prepared in operation 6007, the at least one piece of LPA API information being selected in operations 6009 to 6011. In a case where the MNO App 440 cannot select the at least one piece of LPA API information in operations 6009 to 6011, in operation 6013, the MNO App 440 may transfer, to the MNO server 450, an error code indicating that selection of LPA API information is not available, and may end an operation.

In operation 6015, the MNO server 450 may select at least one piece of LPA API information from the LPA API information list. The example of selecting at least one piece of LPA API information from the LPA API information list is referred to the methods described with reference to operation 6003.

In operation 6017, the MNO server 450 may prepare an event along with the profile server 460 by using the at least one piece of LPA API information, and may further generate an activation code corresponding to the event. In operation 6017, at least one of a download order request message, a download order response message, a confirm order request message, a confirm order response message, a release order request message, a release order response message, a RPM order request message, or a RPM order response message may be used. A part of operation 6017 or entire operation 6017 may be performed before operation 6017. For example, one or more events may be previously prepared before operation 6017, and in operation 6017, an event may be selected based on the LPA API information, and an activation code corresponding to the event may be generated. The generating of the activation code may further include one or more profile servers or user interactions (not shown). Operation 6017 may correspond to operation 5013 of FIG. 16.

In operation 6019, the MNO server 450 may transfer the activation code to the MNO App 440, and may additionally notify at least one index of a eUICC for which the activation code is to be processed. In a case where the MNO server 450 cannot select the at least one piece of LPA API information in operation 6015 or cannot generate the event or the activation code in operation 6017, in operation 6019, the MNO server 450 may notify the MNO App 440 that it is not available to complete the LPA API procedure and may end an operation. Operation 6019 may correspond to operation 5015 of FIG. 16.

In operation 6021, the MNO App 440 may identify and select the eUICC for which the activation code is to be processed, by referring to the index of the eUICC. When the MNO server 450 notifies only the activation code and does not notify any index of a eUICC in operation 6019, the MNO App 440 may select at least one piece of LPA API information from the LPA API information list transferred to the MNO server 450 in operation 6013. When the MNO server 450 notifies the activation code along with a plurality of eUICC indices in operation 6019, the MNO App 440 may select at least one piece of LPA API information from a LPA API information list including a plurality of pieces of LPA API information corresponding to the eUICC indices notified in operation 6019. In operation 6021, an operation of selecting at least one piece of LPA API information from the LPA API information list may correspond to an operation of repeating operations 6009 to 6011 at least once. In operation 6021, when the MNO server 450 cannot select at least one piece of LPA API information, the MNO server 450 may end an operation.

In operation 6023, the MNO App 440 may transfer the activation code to the LPA 430, and may additionally notify at least one index of a eUICC for which the activation code is to be processed. In operation 6023, at least one of an execute LPA API request message, an execute activation code request message, an execute command code response message, a push activation code request message, or a push command code request message may be used. Operation 6023 may correspond to operation 5017 of FIG. 16.

In operation 6025, the LPA 430 may identify and select the eUICC for which the activation code is to be processed, by referring to the index of the eUICC. When the MNO App 440 notifies only the activation code and does not notify any index of a eUICC in operation 6023, the LPA 430 may select at least one piece of LPA API information from the LPA API information list transferred to the MNO App 440 in operation 6007. When the MNO App 440 notifies the activation code along with a plurality of eUICC indices in operation 6023, the LPA 430 may select at least one piece of LPA API information from a LPA API information list including a plurality of pieces of LPA API information corresponding to the eUICC indices notified in operation 6023. In operation 6025, an operation of selecting at least one piece of LPA API information from the LPA API information list may correspond to an operation of repeating operations 6003 to 6005 at least once. In a case where the LPA 430 cannot select the at least one piece of LPA API information in operation 6025, the LPA 430 may transfer an error code as a response to the MNO App 440, the error code indicating that processing of the activation code is not available, and may end an operation. Operation 6025 may correspond to operation 5019 of FIG. 16.

Afterward, the terminal 400 may process the event as in operation 5021 of FIG. 16.

In the procedure of FIG. 17, it is required to note that operation 6003, operation 6005, operation 6009, operation 6011, operation 6015, operation 6021, and operation 6025, which involve selecting at least one piece of LPA API information from a LPA API information list, may be selectively or complexly performed at least once. For example, it is possible that, in operation 6003, the LPA 430 may select the first LPA API information, the second LPA API information, and the third LPA API information, in operation 6011, the MNO App 440 may output a part of or all of the first LPA API information, the second LPA API information, and the third LPA API information to a user and then may receive an input of selecting the first LPA API information and the second LPA API information, in operation 6015, the MNO server 450 may select the first LPA API information, in operation 6021, the MNO App 440 may identify an index of a first eUICC, and in operation 6025, the LPA 430 may identify the index of the first eUICC and thus may select the first eUICC. As another example, it is possible that, in operation 6003, the LPA 430 may select the first LPA API information, the second LPA API information, and the third LPA API information, in operation 6009, the MNO App 440 may select the first LPA API information, the second LPA API information, and the third LPA API information, in operation 6015, the MNO server 450 may select the second LPA API information and the third LPA API information, in operation 6021, the MNO App 440 may identify an index of a second eUICC and an index of a third eUICC, and in operation 6025, the LPA 430 may output a part of or all of the second LPA API information and the third LPA API information to a user, based on the index of the second eUICC and the index of the third eUICC and then may receive an input of selecting the second LPA API information.

Referring to FIG. 17, in a case where a plurality of modems or a plurality of eUICCs are mounted in the terminal 400, the terminal 400 and the MNO server 450 may efficiently select, from a LPA API information list including one or more pieces of LPA API information, a eUICC appropriate for event processing, based on information of the terminal 400, the first, second, and third modems 410, 415, and 419 and the first, second, and third eUICCs 420, 425, and 429, and may process the event.

Figure 18:
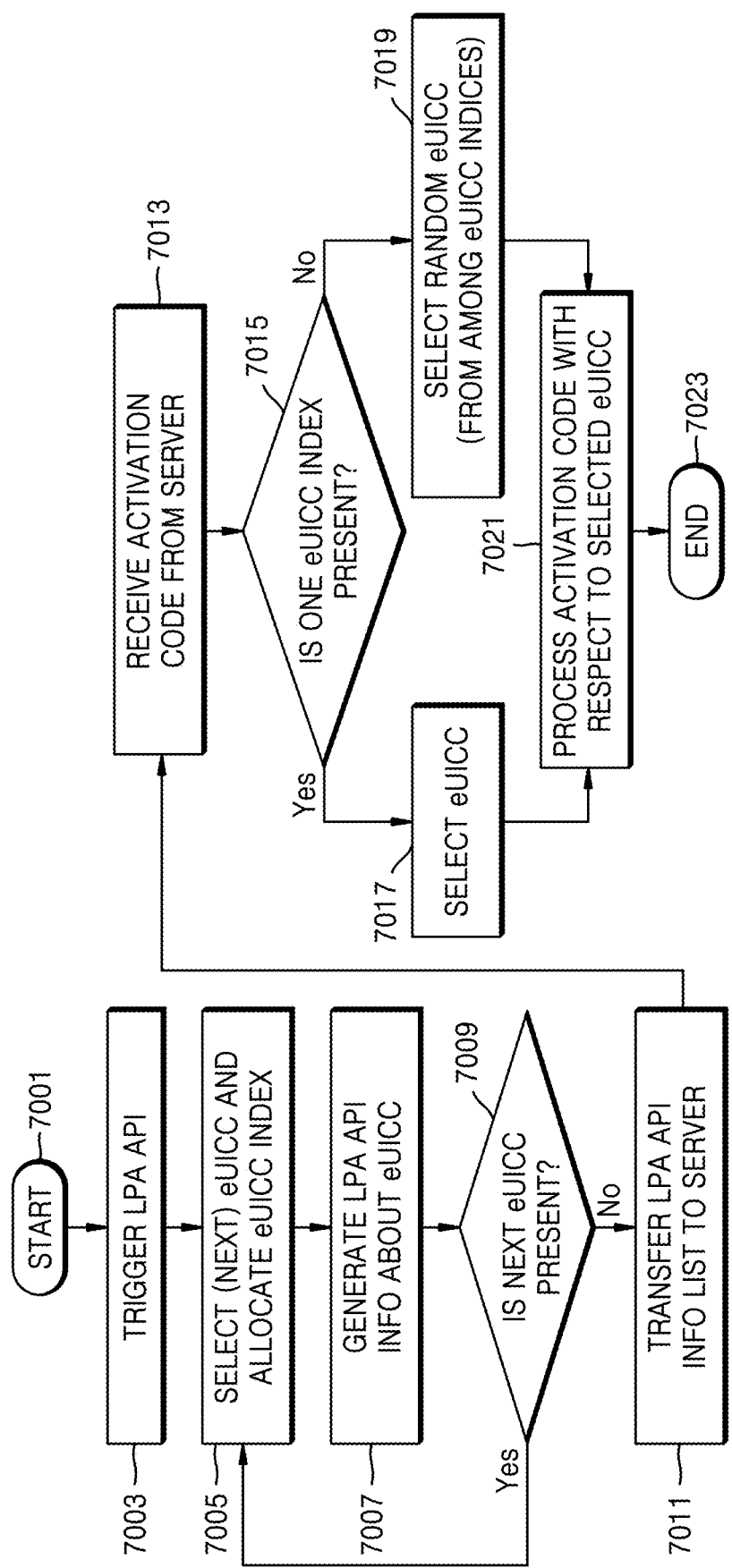
FIG. 18 is a flowchart of operations performed by a terminal, according to an embodiment of the disclosure.

FIG. 18 is a flowchart of operations performed by a terminal, according to an embodiment of the disclosure.

In operation 7001, the terminal may start an operation.

In operation 7003, the terminal may trigger an LPA API procedure. Operation 7003 may be triggered in response to a request from an external server of the terminal, may be triggered in response to a user input, or may be triggered by the terminal itself without an external input (e.g., when the terminal is initially booted or is rebooted and then detects a roaming state of the terminal).

In operation 7005, the terminal may select a eUICC from among eUICCs mounted in the terminal. Also, the terminal may allocate an index to the eUICC. The index of the eUICC may be obtained based on information described below but is not limited to a list below.
  a eUICC identifier, eUICC ID, or EID
  an identifier of a SIM port or ID of the SIM port connecting the eUICC and a modem
  a virtual identifier, virtual ID, or VID the terminal or an LPA randomly allocates to the eUICC In operation 7007, the terminal may generate LPA API information with respect to the selected eUICC The LPA API information may include at least information described below.
  Device information (device info): a list of RATs supported by the modem and version types of standards supported by the respective RATs, and a list of eSIM capabilities (LPA RSP capabilities) supported by the LPA in the terminal
  eUICC information (eUICC info): a current total available memory (or an extCardResource) of the eUICC, and a list of eSIM capabilities (eUICC RSP capabilities) supported by the eUICC In operation 7009, the terminal may determine whether a next eUICC to be additionally selected is mounted in the terminal. When the next eUICC to be additionally selected exists, the terminal may select the next eUICC by performing operation 7005. When the next eUICC to be additionally selected does not exist (e.g., when only one eUICC is mounted in the terminal, or operations 7005 to 7001 have been already performed on all eUICCs), the terminal may perform operation 7011.

In operation 7011, the terminal may transfer, to an MNO server, a LPA API information list including a plurality of pieces of LPA API information generated by repeating at least operations 7005 to 7009 one or more times.

In operation 7013, the terminal may receive at least an activation code from the MNO server, and may further receive a eUICC index selected from the LPA API information list.

In operation 7015, the terminal may determine whether the MNO server has transferred the activation code and one or more eUICC indices. In a case where the MNO server has transferred only one eUICC index, the terminal may perform operation 7017. In a case where the MNO server did not transfer a eUICC index or has transferred two or more eUICC indices, the terminal may perform operation 7019.

In operation 7017, the terminal may select a eUICC by referring to the eUICC indices.

In operation 7019, the terminal may select a eUICC by referring to the number of the eUICC indices. In detail, in a case where the MNO server did not transfer a eUICC index, the terminal may randomly select a eUICC from among the eUICCs mounted in the terminal. In a case where the MNO server has transferred two or more eUICC indices, the terminal may select a eUICC corresponding to one of the eUICC indices transmitted by the MNO server. As a reference by which the terminal selects a eUICC in operation 7019, at least two methods below may be complexly applied thereto, but the reference is not limited to the methods below.
  Refer to a remaining available memory of a eUICC (e.g., a eUICC having a largest remaining available memory, a eUICC having a smallest remaining available memory, or a eUICC being closest to a size of a profile to be installed), and select an appropriate eUICC
  Refer to the number of profiles installed in a eUICC (e.g., a eUICC having a smallest number of installed profiles or a eUICC having a largest number of installed profiles), and select an appropriate eUICC
  Refer to eSIM capability supported by a eUICC (e.g., a eUICC supporting or not supporting one or more random eSIM capabilities), and select an appropriate eUICC
  Refer to a list of RATs being supportable by a modem (e.g., a modem supporting a RAT that is appropriate for a particular communication service), and select a eUICC connected to an appropriate modem
  Refer to eSIM capability supported by an LPA (e.g., an LPA supporting or not supporting one or more random eSIM capabilities), and select a eUICC controlled by an appropriate LPA In operation 7021, the terminal may process the received activation code with respect to the selected eUICC.

In operation 7023, the terminal may end the operation and may stand by until an additional LPA API procedure is triggered.

Figure 19:
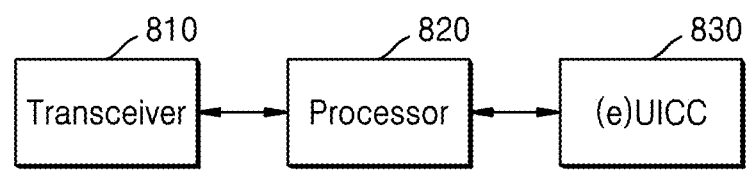
FIG. 19 is a block diagram of elements of the terminal, according to an embodiment of the disclosure.

FIG. 19 is a block diagram of elements of the terminal 400, according to an embodiment of the disclosure.

As illustrated in FIG. 19, the terminal 400 may include a transceiver 810 and at least one processor 820. The terminal 400 may also include a UICC 830. For example, the UICC 830 may be inserted into the terminal 400 or may be a eUICC mounted in the terminal 500.

The transceiver 810 according to various embodiments of the disclosure may transmit and receive signals, information, data, or the like according to various embodiments of the disclosure to and from the MNO server 450 or the profile server 460.

For example, the transceiver 810 may receive an activation code procedure initiation request message from the MNO server 450, may transmit an LPA API information list to the MNO server 450, may receive at least an activation code from the MNO server 450, may further selectively receive a eUICC index from the MNO server 450, may transmit a message for requesting an event to the profile server 460, and may receive a part of the event or the entire event from the profile server 460.

According to various embodiments of the disclosure, the transceiver 810 may include a modem.

The at least one processor 820 is an element configured to generally control the terminal 400. The at least one processor 820 may control all operations of the terminal 400, according to various embodiments of the disclosure as described above. The at least one processor 820 may be referred to as a controller.

For example, the at least one processor 820 according to various embodiments of the disclosure may control the terminal 400 to receive an activation code procedure initiation request message from the MNO server 450, to collect information of one or more eUICCs mounted in the terminal 400 and/or information of one or more modems, to generate an LPA API information list, to select at least one piece of LPA API information from the LPA API information list when required, to transmit the LPA API information list to the MNO server 450, to receive at least an activation code from the MNO server 450, to determine whether the MNO server 450 has transmitted one or more eUICC indices, to select a eUICC by referring to the eUICC indices transmitted by the MNO server 450, to generate an event request message based on the activation code, to transmit the event request message to the profile server 460, to receive a part of the event or the entire event from the profile server 460, and to process the event.

The UICC 830 according to various embodiments of the disclosure may download a profile and may install the profile. Also, the UICC 830 may manage one or more profiles.

The UICC 830 may operate by the control of the at least one processor 820. Also, the UICC 830 may include a processor or a controller to install a profile, or may have installed therein an application. A part of the application may be installed in the at least one processor 820.

The terminal 400 may further include a memory (not shown), and the memory may store a basic program, an application program, data such as configuration information, or the like for operations of the terminal 400. In addition, the memory may include at least one of a flash memory-type storage medium, a hard disk-type storage medium, a multimedia card micro-type storage medium, a card type memory (e.g., an SD or XD memory, etc.), a magnetic memory, a magnetic disk, an optical disk, a RAM, a SRAM, a ROM, a programmable read-only memory (PROM), or an EEPROM. The at least one processor 820 may perform various operations by using various programs, content, data, or the like stored in the memory.

Figure 20:
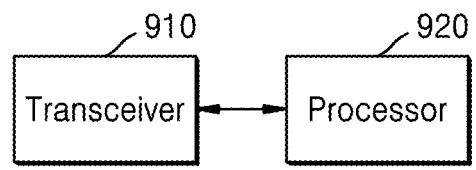
FIG. 20 is a block diagram of elements of the MNO server, according to an embodiment of the disclosure.
Figure 21:
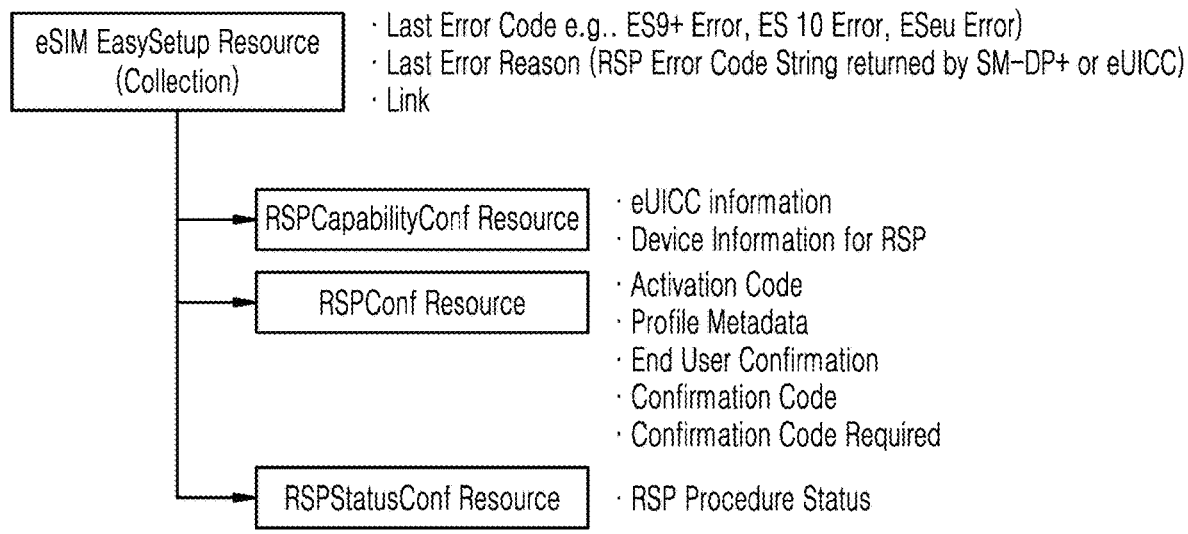
FIG. 21 illustrates an example of a resource for the eSIM Easysetup according to an embodiment of the present disclosure.

FIG. 20 is a block diagram of elements of the MNO server 450, according to an embodiment of the disclosure.

The MNO server 450 according to various embodiments of the disclosure may include a transceiver 910 and at least one processor 920.

The transceiver 910 according to various embodiments of the disclosure may transmit and receive signals, information, data, or the like according to various embodiments of the disclosure to and from the terminal 400 or the profile server 460.

For example, the transceiver 910 according to various embodiments of the disclosure may transmit an activation code procedure initiation request message to the terminal 400, may receive an LPA API information list from the terminal 400, may transmit an event generation request message to the profile server 460, may receive an event identifier from the profile server 460, and may transmit an activation code and a eUICC index to the terminal 400.

The at least one processor 920 is an element is an element configured to generally control the MNO server 450. The at least one processor 920 may control all operations of the MNO server 450, according to various embodiments of the disclosure as described above. The at least one processor 920 may be referred to as a controller.

For example, the at least one processor 920 according to various embodiments of the disclosure may control the MNO server 450 to transmit an activation code procedure initiation request message to the terminal 400, to receive an LPA API information list from the terminal 400, to select at least one eUICC by referring to the LPA API information list, to transmit an event generation request message to the profile server 460, to receive an event identifier from the profile server 460, to generate an activation code corresponding to an event based on the event identifier, and to transmit the activation code and an index of the selected eUICC to the terminal 400.

According to various embodiments of the disclosure, provided are a communication opening method and procedure based on standards for downloading and installing a profile to an embedded Subscriber Identity Module (eSIM) Internet of Things (IoT) terminal through interoperation with a primary terminal.

According to various embodiments of the disclosure, provided are a method and apparatus for enabling a terminal to select a communication service and perform communication connection in a communication system.

According to various embodiments of the disclosure, provided are a method and apparatus for enabling a terminal to online download, install, and manage a profile for communication connection in a communication system.

According to various embodiments of the disclosure, provided are a method and apparatus for enabling a terminal to efficiently download an event in a communication system.

A primary terminal may perform an operation of identifying that a particular IoT terminal is a terminal having an eSIM mounted therein and requiring downloading and installation of a profile and an operation of collecting necessary information from the eSIM IoT terminal so as to be issued an activation code as preset information for allowing the eSIM IoT terminal to download the profile, the eSIM IoT terminal may perform an operation of attempting an access including authentication about Open Connectivity Foundation (OCF) connection eSIM Easysetup by using the primary terminal as an access point (AP), the primary terminal may perform an operation of determining an ongoing procedure of the OCF connection eSIM Easysetup and reconfiguring previous connection and an operation of transferring the activation code to the eSIM IoT terminal so as to allow the eSIM IoT terminal to start downloading the profile, and the eSIM IoT terminal may perform an operation of notifying the primary terminal for processing of user interaction for a profile download procedure, processing a response thereof, and completing the profile download procedure.

According to an embodiment of the disclosure, a communication method performed by a terminal in a wireless communication system may include: generating a Local Profile Assistant Application Programming Interface (LPA API) information list including at least one piece of LPA API information that is information for generation of an activation code with respect to an embedded Universal Integrated Circuit Card (eUICC); transmitting the LPA API information list to a server, and receiving, from the server, one or more activation codes and one or more pieces of eUICC identifier information corresponding to the one or more activation codes, respectively; selecting a eUICC, based on the one or more pieces of eUICC identifier information; and processing an activation code with respect to the selected eUICC, the activation code corresponding to eUICC identifier information of the selected eUICC.

The generating of the LPA API information list may include selecting a first eUICC from among a plurality of eUICCs and generating first LPA API information with respect to the selected first eUICC, and wherein the first LPA API information comprises terminal information about the terminal, eUICC information about the first eUICC, and identifier information about the first eUICC.

The generating of the LPA API information list may include determining whether a eUICC to be additionally selected exists, when the eUICC that is to be additionally selected exists, selecting a second eUICC from among the plurality of eUICCs; and generating second LPA API information with respect to the selected second eUICC.

The generating of the LPA API information list may include, when the eUICC that is to be additionally selected does not exist, generating the LPA API information list comprising the first LPA API information and the second LPA API information.

Each of the one or more pieces of eUICC identifier information may include a eUICC index.

The eUICC index may be generated based on at least one of a eUICC identifier, an identifier of a Subscriber Identity Module (SIM) port connecting the eUICC and a modem, or a virtual identifier randomly allocated to the eUICC by the terminal or an LPA.

The selecting of the eUICC may include selecting a eUICC corresponding to the identifier information about one eUICC, when identifier information about one eUICC is received from the server, and selecting a eUICC according to a preset criterion, when a plurality of pieces of identifier information about a plurality of eUICCs are received or the activation code is received from the server without receiving the eUICC identifier information.

The selecting of the eUICC according to the preset criterion may include selecting the eUICC based on at least one of a remaining available memory of each of the eUICCs, the number of profiles installed in each eUICC, eSIM capability supported by each eUICC, radio access technologies (RATs) supported by a modem connected to each eUICC, or eSIM capability supported by an LPA.

According to another embodiment of the disclosure, a communication method performed by a base station in a wireless communication system may include: receiving, from a terminal, a LPA API information list including at least one piece of LPA API information that is information for generation of an activation code with respect to a eUICC; selecting LPA API information from the LPA API information list; generating an activation code corresponding to an event, based on the selected LPA API information; transmitting, to the terminal, the activation code and eUICC identifier information corresponding to the selected LPA API information; and processing the event corresponding to the activation code.

The selected LPA API information may include terminal information about the terminal, eUICC information about a eUICC selected by the terminal, and identifier information about the eUICC selected by the terminal.

According to another embodiment of the disclosure, a terminal in a wireless communication system may include: a transceiver; a plurality of eUICCs storing profiles; and at least one processor configured to generate a LPA API information list including at least one piece of LPA API information that is information for generation of an activation code with respect to a eUICC, transmit the LPA API information list to a server, and receiving, from the server, one or more activation codes and one or more pieces of eUICC identifier information corresponding to the one or more activation codes, respectively, select a eUICC, based on the one or more pieces of eUICC identifier information, and process an activation code with respect to the selected eUICC, the activation code corresponding to eUICC identifier information of the selected eUICC.

The at least one processor may be further configured to select a first eUICC from among a plurality of eUICCs, and generate first LPA API information with respect to the selected first eUICC, and wherein the first LPA API information comprises terminal information about the terminal, eUICC information about the first eUICC, and identifier information about the first eUICC.

The at least one processor may be further configured to determine whether a eUICC to be additionally selected exists, when the eUICC that is to be additionally selected exists, select a second eUICC from among the plurality of eUICCs, and generate second LPA API information with respect to the selected second eUICC.

The at least one processor may be further configured to, when the eUICC that is to be additionally selected does not exist, generate the LPA API information list comprising the first LPA API information and the second LPA API information.

Each of the one or more pieces of eUICC identifier information may include a eUICC index.

The eUICC index may be generated based on at least one of a eUICC identifier, an identifier of a Subscriber Identity Module (SIM) port connecting the eUICC and a modem, or a virtual identifier randomly allocated to the eUICC by the terminal or an LPA.

The at least one processor may be further configured to select a eUICC corresponding to the identifier information about one eUICC, when identifier information about one eUICC is received from the server, and select a eUICC according to a preset criterion, when a plura lity of pieces of identifier information about a plurality of eUICCs are received or the activation code is received from the server without receiving the eUICC identifier information.

The at least one processor may be further configured to select the eUICC based on at least one of a remaining available memory of each of the eUICCs, the number of profiles installed in each eUICC, eSIM capability supported by each eUICC, radio access technologies (RATs) supported by a modem connected to each eUICC, or eSIM capability supported by an LPA.

According to another embodiment of the disclosure, a base station in a wireless communication system may include: a transceiver; and at least one processor configured to receive, from a terminal, a LPA API information list including at least one piece of LPA API information that is information for generation of an activation code with respect to a eUICC, select LPA API information from the LPA API information list, generate an activation code corresponding to an event, based on the selected LPA API information, transmit, to the terminal, the activation code and eUICC identifier information corresponding to the selected LPA API information, and process the event corresponding to the activation code.

According to another embodiment of the disclosure, a terminal in a wireless communication system may include: a transceiver; and at least one processor configured to receive an activation code procedure initiation request message from a server, to generate and identify an LPA API information list, to transmit the LPA API information list to the server, to receive at least an activation code and a eUICC index, to transmit an event request message to the server by referring to the activation code, and to control the transceiver to receive a part of an event or the entire event from the server.

According to another embodiment of the disclosure, a server in a wireless communication system may include: a transceiver; and at least one processor configured to transmit an activation code procedure initiation request message to a terminal, to receive an LPA API information list from the terminal, to transmit an event generation request message to another server, to receive an event identifier from the other server, and to control the transceiver to transmit an activation code and a selected eUICC index to the terminal.

According to another embodiment of the disclosure, a terminal in a wireless communication system may include: a receiver configured to receive an activation code procedure initiation request message from a server; a controller configured to collect information about at least one eUICC mounted in the terminal and/or information about a modem and to generate and identify an LPA API information list; and a transmitter configured to transmit the LPA API information list to the server, wherein the receiver is further configured to receive at least an activation code and a eUICC index from the server, the controller is further configured to select a eUICC by referring to the eUICC index, the transmitter is further configured to transmit an event request message to the server by referring to the activation code, the receiver is further configured to receive a part of an event or the entire event from the server, and the controller is further configured to process the received part of the event or the received entire event with respect to the selected eUICC.

According to another embodiment of the disclosure, a server in a wireless communication system may include: a transmitter configured to transmit an activation code procedure initiation request message to a terminal; a receiver configured to receive an LPA API information list from the terminal; and a controller configured to select at least one eUICC by referring to the LPA API information list, wherein the transmitter is further configured to transmit an event generation request message to another server, the receiver is further configured to receive an event identifier from the other server, the controller is further configured to generate an activation code corresponding to an event by referring to the event identifier, and the transmitter is further configured to transmit the activation code and an index of the selected eUICC to the terminal.

The MNO server may further include the memory (not shown) and the memory may store data such as a basic program, an application program, configuration information, etc. for operation of the MNO server. In addition, the memory may include at least one of a flash memory-type storage medium, a hard disk-type storage medium, a multimedia card micro-type storage medium, a card type memory (e.g., an SD or XD memory, etc.), a magnetic memory, a magnetic disk, an optical disk, a RAM, a SRAM, a ROM, a programmable read-only memory (PROM), or an EEPROM. The at least one processor 920 may perform various operations by using various programs, content, data, or the like stored in the memory.

According to some embodiments of the disclosure, in a case where a plurality of eUICCs or a plurality of modems are mounted in a terminal in a communication system, the terminal may transmit device information for generation of an activation code to at least one server so as to support the at least one server to select an appropriate eUICC for which an event is to be processed, may download the event from a profile server, and may process the event.

According to some embodiments of the disclosure, the at least one server in the communication system may receive at least one piece of device information for generation of an activation code from the terminal, may select the appropriate eUICC based on the at least one piece of device information, may generate the event to be processed by the selected eUICC, and may transmit an activation code corresponding to the event to the terminal, such that the terminal may download and process the event.

According to various embodiments of the disclosure, even when a manufacturer of an IoT terminal including an eSIM is different from that of a primary terminal, the IoT terminal is released without credential for an access to a mobile communication network (e.g., the IoT terminal is released without a provisioning profile), or the IoT terminal does not have user authentication information (e.g., a SIM card) for subscription to a communication service, the IoT terminal may subscribe to and open a communication service by interoperating with the primary terminal.

According to various embodiments of the disclosure, in a case where the IoT terminal reconnects to an AP by changing an AP role with the primary terminal, the primary terminal may identify a terminal having been performing an eSIM Easysetup procedure and may safely complete a remaining profile download procedure subsequent to a previous session.

According to various embodiments of the disclosure, provided are a method and apparatus for enabling a terminal to select a communication service and perform communication connection in a communication system.

According to various embodiments of the disclosure, provided are a method and apparatus for enabling a terminal to online download, install, and manage a profile for communication connection in a communication system.

According to various embodiments of the disclosure, provided are a method and apparatus for enabling a terminal to efficiently download an event in a communication system.

In the above particular embodiments of the disclosure, the elements included in the disclosure are expressed in the singular or plural according to the presented particular embodiments of the disclosure. However, the singular or plural expressions are selected suitably according to the presented situations for convenience of descriptions, the disclosure is not limited to the singular or plural elements, and the elements expressed in the plural may even be configured in the singular or the elements expressed in the singular may even be configured in the plural.

Meanwhile, the detailed embodiments of the disclosure have been described, but various modifications may be made without departing from the scope of the disclosure. Therefore, the scope of the disclosure should not be limited to the described embodiments, and should be determined by the scope of the claims to be described below and equivalents of the scope of the claims.

It should be understood that one or more embodiments of the disclosure and terms used therefor are not intended to limit the technology described in the disclosure to a specific embodiment, but include various modifications, equivalents, and/or replacements of the corresponding embodiment of the disclosure. In connection with the descriptions of the drawings, like reference numerals may be used for like elements. The singular expressions may include plural expressions unless the context clearly indicates otherwise. In the disclosure, the expression "A or B", "at least one of A and/or B", "A, B or C" or "at least one of A, B and/or C", etc., may include all possible combinations of items listed together. The expression such as "first" or "second" may modify corresponding elements regardless of order or importance, and are used only to distinguish one element from another, but are not limited thereto. When it is stated that any (e.g., a first) element is "(functionally or communicatively)" connected to another (e.g., a second) element, any of the elements may be directly connected to the other element, or may be connected via another (e.g., a third) element.

The term "module" used in the disclosure includes a unit configured of hardware, software, or firmware, and may be used interchangeably with terms such as logic, logic block, part, or circuit. The module may be an integrated part, or a minimum unit or a portion thereof performing one or more functions. For example, the module may be configured with an application-specific integrated circuit (ASIC).

The one or more embodiments of the disclosure may be implemented as software (e.g., a program) including instructions stored in machine (e.g., a computer)-readable storage media (e.g., an internal memory or external memory). The machine may include a terminal according to one or more embodiments as a device capable of calling a stored instruction from a storage medium and operating according to the called instruction. When the instruction is executed by a processor, the processor may perform a function corresponding to the instruction directly or by using other elements under the control of the processor. The instruction may include code generated or executed by a compiler or interpreter.

The machine-readable storage media may be provided in the form of non-transitory storage media. Here, the term "non-transitory" means that the storage media do not include a signal and are tangible, but does not distinguish between data being stored semi-permanently or temporarily in the storage media.

The method according to one or more embodiments disclosed herein may be included and provided in a computer program product. The computer program product may be traded as a product between a seller and a purchaser. The computer program product may be distributed online in the form of a machine-readable storage medium (e.g., a compact disc read-only memory (CD-ROM)), or through an application store (e.g., Play Store™). In the case of online distribution, at least a portion of the computer program product may be temporarily stored in a storage medium such as a server of a manufacturer, a server of an application store, or a memory of a relay server, or may be temporarily generated.

Each of the elements (e.g., modules or programs) according to the one or more embodiments of the disclosure may be configured as a single or a plurality of entities, and some of the sub-elements described above may be omitted or other sub-elements may be further included in the one or more embodiments. Alternatively or additionally, some elements (e.g., modules or programs) may be integrated into one entity to perform functions, performed by each of the corresponding elements before being integrated, in the same or similar manner. According to the one or more embodiments of the disclosure, operations performed by modules, programs, or other elements may be performed sequentially, in parallel, repetitively, or heuristically, at least some of the operations may be executed in a different order or omitted, or other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by a primary terminal, of providing a communication service, the method comprising:
    identifying and accessing, by performing a discovery process, an Internet of Things (IoT) terminal operating as an access point;
    transmitting, to the IoT terminal, authentication information for performing a second embedded Subscriber Identity Module (eSIM) setup process following a first eSIM setup process while performing the first eSIM setup process on the IoT terminal;
    disconnecting first connection with the IoT terminal after terminating the first eSIM setup process;
    performing second connection with the IoT terminal based on the authentication information, in response to an access request from the IoT terminal; and
    performing the second eSIM setup process as a subsequent procedure to the first eSIM setup process.

2. The method of claim 1, wherein the first eSIM setup process comprises:
    determining whether the IoT terminal is capable of performing an eSIM setup, based on a resource of the IoT terminal; and
    purchasing a communication service plan.

3. The method of claim 1, wherein the second eSIM setup process comprises:
    downloading a profile for the IoT terminal.

4. The method of claim 1, wherein the primary terminal operates as an access point when performing the second connection with the IoT terminal based on the authentication information, in response to the access request from the IoT terminal.

5. The method of claim 1, wherein the authentication information comprises at least one of Service Set Identifier (SSID) and Password (PW), transaction ID for an eSIM profile, or Evolved Packet System (EPS) information for the IoT terminal.

6. A method, performed by an Internet of Things (IoT) terminal, of providing a communication service, the method comprising:
    performing first connection with a primary terminal, in response to an access request from the primary terminal;

receiving, from the primary terminal, authentication information for performing a second embedded Subscriber Identity Module (eSIM) setup process following a first eSIM setup process while performing the first eSIM setup process;

disconnecting first connection with the primary terminal after terminating the first eSIM setup process;

performing second connection with the primary terminal based on the authentication information; and performing the second eSIM setup process as a subsequent procedure to the first eSIM setup process.

7. The method of claim 6, wherein the first eSIM setup process comprises:

determining whether the IoT terminal is capable of performing an eSIM setup, based on a resource of the IoT terminal; and purchasing a communication service plan.

8. The method of claim 6, wherein the second eSIM setup process comprises:

downloading a profile for the IoT terminal.

9. The method of claim 6, wherein the primary terminal operates as an access point when performing second connection with the IoT terminal based on the authentication information, in response to an access request from the IoT terminal.

10. The method of claim 6, wherein the authentication information comprises at least one of Service Set Identifier (SSID) and Password (PW), transaction ID for an eSIM profile, or Evolved Packet System (EPS) information for the IoT terminal.

11. A primary terminal providing a communication service, the primary terminal comprising:

a transceiver; and at least one processor coupled with the transceiver and configured to:

identify and access, by performing a discovery process, an Internet of Things (IoT) terminal operating as an access point;

transmit, to the IoT terminal, authentication information for performing a second embedded Subscriber Identity Module (eSIM) setup process following a first eSIM setup process while performing the first eSIM setup process on the IoT terminal;

disconnect first connection with the IoT terminal after terminating the first eSIM setup process;

perform second connection with the IoT terminal based on the authentication information, in response to an access request from the IoT terminal; and perform the second eSIM setup process as a subsequent procedure to the first eSIM setup process.

12. The primary terminal of claim 11, wherein, in the performing of the first eSIM setup process, the at least one processor is further configured to:

determine whether the IoT terminal is capable of performing an eSIM setup, based on a resource of the IoT terminal; and purchase a communication service plan.

13. The primary terminal of claim 11, wherein, in the performing of the second eSIM setup process, the at least one processor is further configured to:

download a profile for the IoT terminal.

14. The primary terminal of claim 11, wherein the primary terminal operates as an access point when performing the second connection with the IoT terminal based on the authentication information, in response to the access request from the IoT terminal.

15. The primary terminal of claim 11, wherein the authentication information comprises at least one of Service Set Identifier (SSID) and Password (PW), transaction ID for an eSIM profile, or Evolved Packet System (EPS) information for the IoT terminal.

16. An Internet of Things (IoT) terminal providing a communication service, the IoT terminal comprising:

a transceiver; and at least one processor coupled with the transceiver and configured to:

perform first connection with a primary terminal, in response to an access request from the primary terminal;

receive, from the primary terminal, authentication information for performing a second embedded Subscriber Identity Module (eSIM) setup process following a first eSIM setup process while performing the first eSIM setup process;

disconnect first connection with the primary terminal after terminating the first eSIM setup process;

perform second connection with the primary terminal based on the authentication information; and perform the second eSIM setup process as a subsequent procedure to the first eSIM setup process.

17. The IoT terminal of claim 16, wherein, in the performing of the first eSIM setup process, the at least one processor is further configured to:

determining whether the IoT terminal is capable of performing an eSIM setup, based on a resource of the IoT terminal; and purchase a communication service plan.

18. The IoT terminal of claim 16, wherein, in the performing of the second eSIM setup process, the at least one processor is further configured to:

download a profile for the IoT terminal.

19. The IoT terminal of claim 16, wherein the primary terminal operates as an access point when performing second connection with the IoT terminal based on the authentication information, in response to an access request from the IoT terminal.

20. The IoT terminal of claim 16, wherein the authentication information comprises at least one of Service Set Identifier (SSID) and Password (PW), transaction ID for an eSIM profile, or Evolved Packet System (EPS) information for the IoT terminal.

* * * * *